US008768655B2

(12) United States Patent
Singh et al.

(10) Patent No.: US 8,768,655 B2
(45) Date of Patent: Jul. 1, 2014

(54) SYSTEM AND METHOD FOR ANALYZING AND DESIGNING AN ARCHITECTURAL STRUCTURE USING BUNDLES OF DESIGN STRATEGIES APPLIED ACCORDING TO A PRIORITY

(75) Inventors: Varun Singh, New York, NY (US); Peter Leonard Krebs, Las Cruces, NM (US); Mads Naestholt Jensen, London (GB); Karl Gustav Varnik, New York, NY (US); George Albert Miguel, New York, NY (US); Jacob Miles, Brooklyn, NY (US); Jeremy Gayed, Washington Township, NJ (US)

(73) Assignee: Sefaira, Inc., New York, NY (US)

( * ) Notice: Subject to any disclaimer, the term of this patent is extended or adjusted under 35 U.S.C. 154(b) by 92 days.

(21) Appl. No.: 13/281,238

(22) Filed: Oct. 25, 2011

(65) Prior Publication Data
US 2012/0078685 A1 Mar. 29, 2012

Related U.S. Application Data

(63) Continuation-in-part of application No. 12/893,225, filed on Sep. 29, 2010.

(51) Int. Cl.
G06F 17/50 (2006.01)
G06Q 10/06 (2012.01)
G06Q 50/06 (2012.01)
(52) U.S. Cl.
CPC .............. *G06Q 10/06* (2013.01); *G06Q 10/063* (2013.01); *G06Q 50/06* (2013.01); *G06Q 10/06375* (2013.01)
USPC .......................................................... 703/1
(58) Field of Classification Search
None
See application file for complete search history.

(56) References Cited

U.S. PATENT DOCUMENTS 6,922,701 B1 * 7/2005 Ananian et al. .................. 1/1
2004/0239494 A1 * 12/2004 Kennedy et al. ............. 340/500
(Continued)

FOREIGN PATENT DOCUMENTS

WO WO 2008144662 A1 * 11/2008 ............. G06Q 10/00

OTHER PUBLICATIONS

Heylighen, A.; Neuckermans, H. "A Case Base of Case-Based Design Tools for Architecture" Computer-Aided Design, vol. 33, pp. 1111-1122 (2001) available from <http://www.sciencedirect.com/science/article/pii/S0010448501000550>.*

(Continued)

*Primary Examiner* — Kamini S Shah
*Assistant Examiner* — Jay B Hann
(74) *Attorney, Agent, or Firm* — Sheppard Mullin Richter & Hampton LLP

(57) ABSTRACT

According to various embodiments of the invention, systems and methods are provided for analyzing and designing architectural structures. Such embodiments may be utilized by architects and engineers as tools that assist in designing architectural structures that achieve specific design goals, such as those related to sustainability. For example, an embodiment may comprise a system that: (i) provides a sustainability analysis on an architectural structure design created using a computer-assisted design (CAD) tool, and then (ii) applies a design option to that design (e.g., changes to orientation of building on a project site, size of fenestrations on the structure, choice of wall insulation, etc.) to improve its sustainability. In addition, various embodiments may be accessed through a web-based platform, which provides a user with easier access and better collaboration between and among design team members.

47 Claims, 34 Drawing Sheets

(56) References Cited

U.S. PATENT DOCUMENTS

| | | | |
|---|---|---|---|
| 2005/0137921 A1* | 6/2005 | Shahriari | 705/7 |
| 2006/0185275 A1 | 8/2006 | Yatt | |
| 2008/0249756 A1* | 10/2008 | Chaisuparasmikul | 703/13 |
| 2009/0125283 A1* | 5/2009 | Conover | 703/1 |
| 2009/0144097 A1* | 6/2009 | Fassio et al. | 705/7 |
| 2010/0077678 A1 | 4/2010 | Boardman | |
| 2010/0223032 A1* | 9/2010 | Reghetti et al. | 703/1 |
| 2011/0054652 A1 | 3/2011 | Heil | |
| 2011/0246155 A1* | 10/2011 | Fitch et al. | 703/6 |
| 2011/0246381 A1* | 10/2011 | Fitch et al. | 705/313 |
| 2012/0095730 A1* | 4/2012 | Krebs et al. | 703/1 |
| 2012/0173209 A1* | 7/2012 | Krebs et al. | 703/1 |
| 2012/0203562 A1* | 8/2012 | Krebs et al. | 705/1.1 |
| 2013/0144546 A1* | 6/2013 | Brackney et al. | 702/61 |

OTHER PUBLICATIONS

McDowell, Timothy, et al. "Integration of Airflow and Energy Simulation Using CONTAM and TRNSYS" ASHRAE, pp. 1-14 (2003) available at <http://www.bfrl.nist.gov/IAQanalysis/docs/tess.pdf>.*

International Search Report and the Written Opinion for Internaional App No. PCT/US2012/056665, competed Mar. 25, 2013, United States Patent and Trademark Office.

* cited by examiner

FIG. 2D

Total points: 76.49

| | Description | Availab Credits | Predicted Credits | Weightti | Points |
|---|---|---|---|---|---|
| Energy | | | | | |
| Ene 1 | Dwelling Emission Rate | 15 | 12 | 1.3 | 15.1 |
| Ene 2 | Building Fabric | 2 | 1 | 1.3 | 1.3 |
| Ene 3 | Internal Lighting | 2 | 2 | 1.3 | 2.5 |
| Ene 4 | Drying Space | 1 | 1 | 1.3 | 1.3 |
| Ene 5 | Energy Labelled White Goods | 2 | 2 | 1.3 | 2.5 |
| Ene 6 | External Lighting | 2 | 1 | 1.3 | 1.3 |
| Ene 7 | Low or Zero Carbon (LZC) Technologies | 2 | 2 | 1.3 | 2.5 |
| Ene 8 | Cycle Storage | 2 | 2 | 1.3 | 2.5 |
| Ene 9 | Home Office | 1 | 1 | 1.3 | 1.3 |
| | | 29 | | 36.4 | 30.1 |
| Water | | | | | |
| Wat 1 | Internal Potable Water Use | 5 | 3 | 1.5 | 4.5 |
| Wat 3 | External Water Use | 1 | 1 | 1.5 | 1.5 |
| | | 6 | | 9 | 6.0 |
| Material | | | | | |
| Mat 1 | Environmental Impact of Materials | 15 | 9 | 0.3 | 2.7 |
| Mat 2 | Responsible Sourcing of Materials - Basic Building Elements | 6 | 4 | 0.3 | 1.2 |
| Mat 3 | Responsible Sourcing of Materials - Finishing Elements | 3 | 2 | 0.3 | 0.6 |
| | | 34 | | 7.2 | 4.5 |
| Surface | | | | | |
| Sur 1 | Management of surface water run-off from developments | 2 | 2 | 0.55 | 1.1 |
| Sur 2 | Flood Risk | 2 | 2 | 0.55 | 1.1 |
| | | 4 | | 2.2 | 2.2 |
| Waste | | | | | |
| Was 1 | Storage of non-recyclable waste and recyclable household waste | 4 | 4 | 0.91 | 3.7 |
| Was 2 | Construction Site Waste Management | 2 | 2 | 0.91 | 1.8 |
| Was 3 | Composting | 1 | 1 | 0.91 | 0.9 |
| | | 7 | | 6.4 | 6.4 |
| Pollution | | | | | |
| Pol 1 | Global Warming Potential (GWP) of insulants | 1 | 1 | 0.7 | 0.7 |
| Pol 2 | NOx Emissions | 3 | 2 | 0.7 | 1.4 |
| | | 4 | | 2.8 | 2.1 |
| Health | | | | | |
| Hea 1 | Daylighting | 3 | 1 | 1.2 | 1.2 |
| Hea 2 | Sound Insulation | 4 | 4 | 1.2 | 4.7 |
| Hea 3 | Private Space | 1 | 1 | 1.2 | 1.2 |
| Hea 4 | Lifetime Homes | 4 | 3 | 1.2 | 3.5 |
| | | 12 | | 14 | 10.5 |
| Manage | | | | | |
| Man 1 | Home User Guide | 3 | 3 | 1.1 | 3.3 |
| Man 2 | Considerate Constructors Scheme | 2 | 2 | 1.1 | 2.2 |
| Man 3 | Construction Site Impacts | 2 | 1 | 1.1 | 1.1 |
| Man 4 | Security | 2 | 0 | 1.1 | 0.0 |
| | | 9 | | 10 | 6.7 |
| Ecology | | | | | |
| Eco 1 | Ecological value of site | 1 | 1 | 1.3 | 1.3 |
| Eco 2 | Ecological enhancement | 1 | 1 | 1.3 | 1.3 |
| Eco 3 | Protection of ecological features | 1 | 1 | 1.3 | 1.3 |
| Eco 4 | Change in ecological value of site | 4 | 2 | 1.3 | 2.7 |
| Eco 5 | Building footprint | 2 | 1 | 1.3 | 1.3 |
| | | 9 | | 12 | 8.0 |

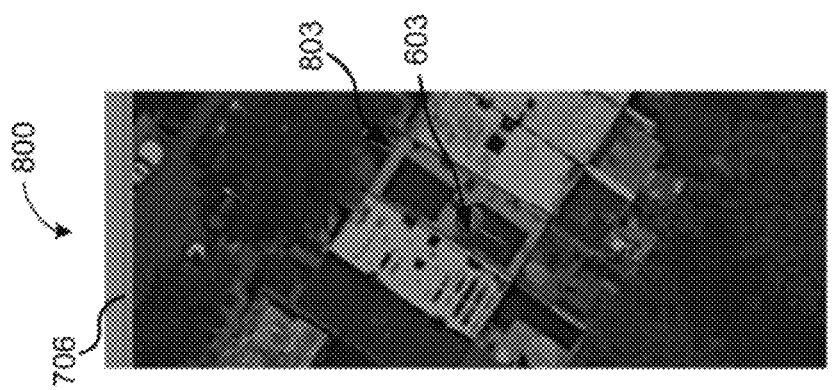
FIG. 8
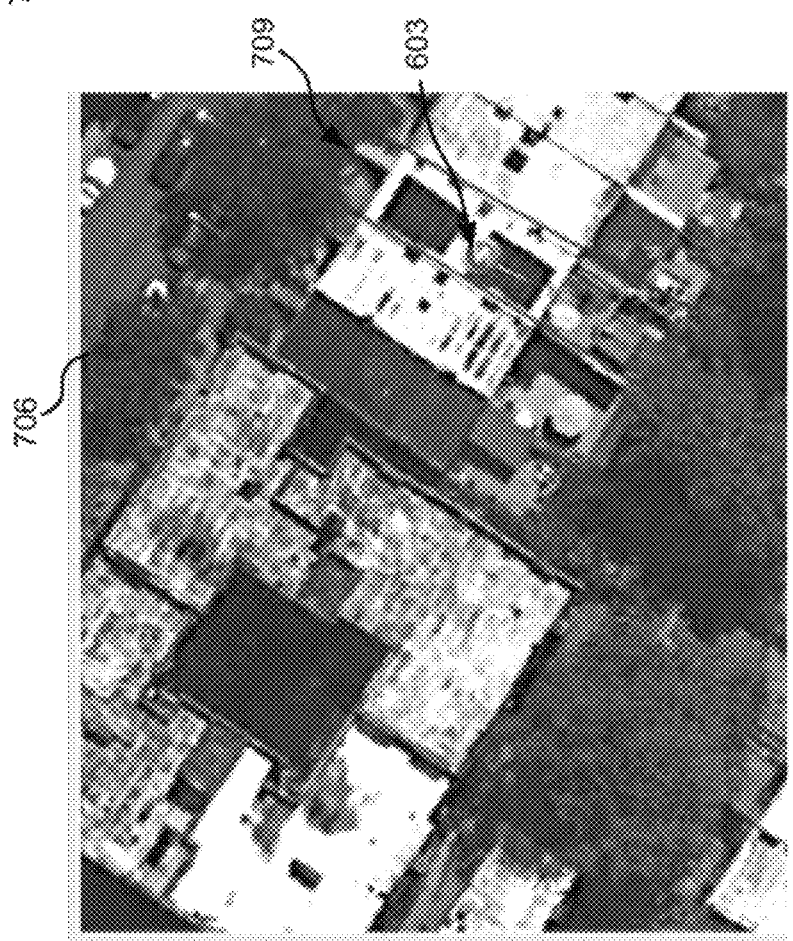
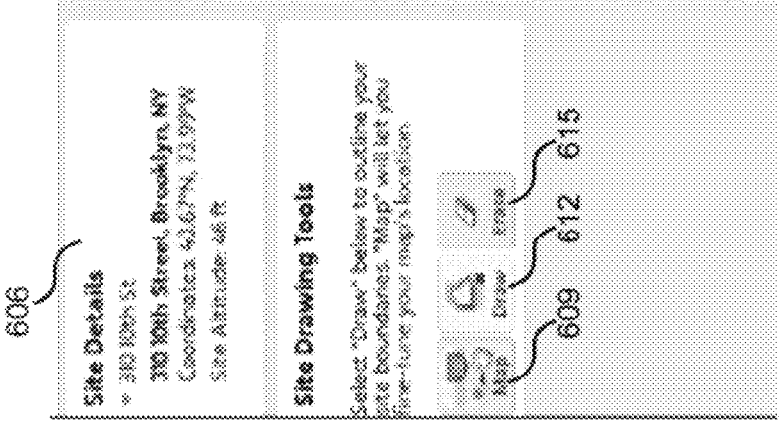
FIG. 7

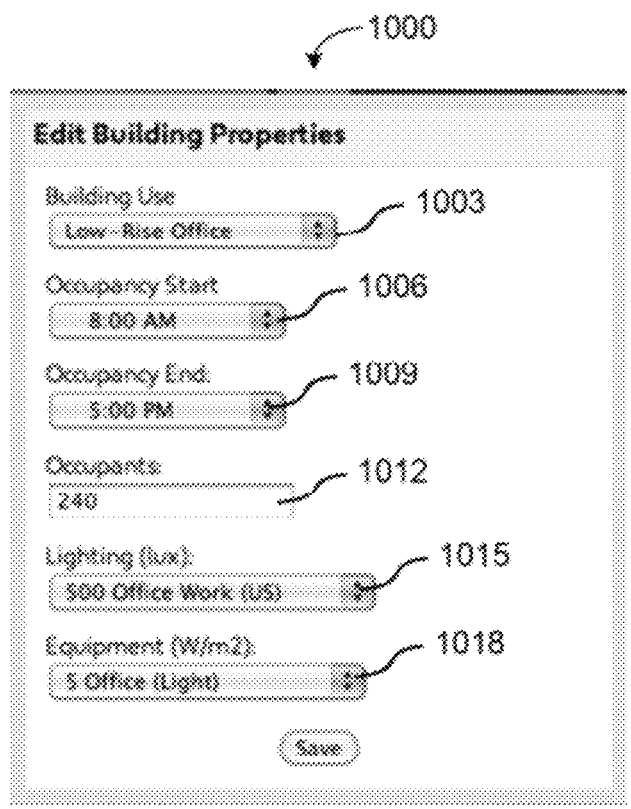
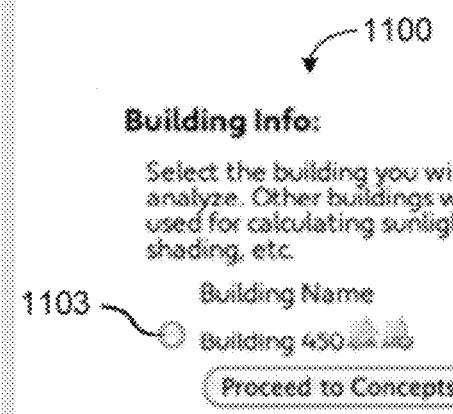
FIG. 10
FIG. 11

Edit Strategy

Rainwater harvesting is the accumulating and storing of rainwater. It can be used to provide water for irrigation and toilet flushing with minimal treatment.

Rainwater Tank Size    Roof Area

[ 1 ] m³    This tank is used only for rain water. Select the percentage of the roof area that will be used for rainwater harvest. A separate tank is available in the greywater strategy. [ 100 ]%

| Label | Delta | Baseline | Forecast |
|---|---|---|---|
| Utility Water Consumed (m³/yr) | -157 | 754 | 596 |
| Install Cost ($) | 1,278 | 411,560 | 412,839 |
| O&M Cost ($/yr) | -165 | 16,012 | 15,847 |
| LEED Certification (pts) | 0 | 42 | 42 |
| Carbon Emissions (kg/yr) | 0 | 37,173 | 37,173 |

( Save & Close ) ( Cancel )

FIG. 17A

SYSTEM AND METHOD FOR ANALYZING AND DESIGNING AN ARCHITECTURAL STRUCTURE USING BUNDLES OF DESIGN STRATEGIES APPLIED ACCORDING TO A PRIORITY

CROSS-REFERENCE TO RELATED APPLICATIONS

This application is a continuation-in-part of and claims the benefit of U.S. patent application Ser. No. 12/893,225 filed Sep. 29, 2010, which is incorporated by reference herein.

FIELD OF THE INVENTION

The present invention relates to architectural structures, such as buildings, and more particularly, some embodiments relate to analyzing design options for an architectural structure, some of which improve a structure's sustainability (e.g., lower resource consumption and minimize environmental impacts).

DESCRIPTION OF THE RELATED ART

During the design phase of an architectural structure, architects consider and analyze, among other things, where and how energy, water, materials, and other resources associated with the architectural structure (e.g., building, bridges, etc.) are being consumed or utilized. Generally, architects attempt to optimize their design of architectural structure for optimal resource consumption (e.g., energy, water, materials, etc.), lower construction costs, lower operational costs, and lower maintenance costs. In addition to lowering overall costs and resource uses, an optimized design may also improve a structure's compliance with building standards, certifications and ratings. These standards, certifications and ratings include green building certification and rating systems, such as Leadership in Energy & Environmental Design (LEED®), Code for Sustainable Homes (CSH), and Estidama, and environmental impact rating systems, such as Building Research Establishment Environment Assessment Method (BREEAM), and Building and Construction Authority (BCA) GreenMark.

Unfortunately, architects seeking to achieve sustainable architectural designs are finding themselves expending more and more time optimizing the design to achieve their particular sustainability goals. The expended time not only influences the development schedule for an architectural structure, but also proves to be disadvantageous when design documents need to be submitted in a timely fashion as proof of building standards compliance (e.g., green standards).

BRIEF SUMMARY OF EMBODIMENTS OF THE INVENTION

According to various embodiments of the invention, systems and methods are provided for analyzing and designing architectural structures. Such embodiments may be utilized by architects and engineers as tools that assist in designing architectural structures that achieve specific design goals, such as those related to sustainability. For example, an embodiment may comprise a system that: (i) provides a sustainability analysis on an architectural structure design created using a computer-assisted design (CAD) tool; and then (ii) applies a design option to that design (e.g., single or multi-story house, office building, warehouse, apartment building, hospital, school, municipal building, etc.) to improve its sustainability. In addition, various embodiments may be accessed through a web-based platform, which provides a user with easier access and better collaboration between and among design team members.

According to an embodiment of the invention, a method for analyzing an architectural structure on a project site is provided. The method may comprise: obtaining a first geographic location of the architectural structure; obtaining location-related data regarding the first geographic location; extracting from the architectural structure three-dimensional data representing the architectural structure; and obtaining a first design concept comprising a first design option. In some embodiments, a design concept may comprise a plurality of design options that may be applied to an architectural structure, and the design concept may comprise variables (i.e., design concept variables) that store the adjusted values for the parameters of design options contained therein. The method may further comprise: applying the first design option to the architectural structure using the three-dimensional data to effectuate a change to the architectural structure, wherein the first design option comprises a first design option parameter configured to control a level of change effectuated on the architectural structure by the first design option; and analyzing a first impact of applying the first design option to the architectural structure using the three-dimensional data and the location-related data, thereby producing first analysis data.

In some embodiments, the first design concept may further comprise a second design option, and the method may comprise applying the second design option to the architectural structure using the three dimensional data, wherein the second design option comprises a second design option parameter configured to control a level of change effectuated on the architectural structure by the second design option, and wherein the second design option is applied in addition to the first design option. The method may comprise applying the second design option to the architectural structure using the three dimensional data, wherein the second design option comprises a second design option parameter configured to control a level of change effectuated on the architectural structure by the second design option, and wherein the second design option is applied in place of the first design option. In various embodiments, the first design option and the second design option may be applied to the architectural structure according to a priority. For example, where the second design option has a higher priority than the first design option, the changes of the second design option will take precedence over the first design option. Additionally, the method may comprise determining which of the first design option and the second design option is a better design option.

Depending on the embodiment, the method may comprise: analyzing a second impact of applying the second design option to the architectural structure using the three-dimensional data and the location-related data, thereby producing second analysis data; comparing the first impact to the second impact based on the first analysis data and the second analysis data; and determining a change in benefit to the architectural structure from the comparison. Additionally, the method further may comprise: analyzing a second impact of applying the second design option to the architectural structure using the three-dimensional data and the location-related data, thereby producing second analysis data; and comparing the first impact to the second impact based on the first analysis data and the second analysis data.

For some embodiments, the method may comprise detecting a conflict between a first design option parameter of the first design option and a second design option parameter of the second design option. Depending on the embodiment, the method may comprise prompting a user to resolve the conflict, or resolving the conflict based on the priority with which the first design option and the second design option are applied. For instance, where a first design option applied to an architectural structure has a higher priority than a second design option applied to the same architectural structure, and a first design option parameter of the first design option conflicts with a second design option parameter of the second design option, the conflict may be resolved by using the first design option parameter over the second design option parameter due to the first design option's higher priority. In some embodiments, priority between a first design option and a second design option may be based on the order in which the design options are applied to the architectural structure, which may in some cases may be based on the order in which the design options are bundled together (i.e., bundle of design options). For example, the an embodiment may choose to use as a starting point the design parameter of a design option listed first in a bundled of design options.

In various embodiments, the method may comprise applying a design override to the first design concept, wherein the design override modifies a parameter of the first design concept, which may include a design concept variable. In some embodiments, the method may comprise creating the first design concept from a baseline design concept. The first geographic location may be obtained by the location of the architectural structure on the project site and a second geographic location of the project site.

In some embodiments, the method may comprise determining a feature of the architectural structure based on the first analysis data. The architectural structure may be a building (e.g., single or multi-story house, office building, warehouse, apartment building, bridge, tunnel, etc.). Additionally, in accordance with some embodiments, the first design option may be a plurality of design options.

A first design option may include a change in the three-dimensional data of the architectural structure, an equipment choice for the architectural structure, an energy source choice for the architectural structure, a water source choice for the architectural structure, a heating choice for the architectural structure, a cooling choice for the architectural structure, or a construction choice for the architectural structure. An architectural structure may comprise a plane, a wall, or a fenestration (e.g., windows, doorways) and converting the architectural structure to three-dimensional data may comprise obtaining geometric data regarding the plane, the wall, or the fenestration. Further, in some embodiments, the first design option may implement an improvement to the architectural structure with respect to building performance metrics, an operational cost, a maintenance cost, or compliance with a structural building standard. For example, improvements may include energy use, water use, day-lighting feasibility, an operational cost, a maintenance cost, or compliance with a building standard.

A feature may include energy consumption of the architectural structure, water consumption of the architectural structure, compliance of the architectural structure with a construction standard, a thermal characteristic of the architectural structure, carbon footprint of the architectural structure, indoor environment quality of the architectural structure, a construction material utilized in the architectural structure, an equipment item utilized by the architectural structure, a construction cost of the architectural structure, an operational cost of the architectural structure, or a maintenance cost of the architectural structure.

Location-related data may include weather data for the geographic location, altitude data for the geographic location, an energy source option available at the geographic location, a water source available at the geographic location, information about another architectural structure neighboring the architectural structure, demographic information for the geographic location, development information for the geographic location, a transportation option for the geographic location, environmental information for the geographic location, or construction zoning and code data for the geographic location.

In some embodiments, applying the first design option to the architectural structure may comprise mapping the first design option to the three-dimensional data. In some embodiments, the method may be configured such that applying the first design option to the architectural structure impacts an effect of another design option that is applied to the architectural structure. Further, the method may comprise implementing a change to the first design option parameter, the change to the first design option parameter impacting an effect of another design option that is applied to the three-dimensional data. In accordance with some such embodiments, a change to a design option parameter cascades as a change that impacts an effect of another design option being applied to the architectural structure.

The architectural structure may comprise a structure property relating to an operation of the architectural structure, a resource associated with the architectural structure, an equipment item associated with the architectural structure, or construction of the architectural structure, and analyzing an impact of applying the first design option to the architectural structure further uses the structure property.

In various embodiments, obtaining the geographic location may comprise receiving a definition of a project site upon which the architectural structure is disposed, the project site providing coordinates for the geographic location. In some such embodiments, the project site may comprise a plurality of architectural structures of which the architectural structure is one, and applying the first design option to the architectural structure is a result of applying the first design option to the project site.

In some embodiments, analyzing the impact of applying the first design option to the architectural structure may comprise determining an effect of the first design option to the architectural structure by evaluating a formula associated with the first design option. Depending on the embodiment, the formula when evaluated utilizes the first design option parameter, the three-dimensional data, the location-related data, a structure property, or an informed assumption.

In various embodiments, analyzing the impact of applying the first design option to the architectural structure may comprise determining a cost or a benefit associated with applying the first design option to the architectural structure.

In some embodiments, determining the feature may comprise computing a cost-benefit analysis of applying the first design option to the architectural structure. In more embodiments, determining the feature may comprise computing a return-on-investment or payback period for applying the first design option to the architectural structure.

In various embodiments, a method for aggregating data for analysis of an architectural structure is provided, comprising: using a computer to identify a data source provider, wherein the data source provider provides location-related data or cost-related data and is accessible by way of a network; determining syntax for accessing the location-related data or cost-related data by way of the network; generating a script configured to retrieve the location-related data or cost-related data from the data source provider, wherein the script is generated based on the syntax (e.g., Internet universal resource locator (URL)); mapping columns of the location-related data or cost-related data to a data source database; and determining an update interval for retrieving the location-related data or cost-related data from the data source provider. For some such embodiments, determining the update interval may comprise monitoring the data source provider for a time period to determine how frequently the data source provider is updated.

In some such embodiments, the method further may comprise scheduling the script to be executed based on the update interval. Additionally, in some embodiments, the syntax is based on a universal resource identifier (URI), such an Internet universal resource locator (URL). Depending on the embodiment, the location-related data or cost-related data may be retrieved as a data file, such as a comma or character-separate values (CSV) file, an extendable-markup language (XML) file, or a Java Script Object Notation (JSON) object.

For some embodiments, the data source provider may be the U.S. Department of Energy, the Bureau of Labor Statistics (BLS), the Environmental Protection Agency (EPA), the U.S. Energy Information Administration (EIA), or the National Oceanic and Atmospheric Administration (NOAA)/National Weather Service. As described above, the location-related data may include climate data for the geographic location, altitude data for the geographic location, an energy source option available at the geographic location, a water source available at the geographic location, information about another architectural structure neighboring the architectural structure, demographic information for the geographic location, development information for the geographic location, a transportation option for the geographic location, environmental information for the geographic location, construction zoning and code data for the geographic location. Cost-related data, on the other hand, may include energy costs, water costs, labor costs, and materials costs.

In some embodiments, the methods as described above are implemented into a computer-aided design (CAD) tool, comprising: a processor; and a memory, coupled to the processor and having computer program code embodied therein for enabling the processor to perform operations in accordance with those methods. For example, the methods as described above may be implemented as a computer program product comprising a computer-readable storage medium in which program instructions are stored, the program instructions configured to cause a computer system to perform operations in accordance with those methods. In various embodiments, the methods described above are implemented in a client and server environment such that a first set of operations from the method is performed by a client and a second set of operations from the method is performed by a server. Some embodiments may utilize socket communication between two or more components of a system, where together the components implement some or all of various methods described herein. Example components may include, without limitation, a component integrated into a CAD tool, a component of a web browser, a client-side component, or a server-side component.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 2D is a table illustrating an example calculation of certification credit in accordance with an embodiment of the present invention.

FIG. 7 is a screenshot illustrating an example operation for defining a project site in accordance with an embodiment of the present invention.

FIG. 8 is a screenshot illustrating an example operation for defining a project site in accordance with an embodiment of the present invention.

FIG. 10 is a screenshot illustrating an example operation for editing a building (i.e., structure) property in accordance with an embodiment of the present invention.

FIG. 11 is a screenshot illustrating an example operation for selecting a building (i.e., architectural structure) to be analyzed in accordance with an embodiment of the present invention.

FIGS. 17A-17B are screenshots illustrating example operations for editing design option parameters in accordance with an embodiment of the present invention.

Figure 1A:
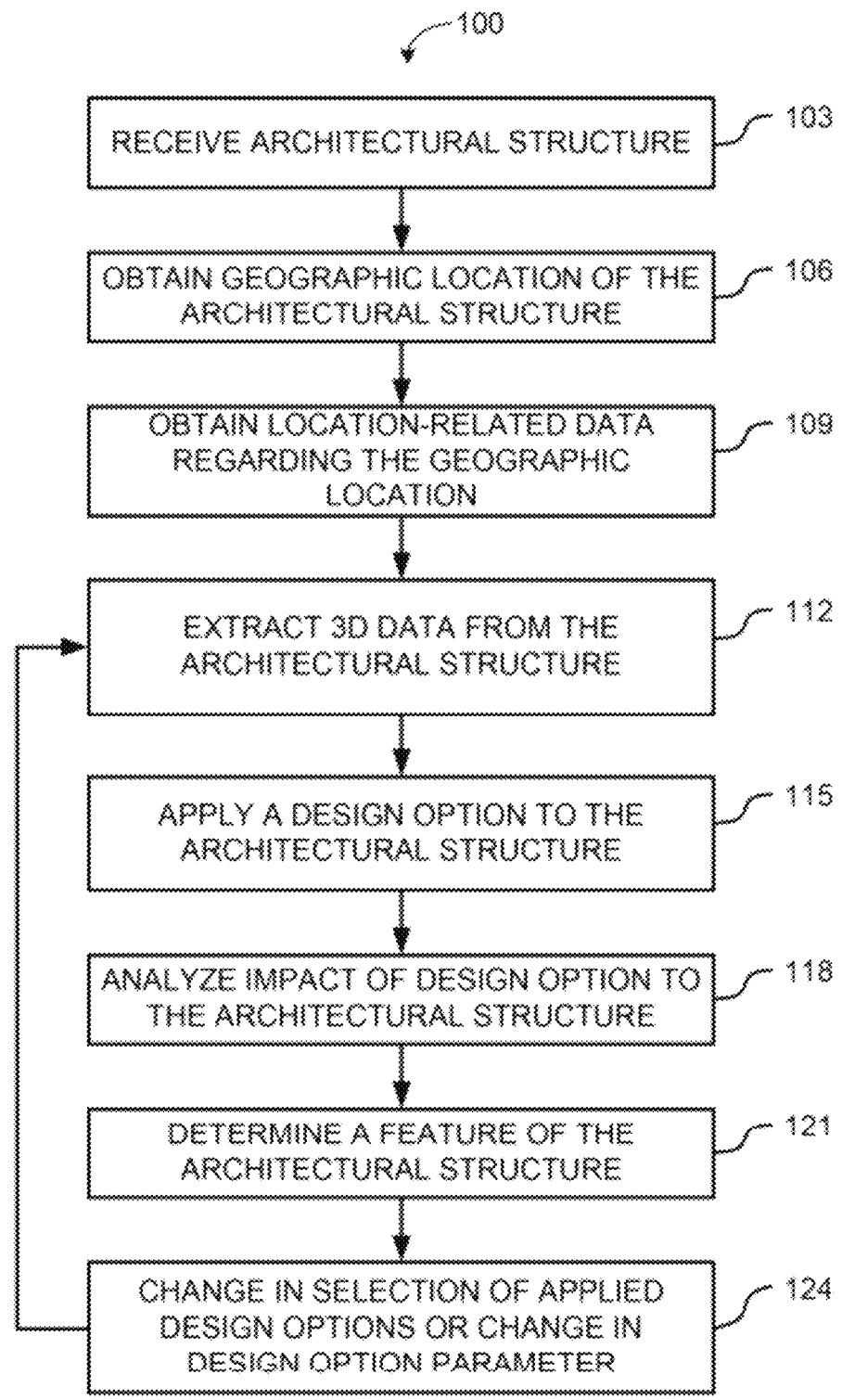
FIG. 1A is a flowchart illustrating an example method in accordance with an embodiment of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE
EMBODIMENTS OF THE INVENTION

The present invention is directed toward systems and methods for analyzing and designing an architectural structure. For example, certain systems in accordance with the present invention are configured to receive, from a designer (e.g., architect), a three-dimensional (3D) concept/initial design (i.e., model) for an architectural structure (e.g., office building), and analyze the design in the context of suggested and applied design options (also referred as design strategies) that improve aspects of the architectural structure. The 3D concept design may have been created with a 3D design tool, such as Google® SketchUp, and, as such, may involve importation into the system before it can be analyzed. Additionally, subsequent to importing the 3D concept design into the system, some embodiments may perform a series of operations in preparation for analyzing the concept design, and in preparation for applying design options to the concept design.

In one embodiment, the architect may place the architectural structure on a world map based on latitude and longitude coordinates (i.e., geographic coordinates) or postal address. By obtaining the geographic location of the architectural structure, certain embodiments of the invention are able to obtain various location-related data for the geographic location. Such location-related data may include, for example, (i) climate data (e.g., rainfall, solar insolation, prevailing winds, typical meteorological year—TMY, future weather estimates) for the geographic location; (ii) altitude information for the geographic location; (iii) resource and utility options available at the geographic location (e.g., water source, energy source); (iv) data about surrounding and neighboring architectural structures, (v) environmental information for the geographic location; and (vi) zoning and code data at and around the geographic location (e.g., recommendations by standards boards for the location, financial information such as local currency, local tax information). Additional location-related data may include physical structures in the vicinity of geographic location, path of the sun throughout the year for the geographic location, weather predictions for the current year and future years for the geographic location, and weather information from past years for the geographic location.

Examples of other types of location-related data include: (a) demographic information for the geographic location; development information for the geographic location (e.g., statistics of development in the area); (b) community information for the geographical location (e.g., schools, retail); (c) environmental information for the geographical location (e.g., endangered species/surrounding land types—farmland, wetlands, watercourses, EPA info); and (d) transportation options available around the geographic location (e.g., busses, subways).

Additionally, in preparation for analysis and application of design options, the embodiment may obtain certain performance criteria or operational properties of the architectural structure before performing such analysis or application. These criteria or properties may be acquired from a user or, alternatively, from a prepared listing of criteria or properties (e.g., stored within a file). Examples of operational properties include, but are not limited to, principal use of the architectural structure (e.g., house, office, apartment, library), average occupancy, start and stop time of occupancy, room types (e.g., office, auditorium, living room, kitchen, bathroom), lighting per a room (also referred to as lux levels), and calculated light distribution within the interior of the architectural structure and on the exterior of the architectural structure.

Following the preparation operations, the embodiment may perform operations in which geometric data regarding an architectural structure stored within the 3D concept design is obtained. Some embodiments perform this operation by converting the architectural structure to three-dimensional (3D) data native to the embodiment environment.

Additionally, some embodiments may further extract the architectural structure from the 3D concept design before gathering the geometric data regarding the architectural structure.

Using the geometric data and performance criteria/operational properties of the architectural structure along with location-related data, the embodiment may suggest and apply design options to the architectural design that improve aspects of its construction or performance. For example, with the application of select design options, the embodiment may analyze and determine that the selected design options would result in certain features for the architectural structure that lower construction cost, lower operational cost, lower maintenance cost, increase compliance or rating with a building standard or certification system (e.g., LEED®, CSH, BREEAM), or improve sustainability. Design options include, but are not limited to, a change to: (i) the architectural structure; (ii) an equipment choice for the architectural structure (e.g., water heating, fan/pump/motor); (iii) an energy source choice (e.g., nuclear, coal, gas, off-site renewable, on-site renewable, wind turbines, fuel cells, solar, and hydropower) for the architectural structure; (iv) a water source choice (e.g., rainwater, water main) for the architectural structure; (v) a heating choice for the architectural structure; (vi) a cooling choice for the architectural structure; and (vii) a construction choice for the architectural structure (e.g., construction type, wall type, fenestration type, roof type, insulation).

Furthermore, within certain embodiments, sets of selected design options may be grouped together as a design concept, where, through a design concept, a given architectural structure may have a plurality of different design concepts applied to it and then analyzed. Additionally, in some embodiments, different design concepts may be individually applied to a given architectural structure, analyzed for their individual impact/benefit on the architectural structure, and compared against each other. Overall, through the use of design options and design concepts, a user is able to develop custom design concepts that meet the desired goals and objectives of the architectural project.

Figure 9:
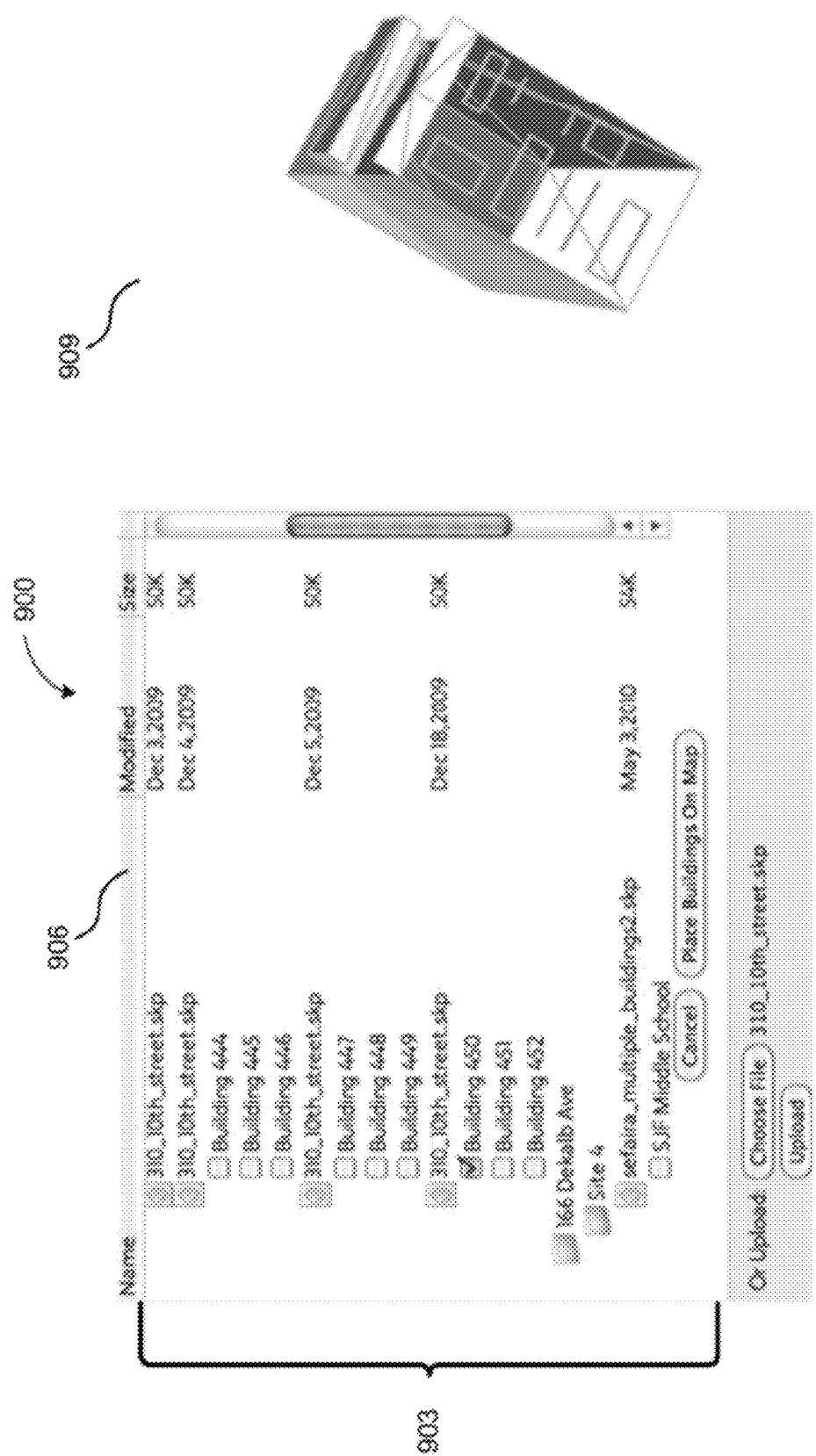
FIG. 9 is a screenshot illustrating an example operation for selecting one or more architectural structures for a project site in accordance with an embodiment of the present invention.

FIG. 1A provides an illustration of a method 100 for analyzing and designing an architectural structure in accordance with one embodiment of the present invention. The method 100 begins at operation 103, where an architectural structure is received for analysis and processing. As described above, the architectural structure may originate from a 3D concept design (e.g., Google® SketchUp), which may contain one or more architectural structures from which a user may select to analyze. Where a 3D concept design comprises a plurality of architectural structures, the architectural structure is considered received by method 100 when a user selects at least one architectural structure for processing. More with respect to selecting an architectural structure is discussed with respect to FIG. 9 of this document.

Subsequent to receiving the architectural structure, method 100 obtains the geographic location of the architectural structure at operation 106. For example, the geographic location may be obtained once a user places an architectural structure at a location on a geographic map (e.g., world map). In other examples, this may occur when a user defines a project site for the architectural structure and places the structure on the project site. Once the project site is defined, the geographic coordinates for the project site provide the geographic location of the architectural structure. More with respect to obtaining a geographic location and defining a project site is discussed later with respect to FIGS. 6-8 of this document.

Using the geographic location, operation 109 obtains location-related data regarding the geographic location. As noted above, such location-related data may include, among other things, (i) climate data (e.g., rainfall, solar patterns, prevailing winds) for the geographic location, (ii) altitude information for the geographic location, (iii) resource and utility options available at the geographic location (e.g., water source, energy source), (iv) data about surrounding and neighboring architectural structures, environmental information for the geographic location, zoning and code data at and around the geographic location, (v) demographic information for the geographic location, (vi) development information for the geographic location, and transportation options available around the geographic location. After reading this description, those of ordinary skill in the art would appreciate that other location-related data may also be utilized by an embodiment in accordance with the invention.

Method 100 continues by extracting 3D geometric data from the architectural structure at operation 112. In some embodiments, the architectural structure comprises a plane, a wall, or a fenestration (e.g., window, doorway, etc.). Accordingly, in such embodiments, the geometric data gathered is from the planes, walls, and fenestrations of the architectural structure.

In some embodiments, the method extracts the 3D geometric data from the architectural structure into an architectural structure model object that is used to store the 3D geometric data and other related data gathered from an architectural structure. For example, where the architectural structure received at operation 103 originates from a 3D concept design created using a 3D design tool, such as Google® SketchUp, the 3D concept design (e.g., SketchUp file) may be first parsed to extract the desired 3D geometric data of the architectural structure. In some embodiments, this parsing may be utilized to minimize the amount of geometric data that needs to be analyzed by the embodiments for a given architectural structure. For example, the parsing may filter out artifacts within the 3D conceptual design that have little to no bearing on the architectural structure's performance aspects (e.g., energy performance) being analyzed by the embodiments (e.g., steps inside a building, parked cars, and driveways would be filtered during extraction of geometric data from the 3D conceptual design), and further simplify the 3D geometric data extracted from an architectural structure, thereby reducing the analysis (i.e., computational) time.

Figure 1B:
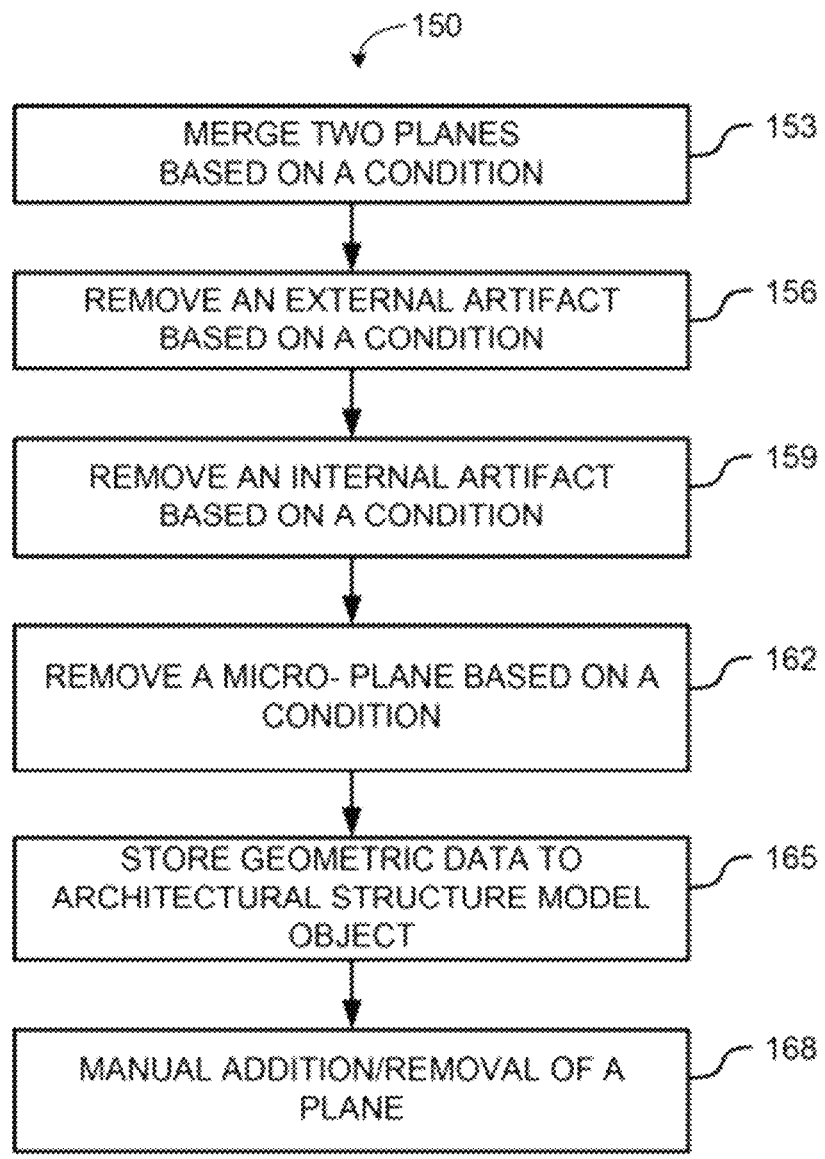
FIG. 1B is a flowchart illustrating an example extraction method in accordance with an embodiment of the present invention.

FIG. 1B illustrates an example extraction method 150 in accordance with an embodiment of the present invention. Specifically, method 150 illustrates an example method for simplifying 3D geometric data extracted from an architectural structure stored within a 3D conceptual design (e.g., originating from a 3D design tool). Method 150 begins with operation 153, where two or more planes are merged together based on a condition. For example, two or more planes may be merged when they are adjoining planes and they are coplanar within acceptable numerical tolerance. In another example, two or more planes may be merged when they are adjoining planes have the same material textures applied to them. It should be noted that in some embodiments the conditions utilized by the method 150 are implemented as rules.

During operation 156, an external artifact is removed from the 3D geometric data based on a condition. An external artifact may, for example, be a plane external to the architectural structure (e.g., driveway, bush, fence, etc.). In some embodiments, external artifacts are those artifacts outside the architectural structure that have little to no bearing on the architectural structure's performance aspects (e.g., energy performance) being analyzed by an embodiment.

Next, during operation 159, an internal artifact is removed from the 3D geometric data based on a condition. An internal artifact may, for example, be a plane internal to the architectural structure (e.g., internal walls, stairwells, etc.). In accordance with some embodiments, internal artifacts are those artifacts inside the architectural structure that have little to no bearing on the architectural structure's performance aspects (e.g., energy performance) being analyzed by an embodiment.

At operation 162, a micro-plane is removed from the 3D geometric data based on a condition. In some embodiments, a micro-plane is a plane considered subordinate to a another plane. Depending on the embodiment, the micro-plane may be defined by the condition itself, and the condition may be user-defined. For example, a micro-plane may be defined by the percentage of total number of planes.

At operation 165, the 3D geometric data is stored within an architectural structure model object. Additionally, because some architectural structures have windows which are nested inside walls and the walls are further nested inside planes, in some embodiments the architectural structure model object comprises a data tree, such as a quadtree (i.e., a data tree with exactly four children), that can be utilized to partition two-dimensional (2D) space such that properties regarding the architectural structure can be efficiently retrieved.

Following operation 165, at operation 168 method 150 allows a user to manually add or remove a plane from the 3D geometric data as stored within the architectural structure model object. Depending on the embodiment, operation 168 may be optional and be utilized by a user to add or remove planes that preceding operations (e.g., 156, 159, 162) missed.

Continuing with reference to FIG. 1A, once the 3D geometric data extracted, operation 115 applies a design option to the architectural structure. As noted before, a design option may include, but is not limited to, a change to the architectural structure, to an equipment choice for the architectural structure, to an energy source choice for the architectural structure, to a water source choice for the architectural structure, to a heating choice for the architectural structure, to a cooling choice for the architectural structure, and to a construction choice for the architectural structure. In some embodiments, the application of a selected design option to a given architectural structure may be the result of a user applying the selected design option to a plurality of the architectural structures on a project site, and the given architectural structure is one of the plurality. Additionally, in some embodiments, applying a design option to an architectural structure entails mapping the design option to the 3D geometric data of the architectural structure (e.g., mapping a design option parameter to a geometric element of the architectural structure). Also, it should be noted that in some embodiments, in addition to predefined design options, the system provides user with the ability to create and apply custom design options to architectural structures as well. More with respect to applying design options is discussed later with respect to FIGS. 2, 15 and 16 of this document.

Further, design option in some embodiments may comprise a design option parameter configured to control the amount of change effectuated by the design option to the architectural structure. Effectively, such design option parameters allow a user to adjust and modify how a design option impacts an architectural structure. With respect to those embodiments using design concepts, where a design option is applied as part of a plurality of design options within a design concept, the design concept may comprise variables (i.e., design concept variables) that store the adjusted values for the parameters of design options contained therein. In doing so, the user is provided the ability to apply a preconfigured set of design options to a number of architectural structures. More with respect to adjusting design option parameters is discussed later with respect to FIG. 17 of this document.

In addition to the design option parameters, in some embodiments, a user is also able to edit and adjust structure properties of an architectural structure. Structure properties include, but are not limited to, those relating to an operation of the architectural structure, a resource associated with the architectural structure, an equipment item associated with the architectural structure, or construction of the architectural structure. Specific examples of operation structure properties include occupancy, times of occupancy, room types, and principal use. Specific examples of resource structure properties include energy source options, cooling options, heating options, water options, and other utility choices. Specific examples of equipment structure properties include equipment efficiency types (e.g., coefficient of performance (COP), energy efficiency ratio (EER), seasonal EER, heating seasonal performance factor (HSPF)), lighting density (i.e., lux), equipment power density, and other fixtures used in the architectural structure. Specific examples of construction type include structure type (e.g., concrete), wall type (e.g., curtain) fenestration type (e.g., single glass window), roof type (slope frame), floor type (e.g., low weight concrete), fill in insulation (e.g., polyisocyanurate), insulation (e.g., blanket), floor finish (e.g., wood, tile), color of interior walls, thermal mass, thermal transmissivity, and reradiating properties of construction materials. More with respect to editing and adjusting structure properties is discussed later with respect to FIGS. 10, and 18-21 of this document.

Next, during operation 118, method 100 analyzes the impact of applying the design option to the architectural structure. When analyzing the impact of an applied design option, certain embodiments take into consideration the 3D geometric data of the architectural structure and the location-related data. For example, in some embodiments, analyzing the impact of a design option on an architectural structure may comprise utilizing a formula to calculate the effects of the design option on the architectural structure. For a given design option being applied to an architectural structure, a formula being used to analyze the impact of the applied design option on the architectural structure may utilize the design option parameters, location-related data, 3D geometric data, structure properties, or some combination thereof. For example, with respect to location-related data, information regarding neighboring buildings could be useful in determining if any of the buildings surrounding an architectural structure cast a shadow on the architectural structure, or alternatively, abut the architectural structure such that a wall of the architectural structure is blocked from sun light. By taking such information into account, a formula or collection of formulae being evaluated under operation 118 can more accurately determine what impacts selected heating-related and cooling-related design options have on the architectural structure.

Furthermore, when analyzing the impact of an applied design option, some embodiments are configured to make certain informed assumptions during the analysis operation. By doing so, such embodiments are capable of providing an estimated impact analysis in less amount of time than more accurate, detail-orientated embodiments (i.e., embodiments that make fewer assumptions or no assumptions when analyzing). More with respect to the analysis is discussed later with respect to FIGS. 2A-2F of this document.

At operation 121, method 100 concludes with the determination of features present in the architectural structure based on the analysis performed during operation 118. Such features include, but are not limited to, (i) energy consumption of the architectural structure, (ii) water consumption of the architectural structure, compliance of the architectural structure with a construction standard, (iii) a thermal characteristic of the architectural structure, (iv) carbon footprint of the architectural structure, (v) indoor environment quality of the architectural structure, (vi) a construction material utilized in the architectural structure, (vii) an equipment item utilized by the architectural structure, (viii) a construction cost of the architectural structure, (ix) an operational cost of the architectural structure, and (x) a maintenance cost of the architectural structure.

Further, with respect to features and compliance of building and architectural standards/certifications, some embodiments of the present invention can provide a standards/certification rating (i.e., score or points) for the architectural structures based on the impact of selected design options applied to the architectural structure. For example, in the context of sustainability, applied design options directed toward improving sustainability may affect the architectural structure's compliance or rating with respect to well-known green rating/certification systems, such as LEED®, CSH, or BREEAM. More with respect to features and certifications is discussed later with respect FIGS. 2A, 12-14 of this document.

Continuing with operation 124, in some embodiments, the operations of 115, 118 and 120 are repeated, sometimes at real or near-real time, either when a user selects or deselects a design option for application to the architectural structure, or when a user changes a design option parameter. For example, if a user were to deselect a particular design option that is currently being applied to the architectural structure, operations 115, 118, and 120 would be performed again, and the results outputted by those operations would be updated accordingly. Additionally, as noted before, a change in selection of applied design options or a change in parameter for a given design option may have an impact on other design options currently being applied. By re-performing operation 115, 118, and 120, embodiments can ensure that a change to a given design option will be properly and appropriately cascaded to other applied design options impacted by the given design option. More with respect to design option selection and de-selection is discussed later with respect FIGS. 15 and 16 of this document.

Figure 2A:
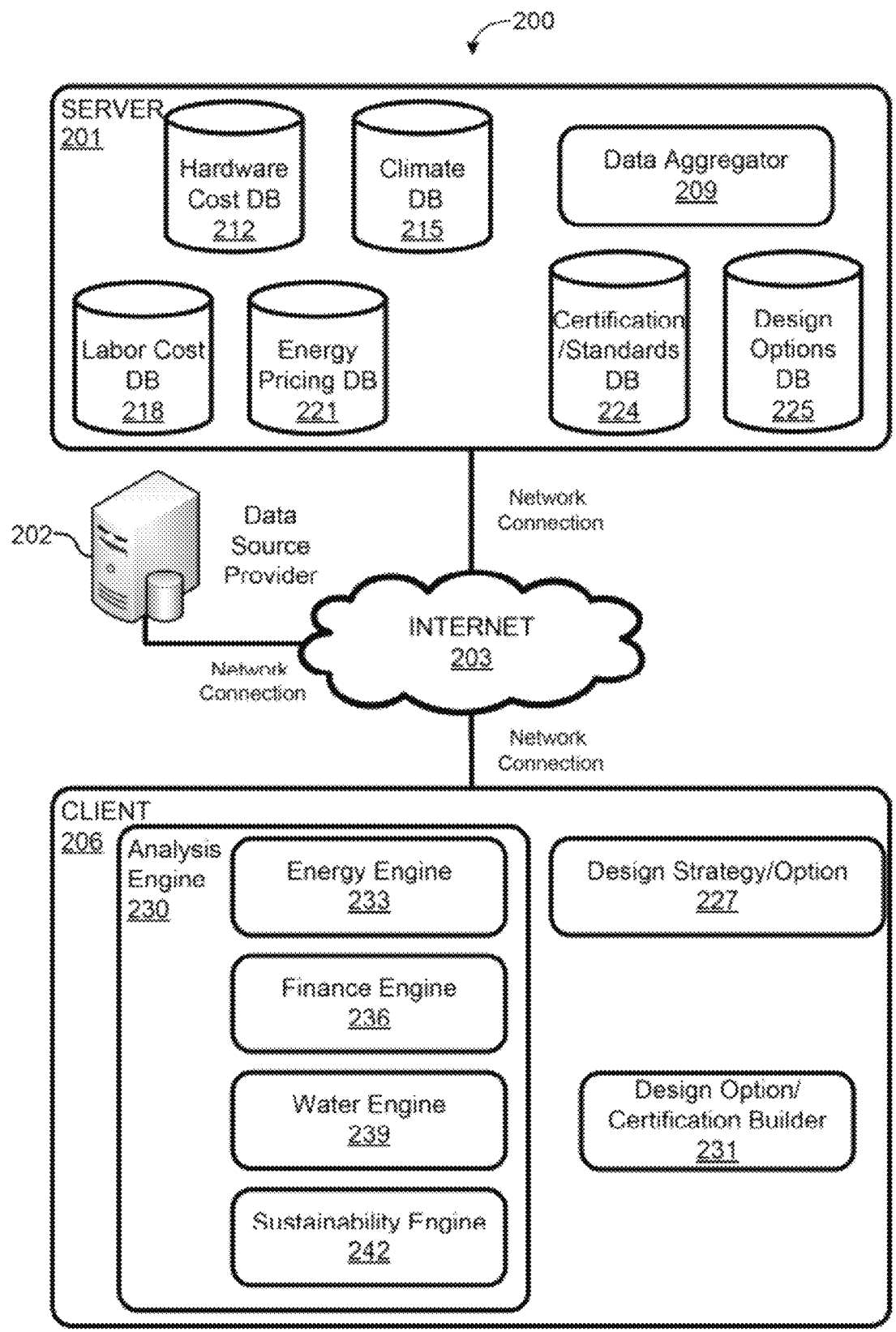
FIG. 2A is a diagram illustrating an example system in accordance with an embodiment of the present invention.

FIG. 2A is a diagram illustrating an example system 200 in accordance with an embodiment of the present invention. The illustrated system 200 comprises a server 201, a client 206, and a data source provider 202, all connected to each other through the Internet 203. Although the illustrated system 200 is shown using the Internet 203 as its method for communication, it would be well understood by those of skill in the art that system 200 could be implemented entirely on a private network (e.g., intranet) or any other communication network (e.g., extranet) in accordance with other embodiments of the present invention.

The illustrated example server 201 comprises a data aggregator 209, multiple databases (hardware cost 212, climate 215, labor cost 218, and energy pricing 221) that collectively store the data source/knowledge-base information used during impact analysis of design options and feature determination (e.g., operations 118 and 120), the design options database 225 that stores available design options (both, those that are predefined and those that are user-created), and a certification/standards database 224 that stores information that utilized when evaluating an architectural structure's compliance or rating in view of a given certification or standard (e.g., LEED® score, determined as a feature of the architectural structure). Particularly, in some embodiments, the information stored on the certification/standards database 224 is utilized to map the impacts of selected design options to specific considerations of a given certification or standard.

In the illustrated embodiment, the data aggregator 209 is utilized by the server 201 to automatically scrape (i.e., gather) data for the data source/knowledge-base databases (212, 215, 218, 221), from one or more data source providers 202. Examples of data source providers from which the data aggregator 209 can collect data may include: the U.S. Department of Energy for commercial building information (e.g., electric use, natural gas use, and use intensities); the Bureau of Labor Statistics (BLS) for labor information (e.g., costs); the Environmental Protection Agency (EPA) for local environmental information; local transit databases for community transportation options and locations; the U.S. Energy Information Administration (EIA) for current energy prices and projections; and the National Oceanic and Atmospheric Administration (NOAA)/National Weather Service for climate data; and National Renewable Energy Lab for solar and temperature data information. Depending on the embodiment, once the data is retrieved from a specific source (e.g., Bureau of Labor Statistics), it is mapped and stored to an appropriate database (e.g., labor cost database 218) for retrieval during design option impact analysis operations and feature determination operations. More with respect to data aggregators is discussed later with respect to FIG. 2G.

Continuing with reference to FIG. 2A, client 206 is configured with an analysis engine 230, which is responsible for analyzing the impact of selected design options on an architectural structure in accordance with embodiments of the present invention. To assist in its analysis, the analysis engine 230 comprises an energy analysis engine 233, a finance analysis engine 236, a water analysis engine 239, and a sustainability engine 242, a design option/option module 227, and a design option/certification builder 231.

The energy analysis engine 233 is responsible for analyzing the energy impact caused on the architectural structure by the selected design options. According to some embodiments, the energy analysis engine 233 may utilize a model such as the Radiant Time Series Method, which can be performed based on: hour-by-hour simulation, complete envelope and vent analysis, daylighting and shading, customizable schedule, or Heating, Ventilating, and Air Conditioning (HVAC) sizing and usage. In additional embodiments, the energy analysis engine 233 may utilize standards and codes such as American Society of Heating, Refrigerating and Air Conditioning Engineers (ASHRAE) Standard 90.1 (Energy Standard for Buildings Except Low-Rise Residential Buildings), Standard 189.1 (Standard for the Design of High-Performance Green Buildings), or Standard 62 (Ventilation for Acceptable Indoor Air Quality); California Title 24 (California's Energy Efficiency Standards for Residential and Non-residential Buildings); Part L United Kingdom (UK) Building Standard; PassivHaus; International Energy Conservation Code; or extended local (regional) codes. With respect to validation, analysis engine 233 may utilize eQUEST® 3.63b (DOE 2.2), which is based on ASHRAE 140 ("Standard Method of Test for the Evaluation of Building Energy Analysis Computer Programs").

Figure 2B:
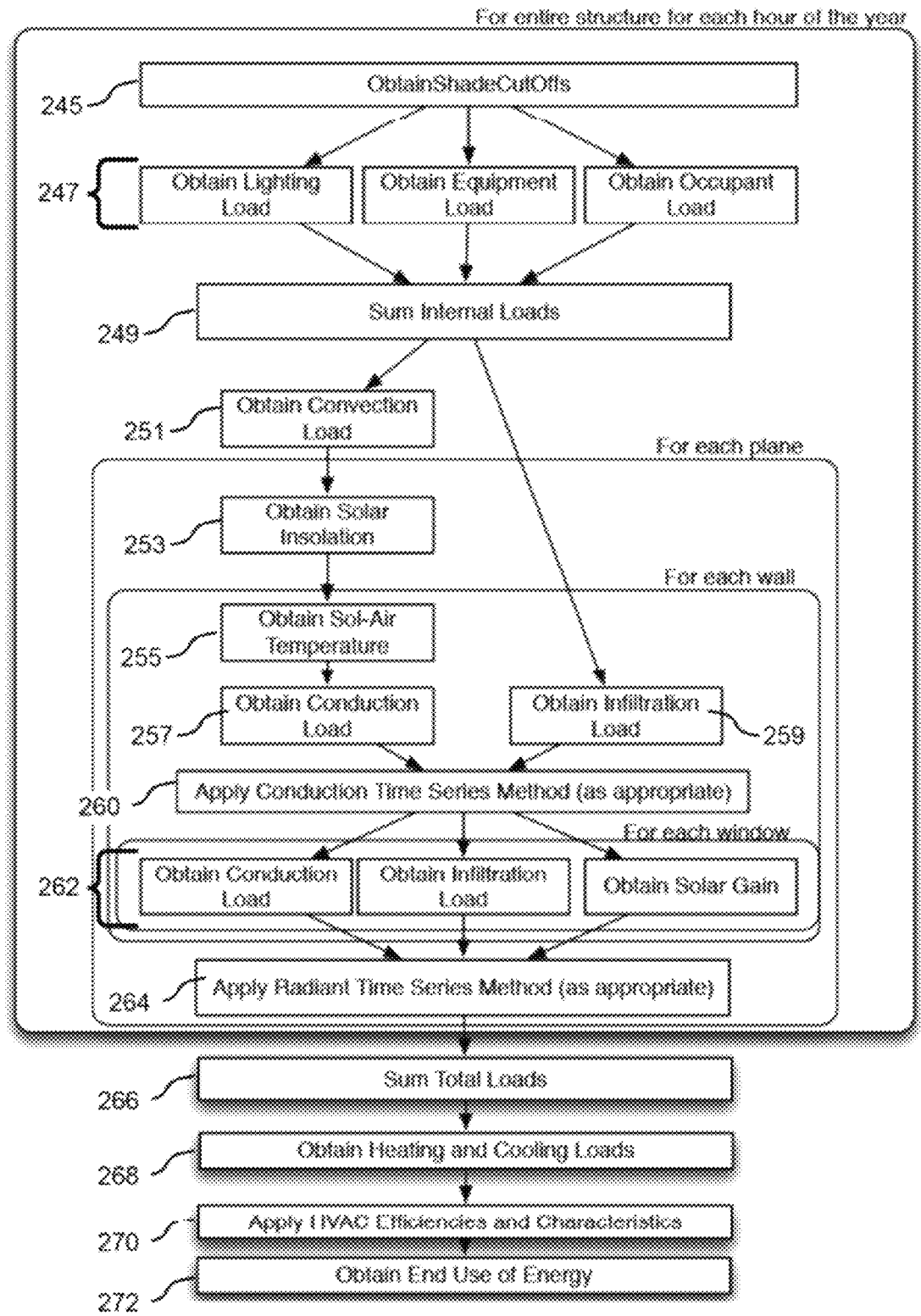
FIG. 2B is a flowchart illustrating an example energy analysis engine in accordance with an embodiment of the present invention.

Turning now to FIG. 2B, provided is a flowchart of an example energy analysis engine (e.g., 233) in accordance with an embodiment of the present invention. As illustrated, for a given architectural structure, the energy analysis engine performs the following operations for each hour of a given year. After obtaining the shade cut offs for the given architectural structure (operation 245), the energy analysis engine obtains the lighting load, equipment load and occupant load for the given architectural structure (operation 247). These are then summed up as the internal load at operation 249.

Next, after obtaining the convection load for the given architectural structure at operation 251, the energy analysis engine obtains: the solar insolation for each plane within the given architectural structure based on the convection load (operation 253); the sol-air temperature for each wall based on the solar insolation (operation 255); the conduction load of each wall based on the sol-air temperature (operation 257); and the infiltration load of each wall, at operation 259, based on the sum of internal loads (calculated at operation 249). Using the conduction load of operation 257 and the infiltration load of operation 259, the analysis engine applies the Conductive Time Series Method to each wall as appropriate (operation 260). Operation 262 uses the results of the Conductive Time Series Method for each wall to obtain, for each window of each wall, a conduction load, infiltration load, and solar gain (operation 262). The foregoing information is then utilized in the Radiant Time Series Method to obtain the load of each plane of the architectural structure (operation 264). The resulting loads from operation 264 and operation 249 are summed up in operation 266. Next, the energy analysis engine obtains the heating and cooling loads for the given architectural structure at operation 268. Subsequently, the energy analysis engine applies Heating, Ventilating, and Air Conditioning (HVAC) efficiencies and characteristics to the obtained heating and cooling loads at operation 270, and uses the results of this application to obtain the end use of energy for the given architectural structure at operation 272.

Returning to FIG. 2A, the finance analysis engine 236 is responsible for analyzing the cost impact (e.g., operational costs, maintenance costs, monthly costs, yearly costs, installation costs) caused on the architectural structure by the selected design options. According to some embodiments, the energy analysis engine 233 may utilize models relating to payback analysis, parameterized cost, installation cost analysis, or operation and maintenance cost analysis.

Continuing with reference to FIG. 2A, the water analysis engine 239 is responsible for analyzing the water-related impacts caused on the architectural structure by the selected design options. According to some embodiments, the water analysis engine 239 may utilize a rainwater model, a greywater model, an irrigation requirements model, a stormwater model, a model based on cistern sizing, or a model based on rainwater capture area sizing.

Figure 2C:
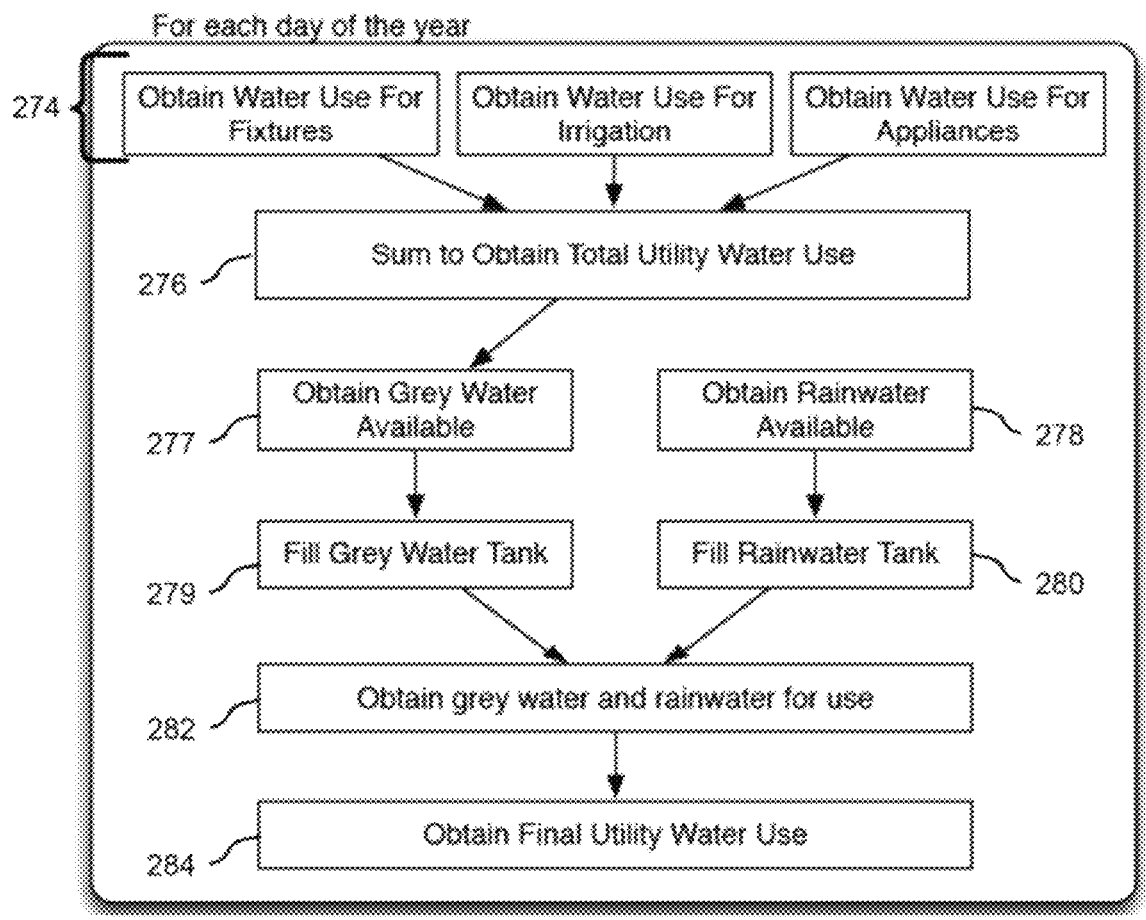
FIG. 2C is a flowchart illustrating an example water analysis engine in accordance with an embodiment of the present invention.

Referring now to FIG. 2C, provided is a flowchart of an example water analysis engine (e.g., 239) in accordance with an embodiment of the present invention. As illustrated, for a given architectural structure, the water analysis engine performs the following operations for each day of a given year. At operation 274, the water analysis engine obtains the water use of fixtures, irrigation, and appliances for a given architectural structure, and sums up the total utility water usages at operation 276. From this total, based on its total water as calculated at operation 276, the water analysis engine obtains the greywater available to the given architectural structure (operation 277); this available greywater is filled into the greywater tank at operation 279. Similarly, operation 278 obtains the rainwater available to the given architectural structure, which the water analysis engine then fills into the rainwater tank at operation 280. Operation 282 obtains the total greywater and rainwater available for use based on operations 279 and 280.

The water analysis engine concludes by obtaining the final utility water usage for the given architectural structure at operation 284.

Returning to FIG. 2A, the sustainability engine 242 is responsible for evaluating the compliance or rating of the architectural structure based on the impact of selected design options. According to some embodiments, the sustainability engine 242 may utilize models relating to carbon footprint analysis, embedded carbon analysis, resource mix analysis, onsite generation analysis (e.g., wind or photovoltaic-based power), or Combined Heat & Power (CHP) feasibility analysis. With respect to certification standards, in additional embodiments, the sustainability engine 242 may utilize standards and ratings based on Leadership in Energy & Environmental Design (LEED®) NC 2009, Code for Sustainable Homes (CSH), Building Research Establishment Environment Assessment Method (BREEAM), PassivHaus, or Net Zero Energy Building.

FIG. 2D is a table illustrating an example calculation of certification credit in accordance with an embodiment of the present invention. According to some embodiments of the present invention, the table of credit calculations illustrates how a credit, rating or score for a given architectural structure may be calculated by a sustainability engine (e.g., 242) in view of a given certification or standard. As illustrated, for each (energy, water, material, surface, waste, pollution, health, management, and ecology) scoring factor listed in the table, there exists an available amount of credit, a predicted amount of credit based on the analysis provided (e.g., by various analysis engines), the weight of the scoring factor to the overall calculation, and the actual points scored based on the predicted score multiplied by the scoring factor weight. In the illustrated embodiment, the table suggests that the total predicted score for the given architectural structure would be 76.49. In some embodiments, calculations such as these could be utilized by a sustainability engine when determining an architectural structure's compliance or rating with respect to a selected certificate or standard that has similar scoring factors.

Figure 2E:
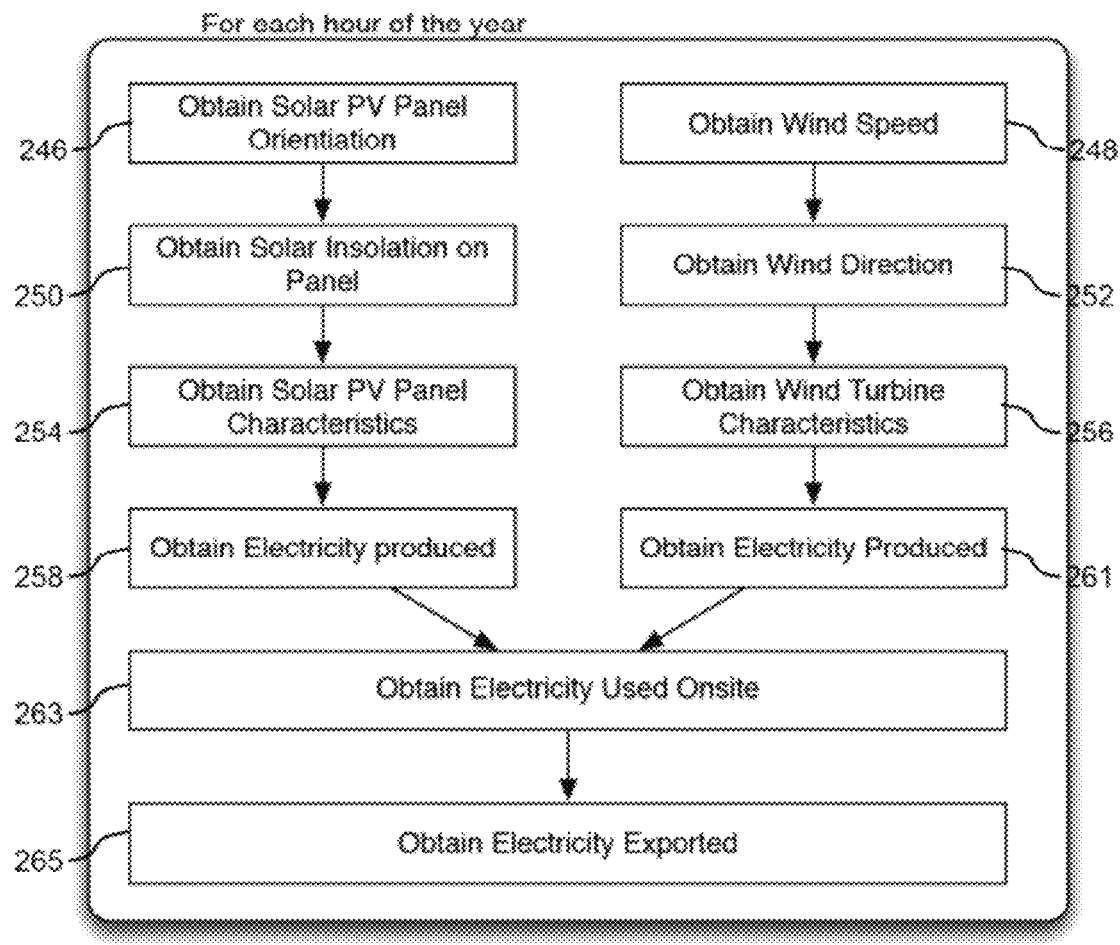
FIG. 2E is a flowchart illustrating an example onsite generation analysis engine in accordance with an embodiment of the present invention.

Although not shown in FIG. 2A, in some embodiments the analysis engine 230 may further comprise an onsite generation analysis engine used to determine the impacts of design options relating to onsite power generation (e.g., wind or photovoltaic-based power). For example, FIG. 2E provides a flowchart of an example onsite generation analysis engine in accordance with an embodiment of the present invention. Referring now to FIG. 2E, for each hour of a given year, the onsite generation analysis engine performs the following operations. For a solar photovoltaic (PV) panel, the example onsite generation analysis engine first obtains the solar photovoltaic (PV) panel orientation (operation 246), the solar insolation on the solar PV panel (operation 250), the characteristics of the solar PV panel (operation 254), and the electricity produced by the solar PV panel (operation 258). With respect to the wind, the onsite generation analysis engine obtains the wind speed (operation 248), the wind direction (operation 252), the characteristics of the wind turbine for the architectural structure (operation 256), and the electricity produced by the wind turbine (operation 261). Subsequently, at operation 263, the onsite generation analysis engine obtains the electricity used by either the given architectural structure or, alternatively, the entire site upon which the given architectural structure resides. Using the calculated total electricity usage of operation 263, the electricity produced by the solar PV panel as calculated by operation 258, and the electricity produced by the wind turbine as calculated by operation 261, at operation 265, onsite generation analysis engine, is able to obtain the total electricity available from the onsite power generation that can be exported by the given architectural structure or the site. In some embodiments, such a calculation can be used to determine the payback period for the given architectural structure.

Figure 2F:
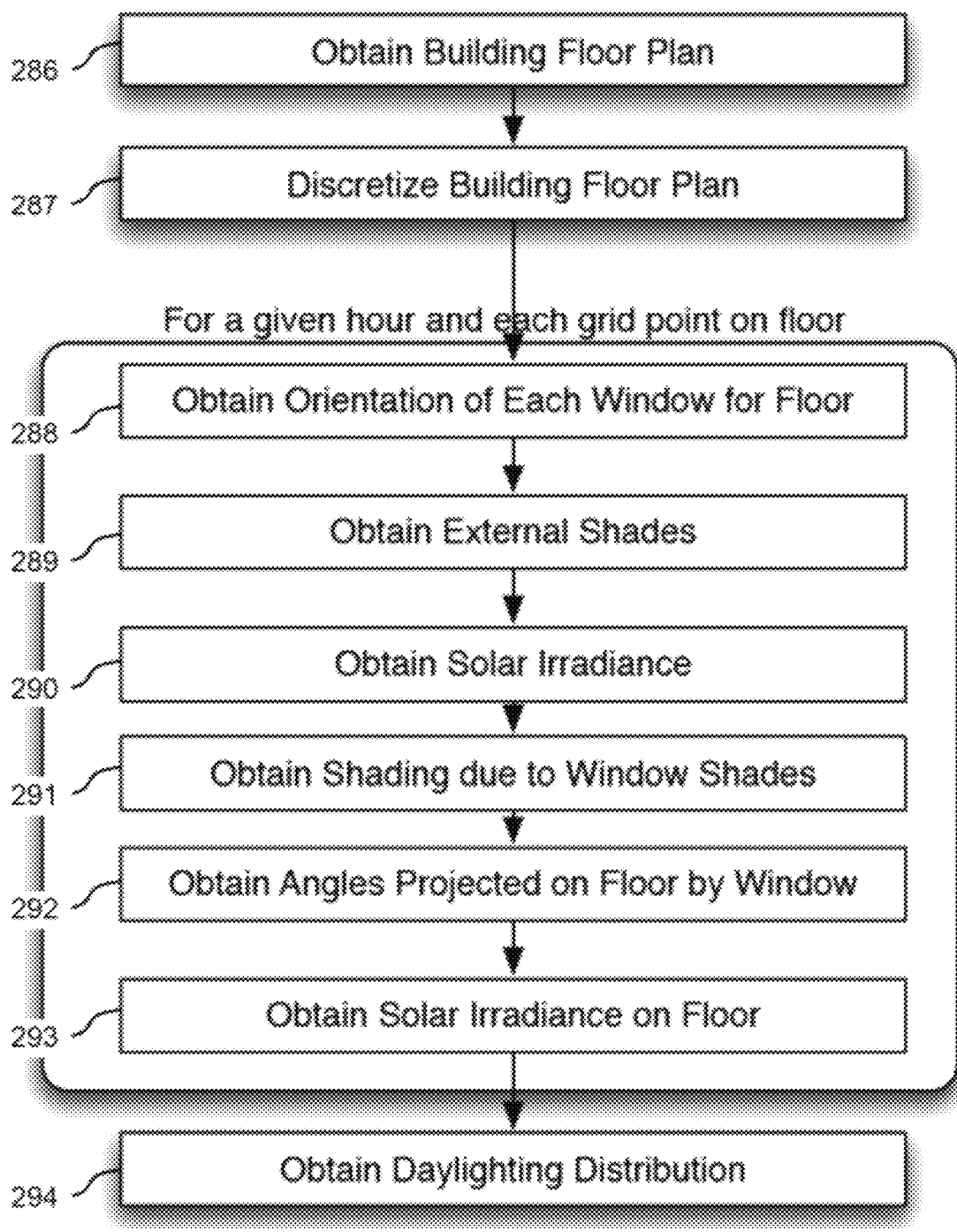
FIG. 2F is a flowchart illustrating example daylighting analysis engine in accordance with an embodiment of the present invention.

Additionally, although not shown in FIG. 2A, in some embodiments the analysis engine 230 may further comprise a daylighting analysis engine used to determine the impacts of design options based on daylight. For example, FIG. 2F provides a flowchart of an example daylighting analysis engine in accordance with an embodiment of the present invention. Referring now to FIG. 2F, the illustrated daylighting analysis engine begins at operation 286 by obtaining the floor plan for a given architectural structure, which is then discretized at operation 287. Then, for a given hour at each grid point on the discretized floor plan, the daylighting analysis engine obtains the following information based on the discretized floor plan: the orientation of each window for a given floor (operation 288); the external shades of the given architectural structure (operation 289); the solar irradiance (operation 290); the shading due to window shades (operation 291); angles projected on the floor by the window (operation 292); and the solar irradiance on the floor (operation 293). Based on the foregoing information, at operation 294, the daylighting analysis engine can obtain, for each grid point on the floor, the daylighting distribution for the given architectural structure.

Returning to FIG. 2A, in some embodiments, the analysis engine 230 may include further components such as an acoustic analysis engines used to determine the acoustics features of the architectural structure based on the applied design options; and a materials model used by the various analysis engines in determining the impacts of design options based on materials.

Additionally, in some embodiments, the design option/option module 227 facilitates: (i) access to design options stored on the design options database 225; (ii) the selection and de-selection of design options to be applied to an architectural structure; and (iii) parameter modification of design options. Meanwhile, in further embodiments, the design option/certification builder module 231 allows a user to create user-defined (i.e., custom) design options, design concepts, building certifications or standards that can later be applied to or evaluated against architectural structures.

Furthermore, in some embodiments, example cost model formulae such as the following may be utilized by analysis engines in accordance with the present invention:

| Component | Function (All SI Units) |
|---|---|
| Base Cost | (323 + 5 * wallType) * floorArea |
| Insulation Cost | (10.76 * 7.888 * rValue + 4.540) * totalWallArea |
| Lighting Cost | (40 − LPD)/10 * floorArea * 14.0/5 |
| Equipment Cost | 1.4 * (40 − EPD) * floorArea |
| Window Cost | (8.7 * window Area + 47.76) * window Area + 300123/(window area * window shgc) + 900143* window rValue/window Area |
| External Projections | 328 * total Shading Length |
| Cooling Equipment Cost | 900 * maximum cooling demand * COP/3517 |
| Heating Equipment Cost | 1203.2 * COP* COP |
| Water Fixture Cost | 1.6 * 30/(water closet flow * 266.66) * water closet count + 1.6 * 30/(shower flow rate * 266.66 * 60) * shower count + 1.6 * 30/(kitchen faucet flow * 266.66) * kitchen faucet count + 1.6 * 30/(lavatory faucet * 266.66 * 60) * lavatory count |
| Appliance Cost | 800 * 30/(dishwasher flow * 266.66) * dishwasher count + 800 * 30/(clothes washer flow * 266.66) * clothes washer count |
| Greywater cost | 52500/12000 * tankSizeGrey |
| Rainwater Cost | 33000/25000 * tankSizeRain |
| Irrigation Cost | 16500/95 * irrigation efficiency |

Example cost components taken into consideration by these and other cost model formulae may include, but are not limited to, the following: in terms of finish types, sub flooring, finish flooring, and interior walls; in terms of the structure, foundation type, framing, insulation, exterior, roof, and wall type; in terms of glazing, glazing type, framing type, and operable type; in terms of mechanical, electrical and plumbing (MEP), cooling, air handler, heating, plumbing, fixtures, and hot water; in terms general components, floor area, number of floors, and building size; and in terms of domestic water, fixtures, rainwater capture, plumbing, greywater storage tank, and rainwater storage tank.

Figure 2G:
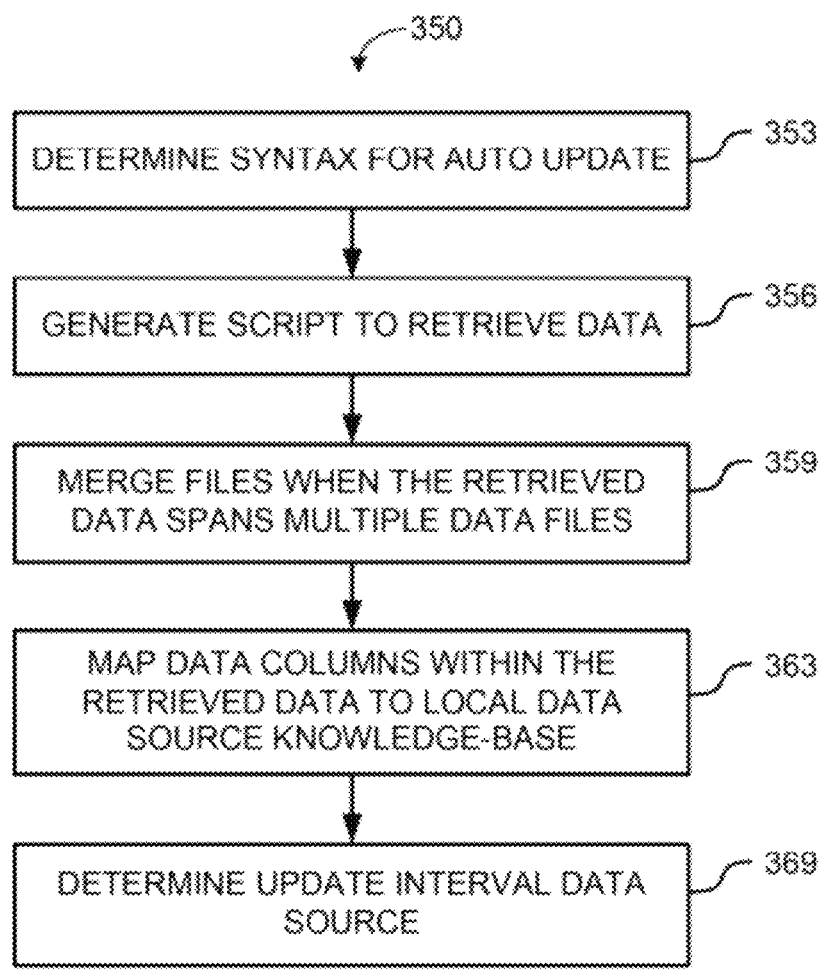
FIG. 2G is a flowchart illustrating an example data aggregation method in accordance with an embodiment of the present invention.

FIG. 2G is a flowchart illustrating an example data aggregator method 350 for automatically scraping (i.e., gathering) data from multiple data sources in accordance with an embodiment of the present invention. In particular, in some embodiments, method 350 is configured to scrape data (e.g., location-related data or cost-related data) from data source providers (i.e., hosts) residing on a public network, such as the Internet. As noted before, some examples of data source providers include the U.S. Department of Energy, the Bureau of Labor Statistics (BLS), the Environmental Protection Agency (EPA), the U.S. Energy Information Administration (EIA), and the National Oceanic and Atmospheric Administration (NOAA)/National Weather Service.

In some embodiments, in order to initiate data scraping, a user (e.g., architect) first locates a data source provider that makes available information (e.g., location-related data or cost-related data) relevant to and utilized by analysis and determination operations (e.g., 118 and 120) in accordance with certain embodiments described herein. After locating a data source provider, and downloading a sample data source file, the user selects key columns from which data will be scraped, and creates a mapping between the data source column data to a specific database that serves as the data source/knowledge-base for certain embodiments of the present invention. Depending on the data source provider, the resulting data source file may be formatted in one of many, well-known formats, such as comma or character-separate values (CSV), or a known proprietary format.

Once the setup has been completed, at operation 353, method 350 determines the syntax based on the address or universal resource identifier (URI) (e.g., universal resource locator—URL) for obtaining data and updated data from a data source provider on an automatic basis. In some embodiments, the syntax is specifically configured to access data and updated data over a network (e.g., intranet, extranet, Internet). Upon determining the address and syntax, method 350 generates a script (operation 356) that, when performed, automatically retrieves data (e.g., scrapes or downloads) data from the designated data source provider. In some embodiments, the script is a set of instructions that, when executed by a computer system, cause the processor of the computer system to perform certain operations (e.g., automatically scrape/download data from a data source provider). Depending on the embodiment, the script may take the form of a shell script (e.g., Bourne Again Shell (BASH) script, Korn Shell (KSH)

Script), interpreted script (e.g., PHP script, Ruby script, PERL script), or some compiled program (e.g., C/C++ based).

Optionally, the method 350 may perform a merge at operation 359 when the data retrieved is determined to span multiple data files and, therefore, would require a merger before its use. Next, at operation 363, method 350 creates a mapping between the data columns of the retrieved data and the data source/knowledge database utilized by certain embodiments of the present invention. For example, with respect to a data source file from the U.S. Energy Information Administration (EIA), key data columns within the data source file that contain energy pricing information will be mapped to a table within an energy pricing database (e.g., 221).

Then, at operation 369, method 350 determines the update interval for a specific data source provider. In some embodiments, this interval determination may be based on monitoring the frequency of data source updates performed by a specific data source provider, within a given period. For example, operation 369 may scrape data from a data source provider daily for one month and then, based on those daily scrapings, determine how often the data source provider updates its data on a day-to-day basis within a given month. Once the update interval has been determined, various embodiments utilize the update interval with a data aggregator (e.g., 209) to configure when the data aggregator should automatically scrape data from a specific data source provider (e.g., CRON job on a UNIX-based system).

Figure 3:
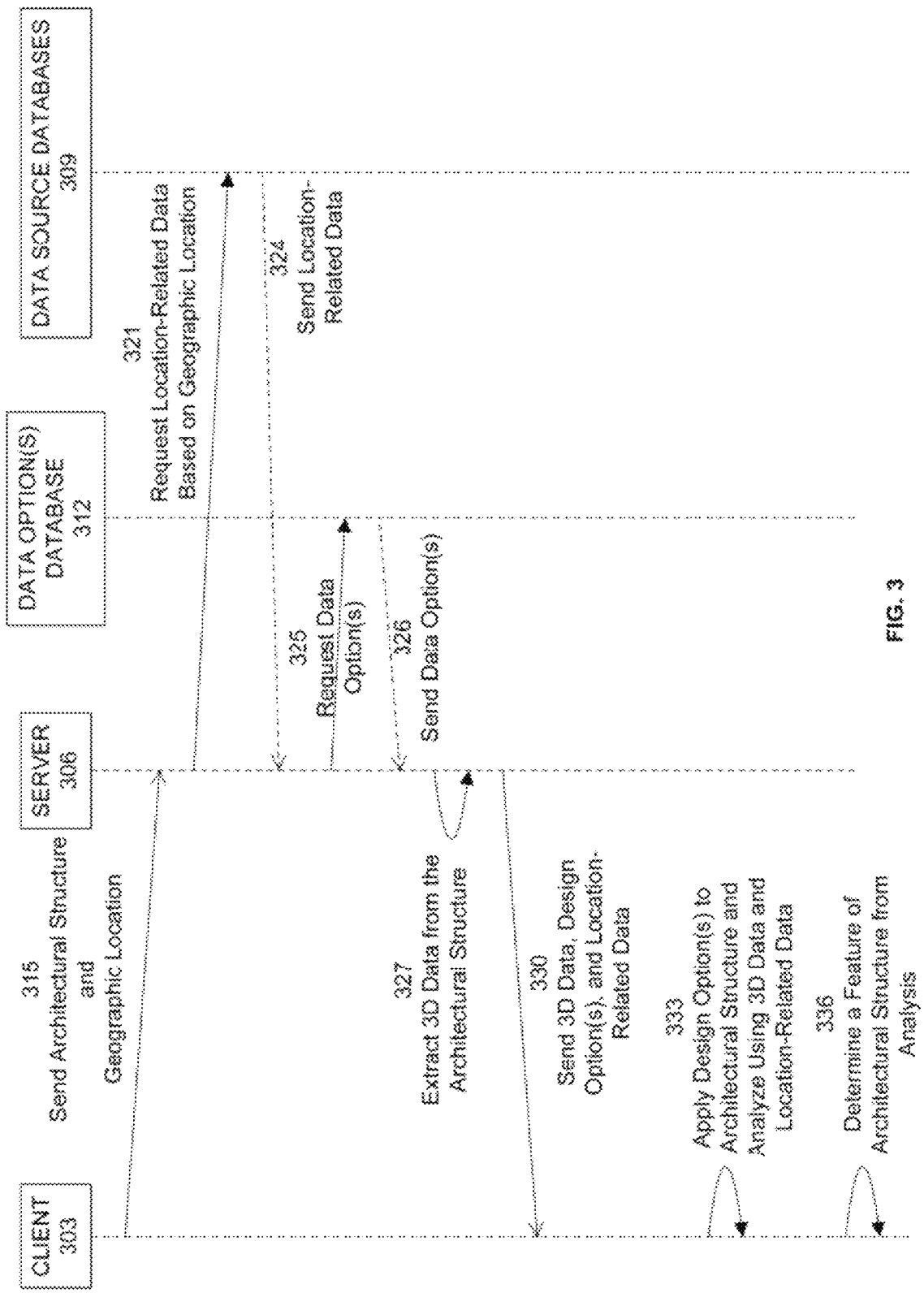
FIG. 3 is a sequence diagram illustrating the sequence of operations performed by an example system in accordance with an embodiment of the present invention.

FIG. 3 is a sequence diagram illustrating the sequence of operations performed by an example system in accordance with an embodiment of the present invention. The sequence begins with the client 303 sending (operation 315) an architectural structure and its geographical location to a server 306, which is configured to receive and process such data. As discussed earlier, the server 306 may receive a 3D concept design from the client 303, from which the server 306 is able to extract one or more architectural structures for selection. About the geographic location, the client 303 may have sent the information in the form of geographic coordinates or a mailing address, which may be selected when the project site is defined.

The server 306 processes the geographic location, and requests (operation 321), from its data source databases 309, location-related data that is based on the geographic location provided. The data source databases 309 then return (operation 324) such data to the server 306. Thereafter the server 306 requests (operation 325) from the data opinions database 312 data options that are applicable to the received architectural structure. Depending on the embodiment, the data options sent (operation 326) back to the server 306 may be predefined or user-defined.

Subsequently the server extracts (operation 327) 3D geometric data from the architectural structure received by the server 306 from the client 303. As noted before, in some embodiments, the architectural structure comprises a plane, a wall, and a fenestration, from which 3D geometric data can be gathered. Additionally, in some embodiments, the server extracts may extract 3D geometric data into an architectural structure model object, as described above with respect to operation 112 of method 100.

The server 330 then sends (operation 330) the 3D geometric data, the design options, and the location-related data to the client 303. The client 303, in turn, applies (operation 333) the design options to the architectural structure using the 3D dimensional data, and analyzes the impact of those applied design options using the 3D dimensional data and the location-related data. From the analysis data that is produced (operation 333), client 303 determines (operation 336) features of the architectural structure, such as the total cost-benefit or return-on-investment for applying the selected design options to the architectural structure.

It should be noted that although the operations illustrated in FIG. 3 are shown in a specific sequence, those of ordinary skill in the art would readily appreciate that other embodiments of the invention can implement an alternate sequence of operations without departing from the scope of the present invention.

Figure 4:
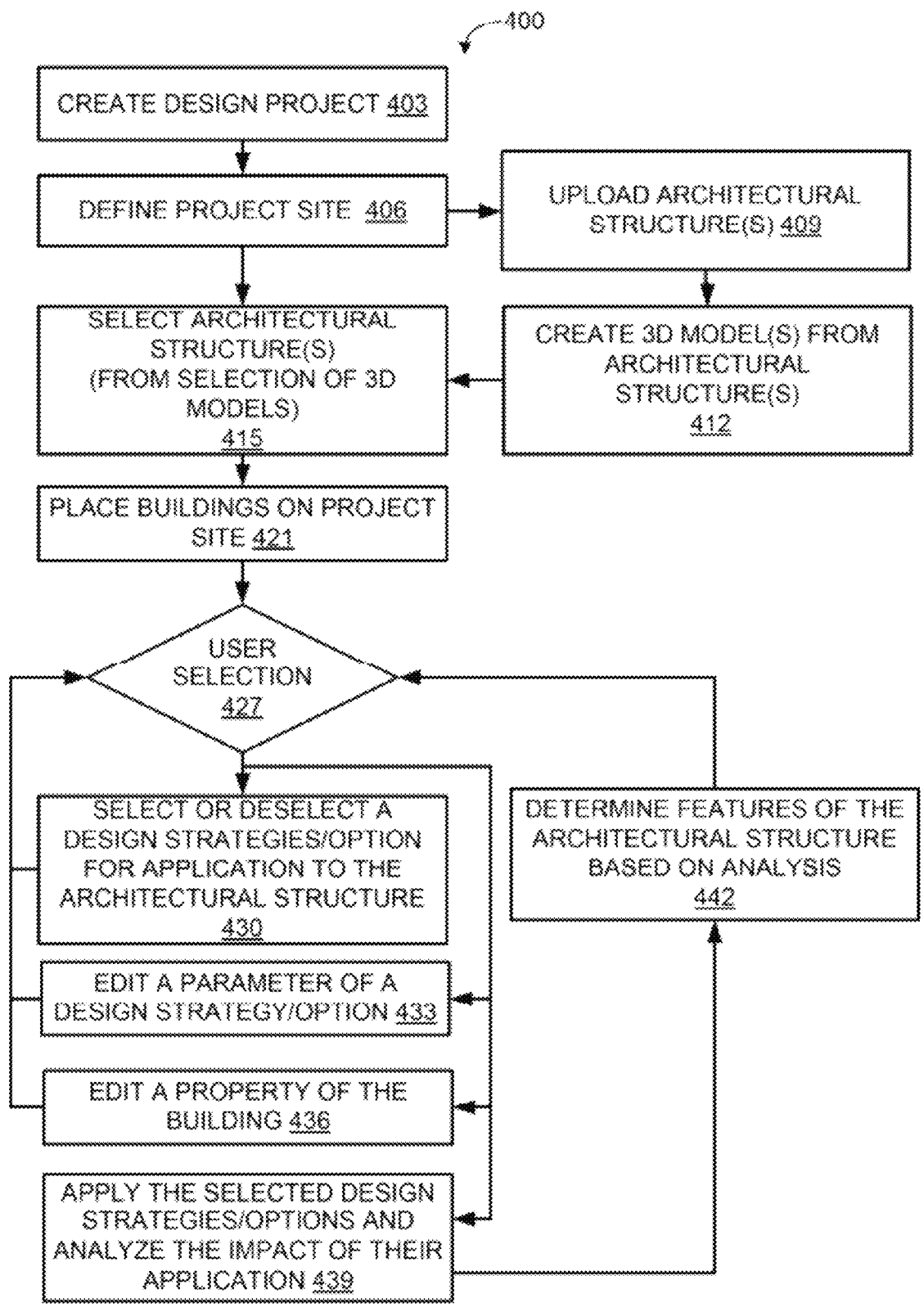
FIG. 4 is flowchart illustrating an example method in accordance with an embodiment of the present invention.
Figure 5A:
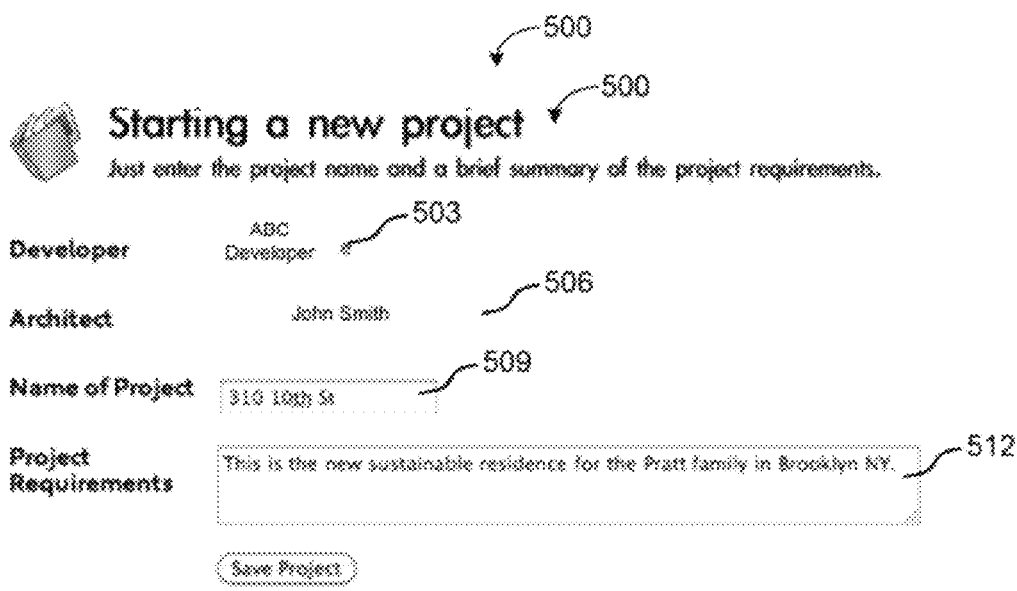
FIG. 5A is a screenshot illustrating an example operation for starting a new design project in accordance with an embodiment of the present invention.

FIG. 4 is flowchart illustrating an example method 400 in accordance with an embodiment of the present invention. The method 400 begins with the creation of a design (e.g., architectural) project at operation 403 during which, in some embodiments, the project title is entered, the project developer is entered, and the architect for project is entered. In some embodiments, a brief description of the project goals/requirements may also be entered and listed. FIG. 5A provides a screenshot 500 illustrating an example implementation of operation 400, where the project developer 503 and project architect 508 are listed, and fields 509 and 512 are provided for the user's respective entry of the design project name and project requirements.

Figure 5B:
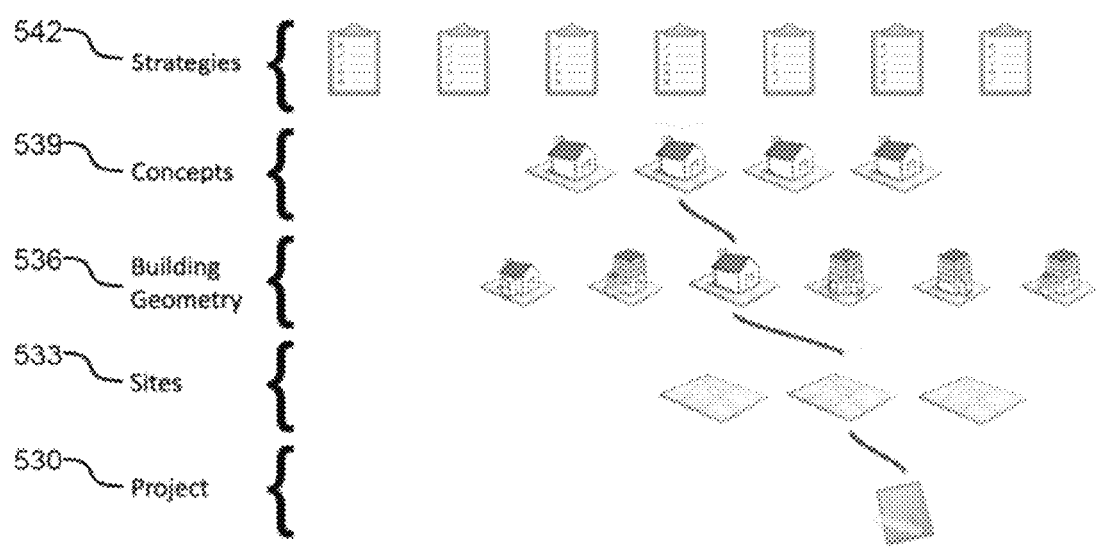
FIG. 5B is a diagram illustrating an example project composition in accordance with an embodiment of the present invention.

FIG. 5B is a diagram illustrating an example project 530 composition in accordance with an embodiment of the present invention. As illustrated in the diagram, project 530 comprises of one or more (project) sites 533, with each site 533 comprising building geometry 536 (i.e., three-dimensional data) for one or more architectural structures (e.g., homes, office buildings). Using the building geometry 536 of an architectural structure, some embodiments of the present invention can apply a design concept 539 to the architectural structure, where the design concept 539 comprises one or more design options/strategies 542.

Figure 6:
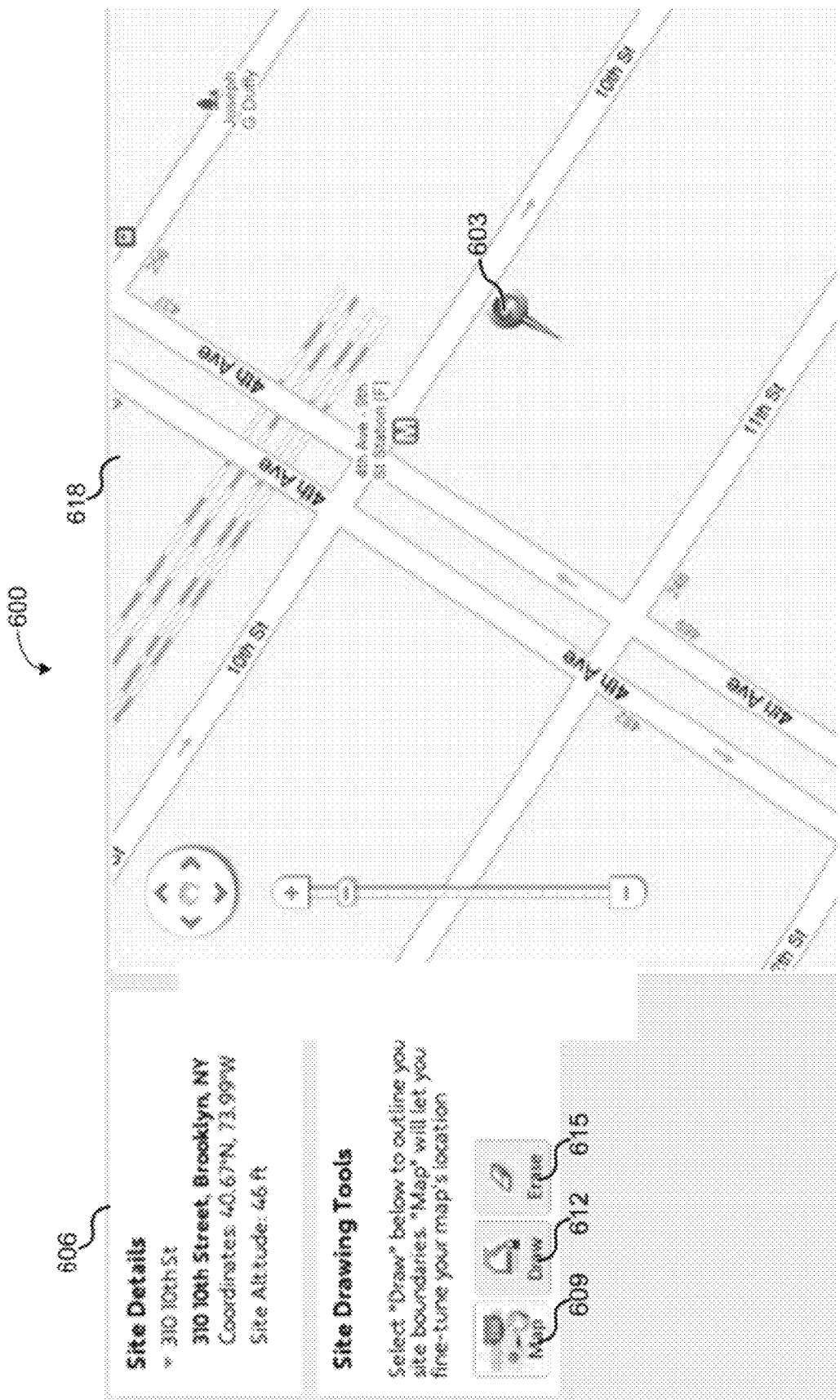
FIG. 6 is a screenshot illustrating an example operation for defining a project site in accordance with an embodiment of the present invention.

Returning to FIG. 4, at operation 406, a user defines a project site for the architectural structure. As noted before, in some embodiments, the geographic location is obtained once a user defines a project site for the architectural structure and places the architectural structure on the project site, the project site providing the geographic coordinates for the geographic location. FIGS. 6-8 provide screenshots of example implementations for defining a project site in accordance with an embodiment of the present invention. Specifically, FIG. 6 shows map 618 through which a user can select a project site 603 after selecting the map button 609. Once a project site 603 is selected, the project site detail window 606 is updated with the street/mailing address of the project site 603 (where applicable), the geographic coordinates of the project site 603, and the altitude of the project site 603. Also shown in FIG. 6 are a draw button 612 and an erase button 615, through which a user can draw the project site boundaries. More with respect to the drawings boundaries is provided with respect to FIGS. 7 and 8.

Turning now to FIG. 7, shown is an example interface configured to allow a user define a project site. Similar to FIG. 6, the example interface comprises a project site detail window 606, a map button 609, a draw button 612, and an erase button 615. Additionally, the interface comprises an aerial image map 706 of the project site 603. In this screenshot example, the user has already begun drawing a project site boundary 709 around the project site. FIG. 8 shows the aerial image 706 with the project site boundary 709 completed, and the project site 803 filled in to visually indicate that its definition has completed.

Continuing with FIG. 4, after defining the project site at operation 406, a user may choose to upload (409) one or more architectural structures (e.g., buildings) to a system in accordance with one embodiment of the invention, which results in the creation of a 3D model for each the architectural structure at operation 412, or select (415) which architectural structures from the 3D models they wish to add to the project site. If the user selects an architectural structure at operation 415, they subsequently place the architectural structure on the project site at operation 421. Moving to FIG. 9, screenshot 900 illustrates a selection interface 906 and 3D model preview window 909, from which a user may select an architectural structure to add to the project site. Interface 906 provides a listing 903 of the available architectural structures from which a user may select and add to a project site. As shown, through selection interface 906, a user can add one or more buildings to the project site at a given time.

With continued reference to FIG. 4, once an architectural structure is added to the project site, the structure may be placed or oriented on the project site at operation 421. Subsequently, a user selects (427) from one of the following: (a) select or deselect a design strategies/option for application to the architectural structure (430), (b) edit a parameter of a design strategy/option (433), (c) edit a property of a building (436), (d) apply the selected design strategies/options to the architectural structure and analyze their impact on the architectural structure (439). Once a user chooses to apply the selected design options to the architectural structure and analyze their impact, the features of the architectural structure are determined at operation 442, based on the analysis performed during operation 439, and the results dependent on those features are updated.

FIG. 10 is a screenshot 1000 illustrating an example of operation 436 for editing a building (i.e., structure) property in accordance with an embodiment of the present invention. In the illustrated example, the building (i.e., structure) properties that can be edited by the user include building use 1003, occupancy start time 1006, occupancy end time 1009, occupancy number 1012, lighting density (lux) 1015, and equipment density (W/m$^2$) 1018.

FIG. 11 is a screenshot 1100 illustrating an example interface 1103 for selecting a building (i.e., architectural structure) to be analyzed in accordance with an embodiment of the present invention. As noted in the Figure, in some embodiments, when a single building (i.e., architectural structure) is selected for analysis, the other buildings (i.e., other architectural structures) on the project site not targeted for analysis will be considered and utilized in analyzing the impact of selected design options on the architectural structure.

Figure 12:
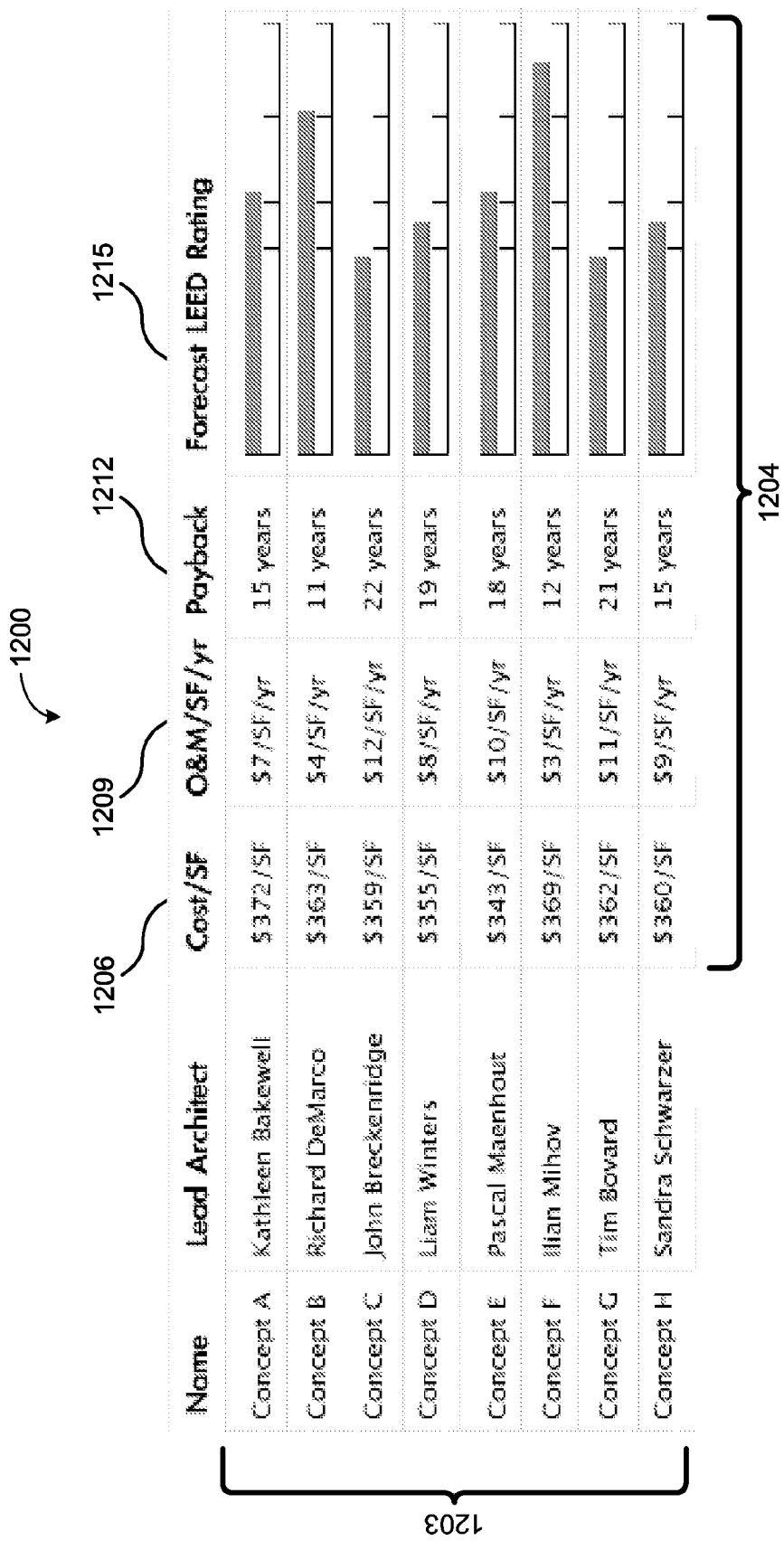
FIG. 12 is a screenshot illustrating an example report on design concepts applied to an architectural structure in accordance with an embodiment of the present invention.

FIG. 12 is a screenshot 1200 illustrating an example report on design concepts applied to an architectural structure in accordance with an embodiment of the present invention. In particular, for some embodiments, results such as those shown in FIG. 12 are produced after a determination of features has been performed (e.g., 442). In the illustrated report, a listing of design concepts (i.e., Concept A-H) applied to one or more architectural structures is displayed 1203. Accompanying the listing of design concepts 1203 are the resulting features 1204 from each of the design concepts. The features shown include cost per square foot 1206 for implementing the design concept shown, the operational and maintenance cost 1209 after the design concept is implemented, the payback period in years before the design concept pays for itself 1212, and a forecast on certification rating 1215 as a result of applying the design concept. In this particular example, the projected certification rating 1218 for applying design Concept A to the buildings (i.e., architectural structures) is listed as LEED® NC: 44-Certified.

Figure 14:
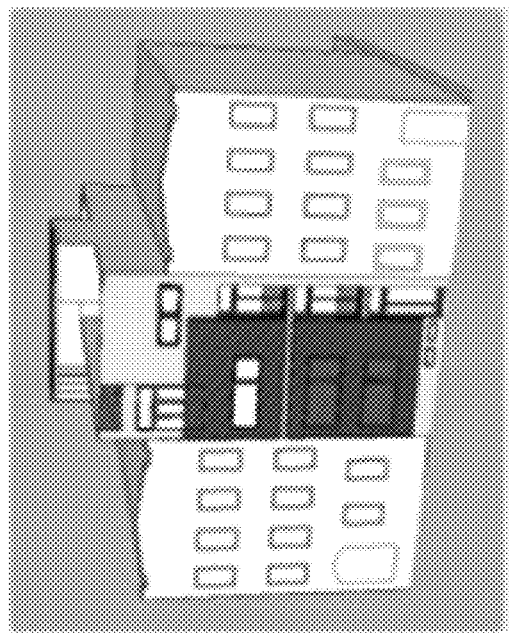
FIG. 14 is a screenshot illustrating an example preview of a three-dimensional model that may be analyzed in accordance with an embodiment of the present invention.
Figure 13:
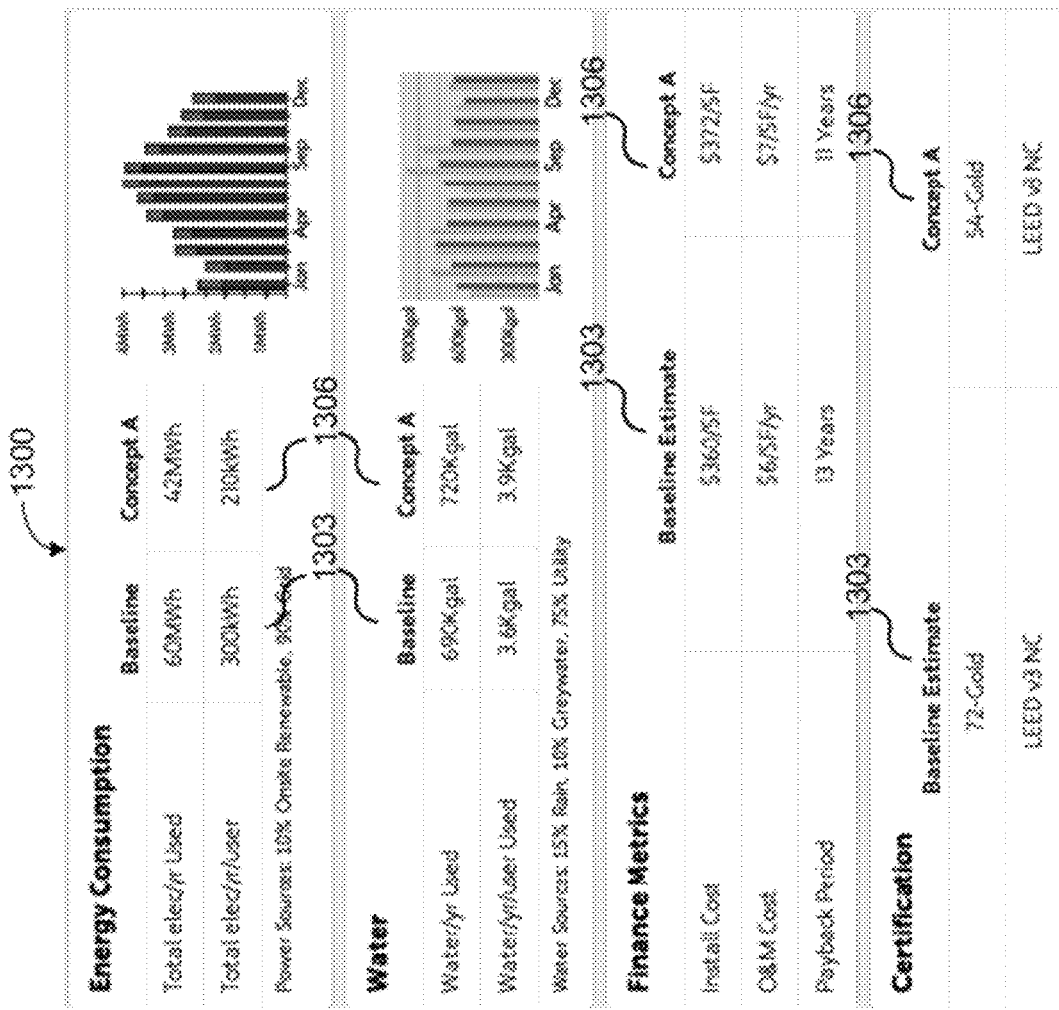
FIG. 13 is a screenshot illustrating an example summary performance report on an architectural structure being analyzed under a design concept in accordance with an embodiment of the present invention.

FIG. 13 is a screenshot 1300 illustrating an example summary performance report on an architectural structure being analyzed under a design Concept A in accordance with an embodiment of the present invention. As illustrated, energy consumption and water consumption per a year and per a user for the architectural structure are provided under two conditions: (1) when no design options are being applied 1303 (i.e., Baseline); and (2) when design options within design Concept A are being applied 1306. Similarly, finance metrics for the architectural structure are also provided with respect to install cost, operation and maintenance cost, and payback period under the two conditions. The same is provided with respect to the architectural structure's certification score/points and rating. In some embodiments, reports such as the one illustrated in FIG. 13 may be accompanied with a preview of a three-dimensional model that is being analyzed. FIG. 14 is a screenshot illustrating an example of such a three-dimensional model.

Figure 15:
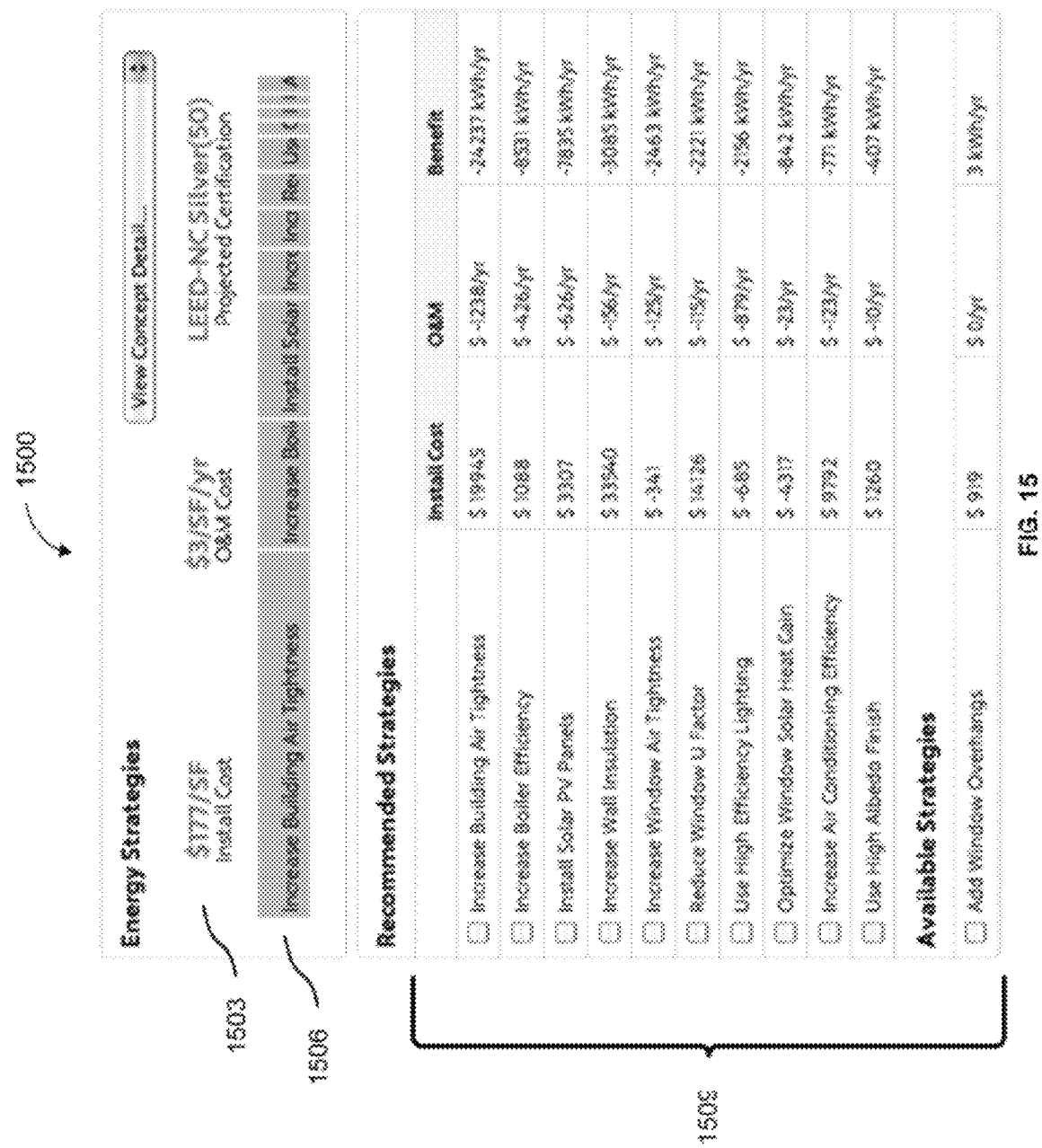
FIG. 15 is a screenshot illustrating an example overview of energy design options that may be applied to an architectural structure in accordance with an embodiment of the present invention.

FIG. 15 is a screenshot 1500 illustrating an example overview of energy design options 1509 that may be applied to an architectural structure in accordance with an embodiment of the present invention. Illustrated in the top field 1503 are the install cost per square feet for the selected options, operation and maintenance cost per a year for the selected options, and a projected certification rating based on the application of select design options. As shown, the values shown reflect the effects of other design options that are currently being applied on the architectural structure. Also displayed is a scale 1506, which provides visually indication of which energy design strategies/options have the largest benefit on the architectural structure (i.e., the larger the block the larger the benefit). In some embodiments, the design options may be listed in accordance with their rank or priority, based on such considerations as their benefit, cost, or overall impact to the architectural structure.

Figure 16:
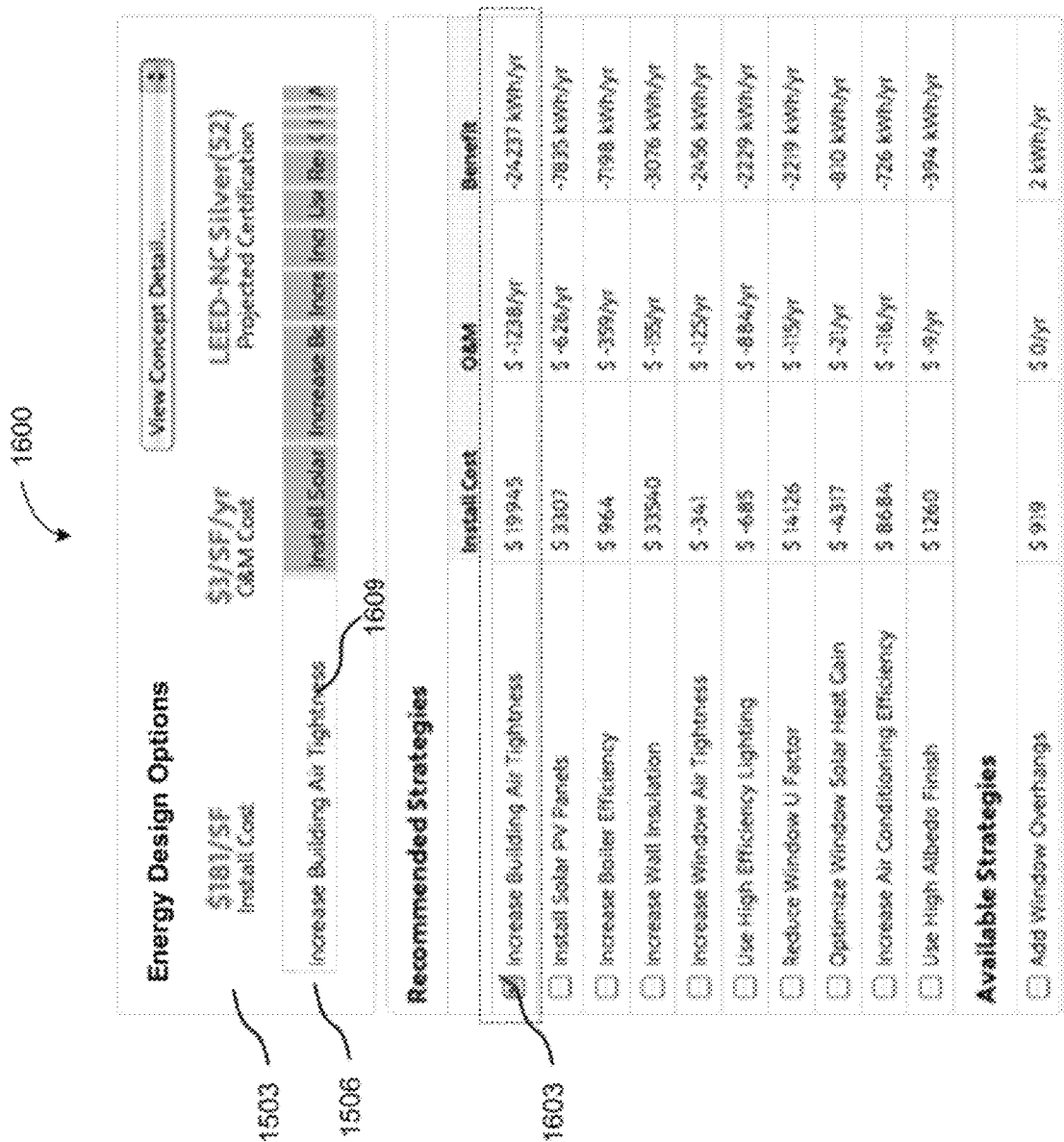
FIG. 16 is a screenshot illustrating an example overview and application of energy design options to an architectural structure in accordance with an embodiment of the present invention.

FIG. 16 is a screenshot 1600 that illustrates an example of an effect of applying an energy design option shown in FIG. 15. Specifically, FIG. 16 illustrates an example of how screenshot 1500 changes when the "Increase Building Air Tightness" design option 1603 is selected by a user. As shown, once option 1603 is selected for application, the value for install cost per square foot increases based on the install cost of option 1603, but the value for operation and maintenance cost remains the same. In addition, due to the energy savings per year that results from applying option 1603, the projected LEED® certification rating for the architectural structure increases by two points (i.e., from 50 to 52). Additionally, for easy visual indication of which energy design strategies/options are currently selected and which are providing the most benefit, the scale 1506 has been visually flagged at 1609 to indicate that the "Increase Building Air Tightness" design option 1603 is currently implemented. As described above, in some embodiments, the value updates reflected in FIG. 16 may be facilitated by the reapplication of all selected design options, reanalysis of impacts caused by the selected design options, and determination of features based on that analysis (e.g., operation 115, 118, and 120 of FIG. 1A) after the selection of option 1603.

FIG. 17A is a screenshot 1700 illustrating an example operation for editing a design option parameter in accordance with an embodiment of the present invention. In particular, the illustrated design option concerns rainwater harvesting as a specific water source choice for a given architectural structure. As shown, the parameters available for edit for the rainwater harvesting design option include enabling the rainwater harvesting 1718 for irrigation and toilet flushing purposes, and setting the percentage of the roof area 1715 that would be utilized for rainwater harvesting. To better inform the user on the impacts of the design option, features 1703 (i.e., utility water consumed, install cost, operation and maintenance cost, LEED® certification rating, and carbon emissions) of the architectural structure based on the rainwater design option are provided to the user. Specifically, the features 1703 are shown in terms of the rainwater design option not being applied 1706 (i.e., Baseline impact when the design option is not applied), in terms of the rainwater design option being applied 1709 (i.e., Forecast impact of the design option being applied), and in terms of the delta between the two 1712 (i.e., the benefit or detriment).

Figure 17B:
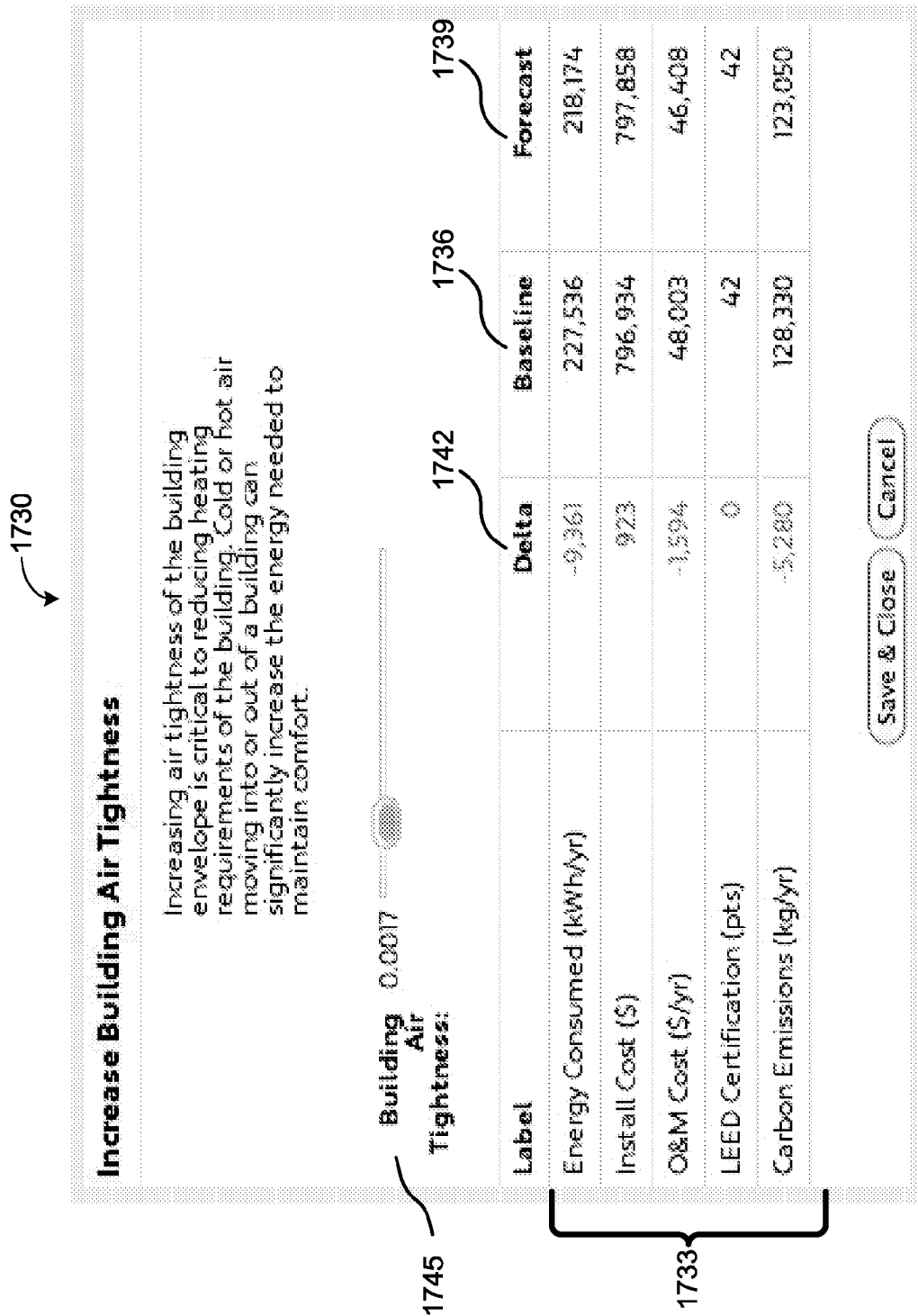

FIG. 17B is a screenshot 1730 illustrating an example operation, in accordance with an embodiment of the present invention, that edits a design option parameter relating to building air tightness. As depicted by screenshot 1730, the example operation allows a user to modify the building air tightness ratio 1745 of an architectural structure. For the user's information, the impacts of the building air tightness design option on the architectural structure are presented as features 1733 (i.e., energy consumed, install cost, operation and maintenance cost, LEED® certification rating, and carbon emissions). Similar to FIG. 17A, the features 1733 are shown in terms of the building air tightness design option not being applied 1736 (i.e., Baseline impact when the design option is not applied), in terms of the building air tightness design option being applied 1739 (i.e., Forecast impact of the design option being applied), and in terms of the delta between the two 1742 (i.e., the benefit or detriment).

Referring now to FIGS. 18-21, provided are screenshots illustrating example operations for editing various structure properties in accordance with an embodiment of the present invention. As described above, once a design option parameter is edited, a structure property modified, or a design option selected or deselected, certain embodiments of the present invention are configured to reapply the selected design options to the architectural structure with the structure property changes, reanalyze the impact of applying the design options to the architectural structure, and re-determine the features of the architectural structure based on the analysis operation.

Figure 18:
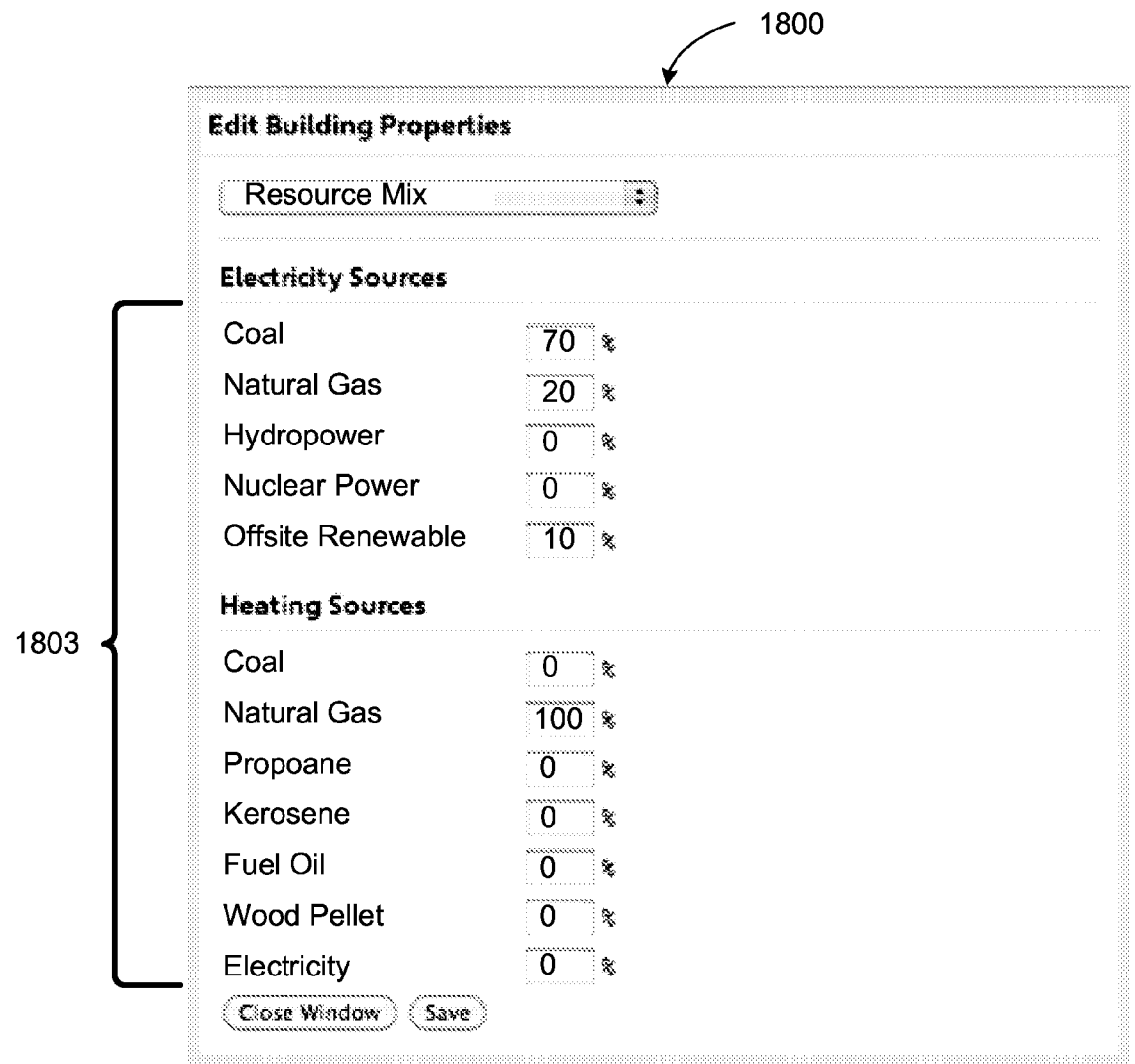
FIG. 18 is a screenshot illustrating an example operation for editing structure resource properties in accordance with an embodiment of the present invention.

With respect to resource structure properties, fields 1803 of FIG. 18 allow a user to determine the mix of electricity sources and heating sources they want to utilize for the architectural structure. For example, as illustrated in FIG. 18, a user may set the resource structure properties such that energy sources powering the architectural structure is 70% coal-based, 20% natural gas-based, and 10% offsite-renewable, and such that heating sources for the architectural structure are 100% provided by natural gas. Upon committing these changes to the system (e.g., save), certain embodiments of the present invention are configured to reapply to the architectural structure all the selected design options along with the changed resource structure properties, to the architectural structure, reanalyze the impact of applying the design options to the architectural structure, and re-determine the features of the architectural structure based on the analysis operation.

Figure 19:
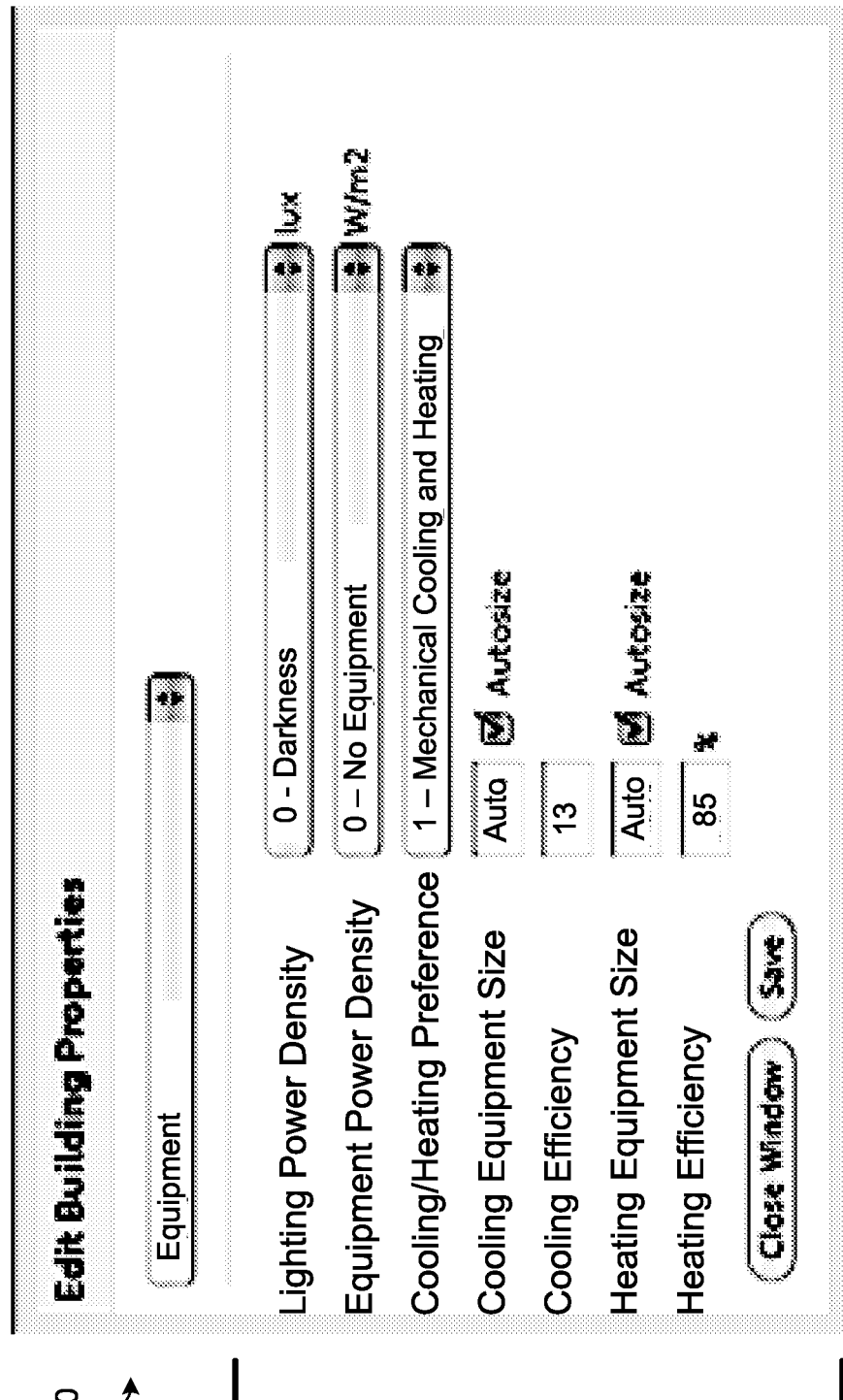
FIG. 19 is a screenshot illustrating an example operation for editing structure equipment properties in accordance with an embodiment of the present invention.

Likewise, for equipment structure properties, interface 1903 of FIG. 19 allows a user to change the light power density, equipment power density (W/m$^2$), cooling and heating preferences, cooling equipment size, cooling efficiency, heating equipment size, and heating efficiency. As shown in FIG. 19, the user has chosen darkness of lighting power density, no equipment for equipment power density, mechanical cooling and heating for cooling/heating preference, autosizing for cooling equipment, cooling efficiency Seasonal Energy Efficiency Ratio (SEER) of 13, autosizing for heating equipment, and heating efficiency at 85%. Similar to the resource structure properties of FIG. 18, once the changes to the equipment structure properties have been committed to the system, certain embodiments of the present invention are configured to reapply to the architectural structure all the selected design options along with the changed equipment structure properties, reanalyze the impact of applying the design options to the architectural structure, and re-determine the features of the architectural structure based on the analysis operation.

Figure 20:
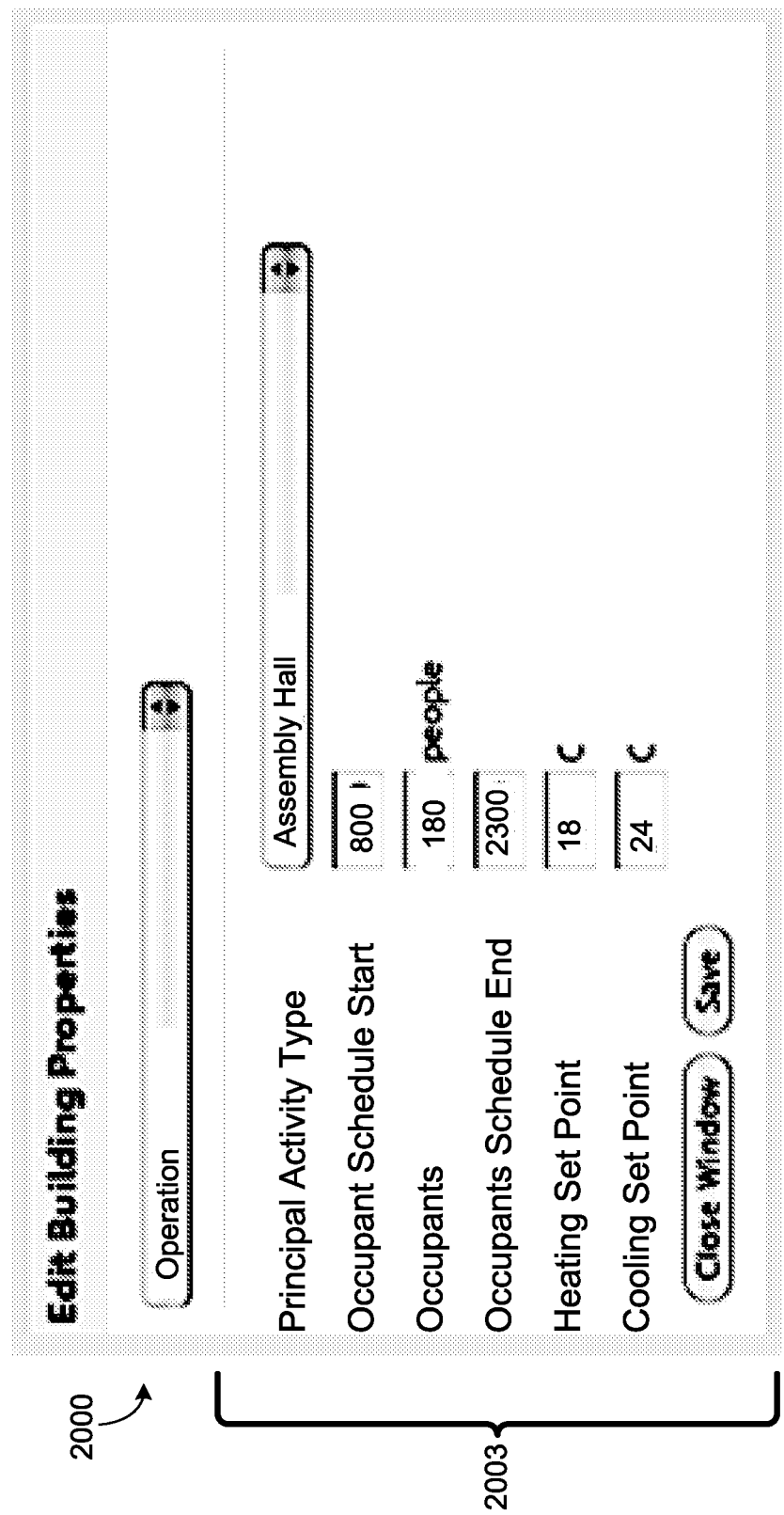
FIG. 20 is a screenshot illustrating an example operation for editing structure operation properties in accordance with an embodiment of the present invention.

In terms of operation structure properties, similar to FIG. 10, interface 2003 of FIG. 20 provides a user with the ability to set the principal activity type of the architectural structure (e.g., assembly hall, commercial building, and retail sales), occupant schedule start, occupant schedule end, and number of occupants. Unlike FIG. 10, interface 2003 also allows a user to set the heating set point and cooling set point. For example, as illustrated in FIG. 20, the user has chosen the architectural structure's principal activity type to be an assembly hall, the occupant schedule start to be 8 AM, the occupant schedule stop to be 11 PM, the occupancy to be 180 people, the heating set point to be 18° C., and the cooling set point to be 24° C. As with FIGS. 18 and 19, when these changes to the operation structure properties are committed to the system, certain embodiments of the present invention are configured to reapply to the architectural structure all the selected design options along with the changed operation structure properties, reanalyze the impact of applying the design options to the architectural structure, and re-determine the features of the architectural structure based on the analysis operation.

Figure 21:
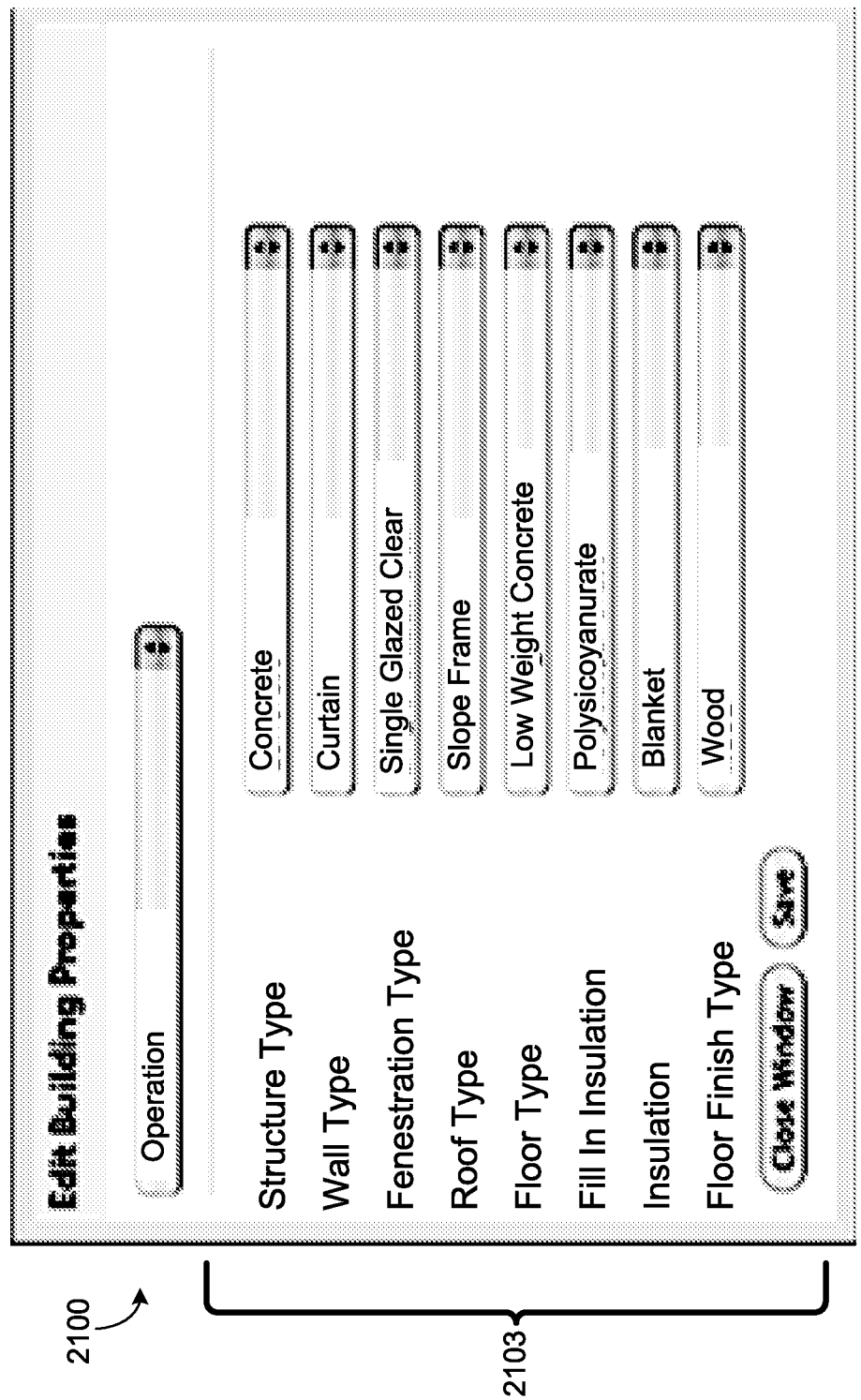
FIG. 21 is a screenshot illustrating an example operation for editing structure construction properties in accordance with an embodiment of the present invention.

Turning now to FIG. 21, in terms of construction structure properties, example interface 2103 is provides a user with the ability to set the structure type, wall type, fenestration type, roof type, floor type, fill in insulation type, insulation type, and floor finish type. For example, in FIG. 21, the user has selected concrete for structure type, curtain for wall type, single glazed clear for fenestration type, slope frame for roof type, low weight concrete for floor type, polyisocyanucrate for fill in insulation type, blanket for insulation type, and wood for floor finish type. Once a user commits these changes to the construction structure properties, certain embodiments of the present invention are configured to reapply to the architectural structure all the selected design options along with the changed construction structure properties, reanalyze the impact of applying the design options to the architectural structure, and re-determine the features of the architectural structure based on the analysis operation.

It should also be noted that the foregoing list of structure properties is in no way limiting; one of ordinary skill in the art after reading this description would appreciate that other structure properties may be utilized in accordance with embodiments of the present invention.

Figure 22:
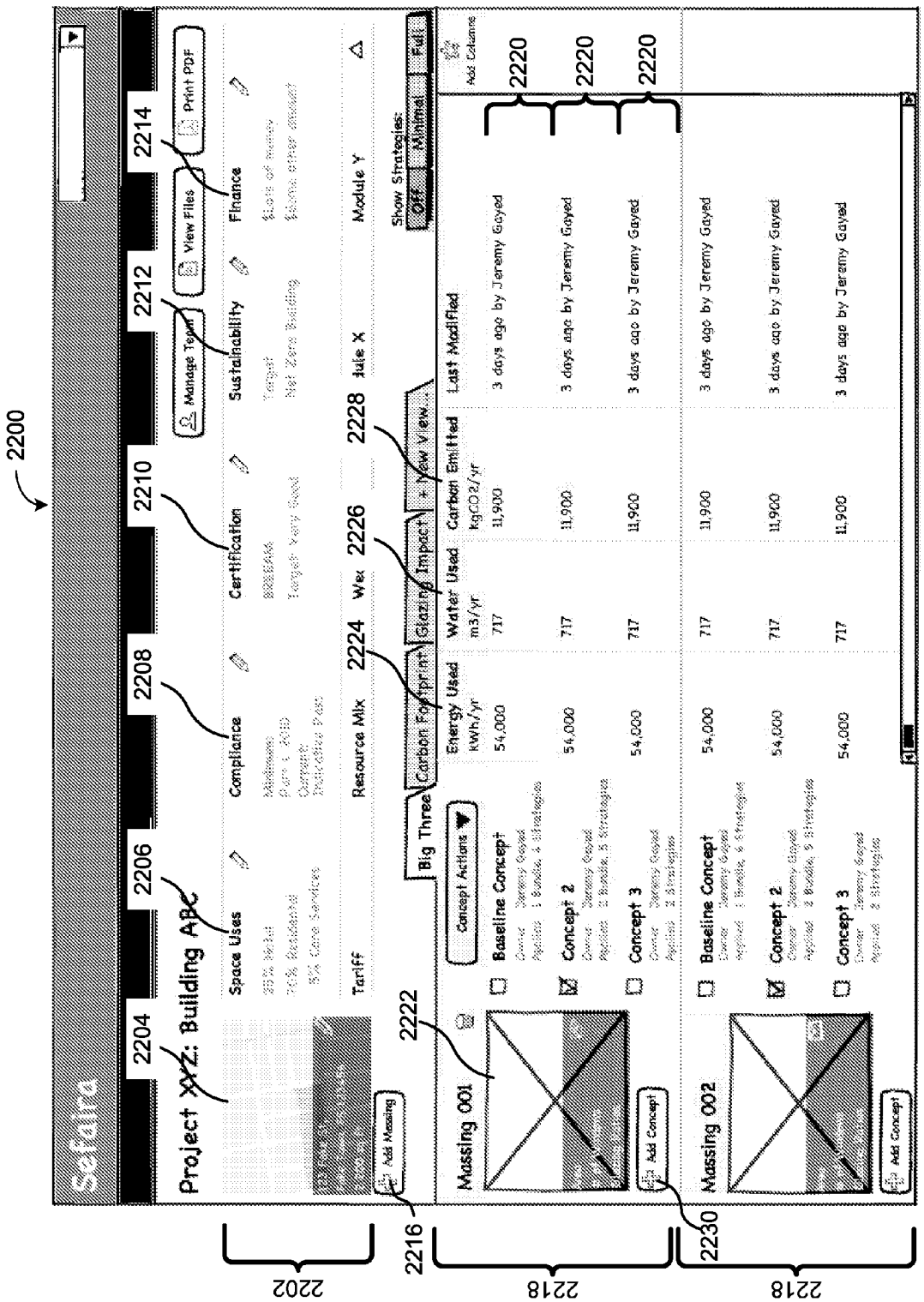
FIG. 22 is a screenshot illustrating an example project view for reviewing and editing a project in accordance with an embodiment of the present invention.

FIG. 22 is a screenshot illustrating an example project view 2200 for reviewing and editing a project in accordance with an embodiment of the present invention. In some embodiments, the project view 2200 may provide a user with the ability to view or edit a project. In FIG. 22, the project view 2200 shows information related to "PROJECT XYZ."

The project view 2200 may comprise a project summary 2202 and a plurality of architectural structure/massing summaries 2218. The project summary 2202 may provide various information regarding the project, including for example a map location 2204 for the project, space use information 2206, compliance information 2208, certification information 2210, sustainability information 2212, and finance information 2214. The project information may be initially provided through a project definition received by the system when the project is initially created, or manually entered by a user sometime during or after project creation.

As described herein, a project may comprise one or more architectural structures/massings, and each architectural structures/massing may further comprise one or more design concepts that can be selectively added, removed, modified and applied to the individual architectural structures/massings. As described herein, in some embodiments, sets of selected design options may be grouped together as a design concept, where, through a design concept, a given architectural structure may have a plurality of different design concepts applied to it and then analyzed. Additionally, the design concept may comprise variables (i.e., design concept variables) that store the adjusted values for the parameters of design options contained therein. The use of design options and design concepts may allow a user to develop custom design concepts that meet the desired goals and objectives of the architectural project, and provided the ability to apply a preconfigured set of design options to a number of architectural structures. For some embodiments, a design concept may be applied to an entire project and, accordingly, all the architectural structures/massings contained therein.

In some embodiments, the space use information 2206 may describe how the project space is intended to be used. The compliance information 2208 may describe the minimum compliance desired, or current compliance achieved. The certification information 2210 may describe a target certification intended to be achieved by the project, the current certification achieved, or the likelihood of achieving the target certification. The sustainability information 2212 may describe a target sustainability program intended to be achieved by the project, or the likelihood of achieving the target sustainability. The finance information 2214 may describe such information as a budget for the project, or the current total cost of the project. In addition to viewing the project information, a user may utilize the project view 2202 to enter additional project information, remove project information, or modify the project information shown or the type of project information shown.

The architectural structure/massing views 2218 provide information regarding each architectural structure/massing added or associated with the project. For example, a user wishing to add an additional architectural structure/massing to the project may do so by pressing the button 2216, which may prompt the user with an graphical user interface for performing the add. In some embodiments, each of the architectural structure/massing views 2218 may comprise a preview 2222 of the architectural structure/massing, list the design concepts associated with the architectural structure/massing, and provide additional information regarding the architectural structure/massing (e.g., number of windows, area, etc.). In various embodiments, each of the architectural structure/massing views 2218 may also comprise design concept views 2220, each of which provides information regarding each of the design concepts added, associated, or applied to the architectural structure/massing. In accordance with some embodiments, a user may use the design concept views 2220 to add or remove design concepts that are applied or associated with an architectural structure/massing, modify what information is shown for each of the design concepts, and modify parameters of one or more design concepts. For example, a user may add one or more additional design concepts to an architectural structure/massing of the project by pressing the button 2230, which may prompt the user with an graphical user interface for performing the add operation.

In FIG. 22, a "Baseline Concept," a "Concept 2," and a "Concept 3" are shown to be associated with a "massing 001."

For some embodiments, the "Baseline Concept" associated with an architectural structure/massing may be the initial/foundation design concept upon which other design concepts (e.g., "Concept 2," and "Concept 3") for the architectural structure/massing are derived. Depending on the implementation, the "Baseline Concept" for an architectural structure/massing may be initially created when the architectural structure/massing is uploaded to an embodiment, or when the architectural structure/massing is added or associated with a project.

Each design concept view 2220 may provide information summarizing the benefit/impact of a design concept as applied to the architectural structure/massing. For example, the design concept view 2220 may provide such benefit/impact information as energy used 2224, water used 2226, or carbon emitted 2228. Other impact information may include, without limitation, solar energy used, wind energy used, solar energy consumed, wind energy consumed, installation cost, operating cost, and utility cost. For some embodiments, the benefit/impact information shown may change, in real-time, as corresponding changes are implemented to the design concept or changes are implemented to the architectural structure/massing associated with the design concept.

Figure 23:
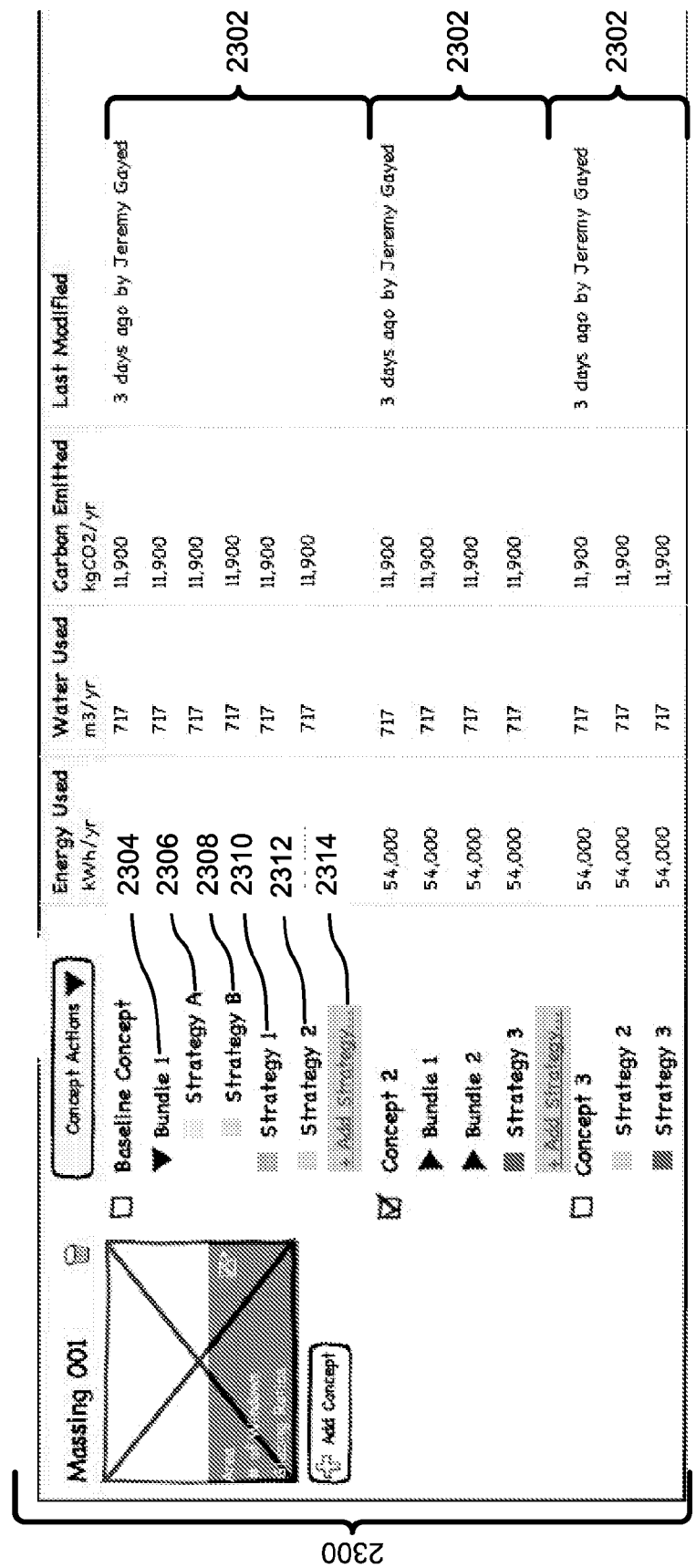
FIGS. 23 and 24 are screenshots illustrating example architectural structure/massing views in accordance with some embodiments of the present invention.

FIG. 23 is a screenshot illustrating an example architectural structure/massing view 2300 in accordance with some embodiments of the present invention. In FIG. 23, the architectural stricture/massing view 2300 comprises design concept views 2302, each of which provides information regarding design concept concepts added, associated, or applied to "massing 001." For example, in FIG. 23, "massing 001" is shown to be associated with a "Baseline Concept," a "Concept 2," and a "Concept 3." For some embodiments, architectural structure/massing view 2300 may be an alternative or modified version of the architectural structure/massing view 2218. The architectural structure/massing view 2300 may provide a summary of design strategies/options 2306, 2308, 2310, and 2312 added, associated, or applied to the various design concepts associated with an architectural structure/massing. A user may add further design strategies/options by clicking on an "Add Strategy" link 2314, or the like.

In various embodiments, design strategies/options may be bundled together before or after being associated with a design concept and, then applied as a bundle to the design concept. For example, design strategies/options 2306 and 2308 may be grouped into a design strategy/option bundle 2304, which is then applied to the "Baseline Concept." Depending on the embodiment, a design strategy/option bundle may be defined or customized by a user, or may be provided by an embodiment service provider.

As described herein, in some embodiments, the design strategies/options may be applied to a design concept based on a priority. For example, where a design strategy/option 1 has a higher priority than a design strategy/option 2, the effects of the design strategy/option 1 on the architectural structure/massing will take precedence over the effects of the design strategy/option 2 where those effects would otherwise conflict. For some embodiments that utilize design strategy/option priorities, each design concept view 2302 may provide a listing of design strategies/options added, associated, or applied to an architectural structure/massing, ordered according to the priority in which the design strategies/options are applied to the architectural structure/massing. For example, for the "Baseline Concept" of FIG. 23, the design strategy/option bundle 2304 may have a higher priority than the design strategies/options 2310 and 2312, and the design strategy/option 2310 may have a higher priority than the design strategy/option 2312.

Figure 24:
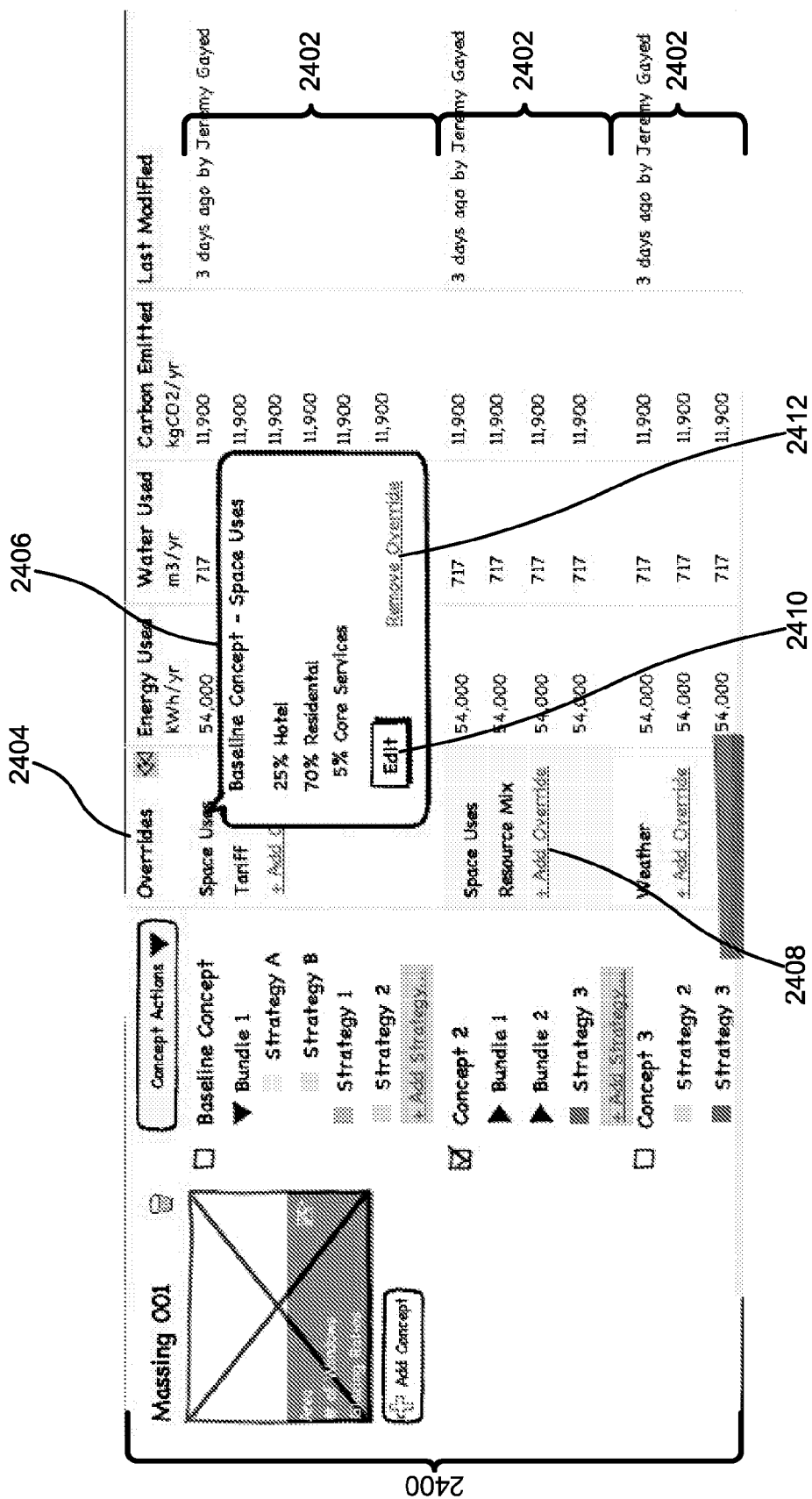

FIG. 24 is a screenshot illustrating an example architectural structure/massing view 2400 in accordance with some embodiments of the present invention. In some embodiments, the architectural structure/massing view 2400 may be an alternative or modified version of the architectural structure/massing view 2300. The architectural structure/massing view 2400 may comprise design concept views 2402, each of which provides information regarding design concept concepts added, associated, or applied to "massing 001." For each design concept view 2402, the architectural structure/massing view 2400 may further provide a summary of design concept overrides being applied to the design concept.

In some embodiments, a design concept override allows a user to quickly and temporarily adjust parameters of a design concept, without the need of permanent redefinition of the design concept or the need to create a new design concept to implement minor adjustments to the design concept. Example design concept overrides may include, without limitation, an override of a three-dimensional model, a tax override, a space uses override, a resource mix override, a weather override, a time of year override, a compliance override, a sustainability override, a certification override, and a finance override. Depending on the embodiment and parameter, the override may be a complete or a partial override of a parameter of the design concept. Additionally, in some embodiments, the parameter of the design concept adjusted may be a design concept variable. Those of skill in the art would appreciate that other parameters of a design concept may be adjusted in a similar manner.

In some embodiments, the architectural structure/massing view 2300 may provide the summary of design concept overrides through a column 2404 that lists the design concept override(s) presently added, applied, or associated with a design concept. For example, a space uses override and a tariff override may be listed as being applied to the "Baseline Concept." In some embodiments, a user may add, associate, or apply additional overrides to an architectural structure/massing using an "Add Override" link 2408, or the like. Additionally, a graphical user interface 2406 may be displayed when a user intends to edit aspects of a design concept override or, alternatively, wants to remove a design concept override. For instance, for the "Baseline Concept," values for a space uses override (e.g., 25% Hotel, 70% Residential, 5% Core Services) may be modified or adjusted via the "Edit" button 2410, or removed from the "Baseline Concept" via a "Remove Override" link 2412. As described herein, in some embodiments, as changes are implemented to a design concept (e.g., via design concept overrides), the impact of such changes may be reflected, in real-time, in the information provided by the architectural structure/massing view 2300.

Figure 25:
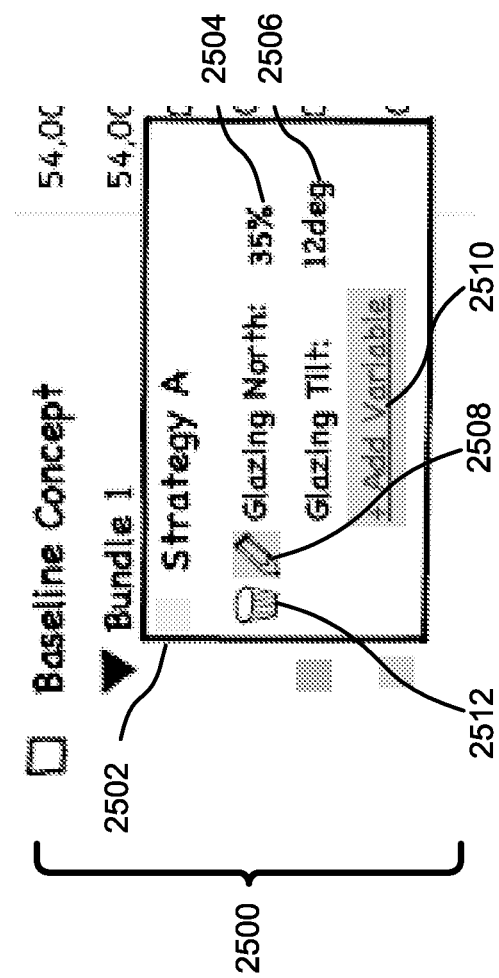
FIG. 25 is a screenshot illustrating an example design concept view in accordance with some embodiments of the present invention.

FIG. 25 is a screenshot illustrating an example design concept view 2500 in accordance with an embodiment of the present invention. In some embodiments, the design concept view 2500 may be an alternative or modified version of the design concept view 2302. The design concept view 2500 may provide a detailed summary of variables (i.e., parameters) added, associated, or applied to a design strategy/option of a design concept. For instance, the design concept view 2500 may provide a listing of variables/parameters for a design strategy/option 2502 (i.e., "Strategy A" of "Bundle 1" of the "Baseline Concept") and their associated values. For example, the design strategy/option 2502 may comprise a "Glazing North" variable/parameter 2504 and a "Glazing Tilt" variable 2506. In addition to providing a detailed summary of variables/parameters (added, associated, or applied to a design strategy/option), the design concept view 2500 may be utilized to modify the value(s) of the variables/parameters in design strategy/option 2502 (e.g., via button 2508), add a variable/parameters to the design strategy/option 2502 (e.g., via an "Add Variable" link 2510), or remove a variable/parameter from the design strategy/option 2502 (e.g., via button 2512).

Figure 26:
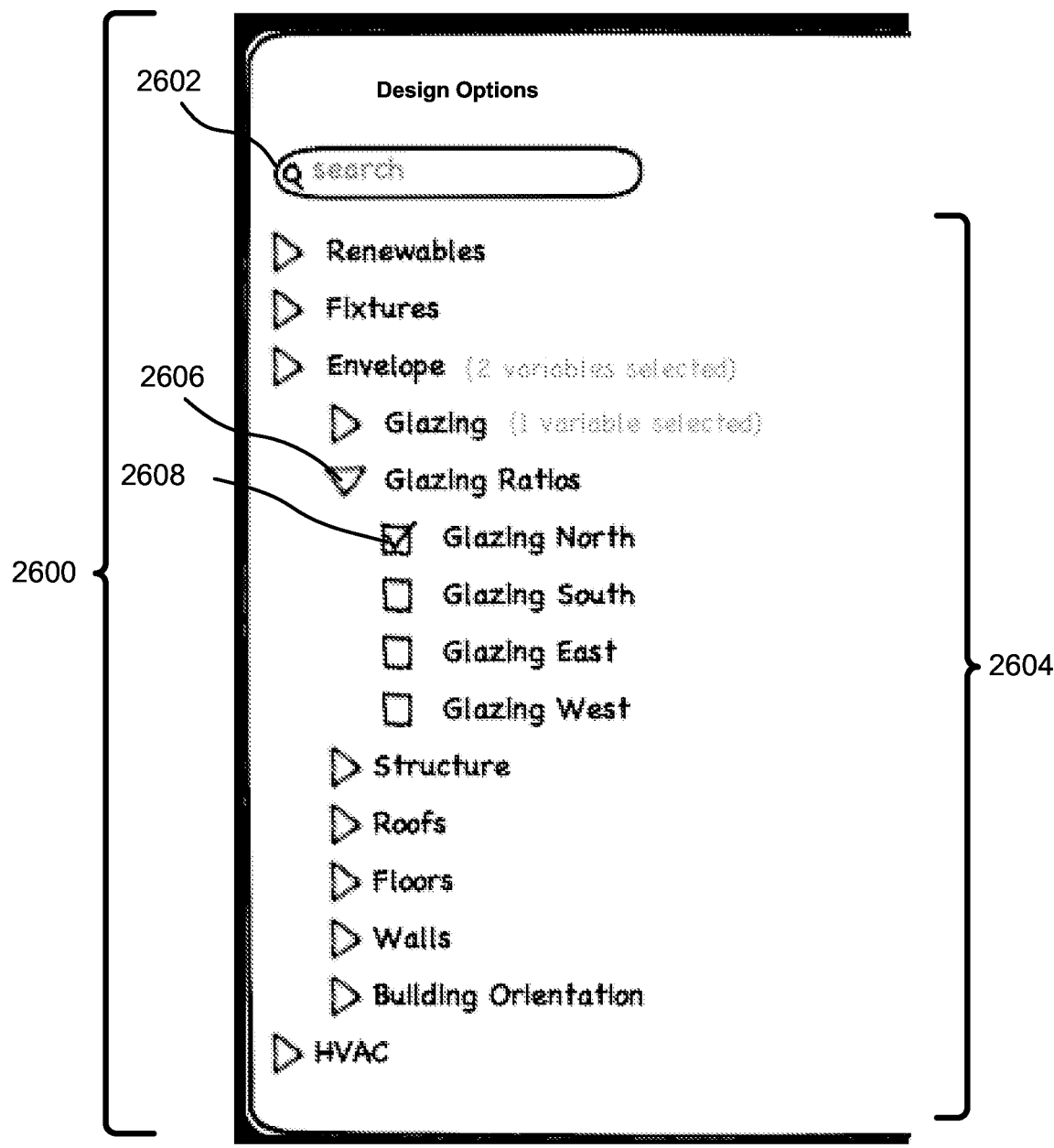
FIG. 26 is a screenshot illustrating an example design options list in accordance with an embodiment of the present invention.

FIG. 26 is a screenshot illustrating an example design strategies/options list 2600 in accordance with an embodiment of the present invention. In some embodiments, the design strategies/options list 2600 may allow a user to search for and select one or more design strategies/options to be added to a design concept. For example, a search field 2602 may facilitate a text-based search of design strategies/options available for selection, and a design strategies/options tree 2604 may list and categorize design strategies/options available for selection. Depending on the embodiment, a design strategy/option may be added from the design strategies/options list 2600 to a design concept by selecting an individual design strategies/options 2606 listed. Additionally, a design strategy/option may be added from the design strategies/options list 2600 by selecting one or more (design strategy/option) variables/parameters 2608 associated with a design strategy/option. In some embodiments, the design strategies/options list 2600 may be used to add or remove design strategies/options to and from a design concept.

Figure 27:
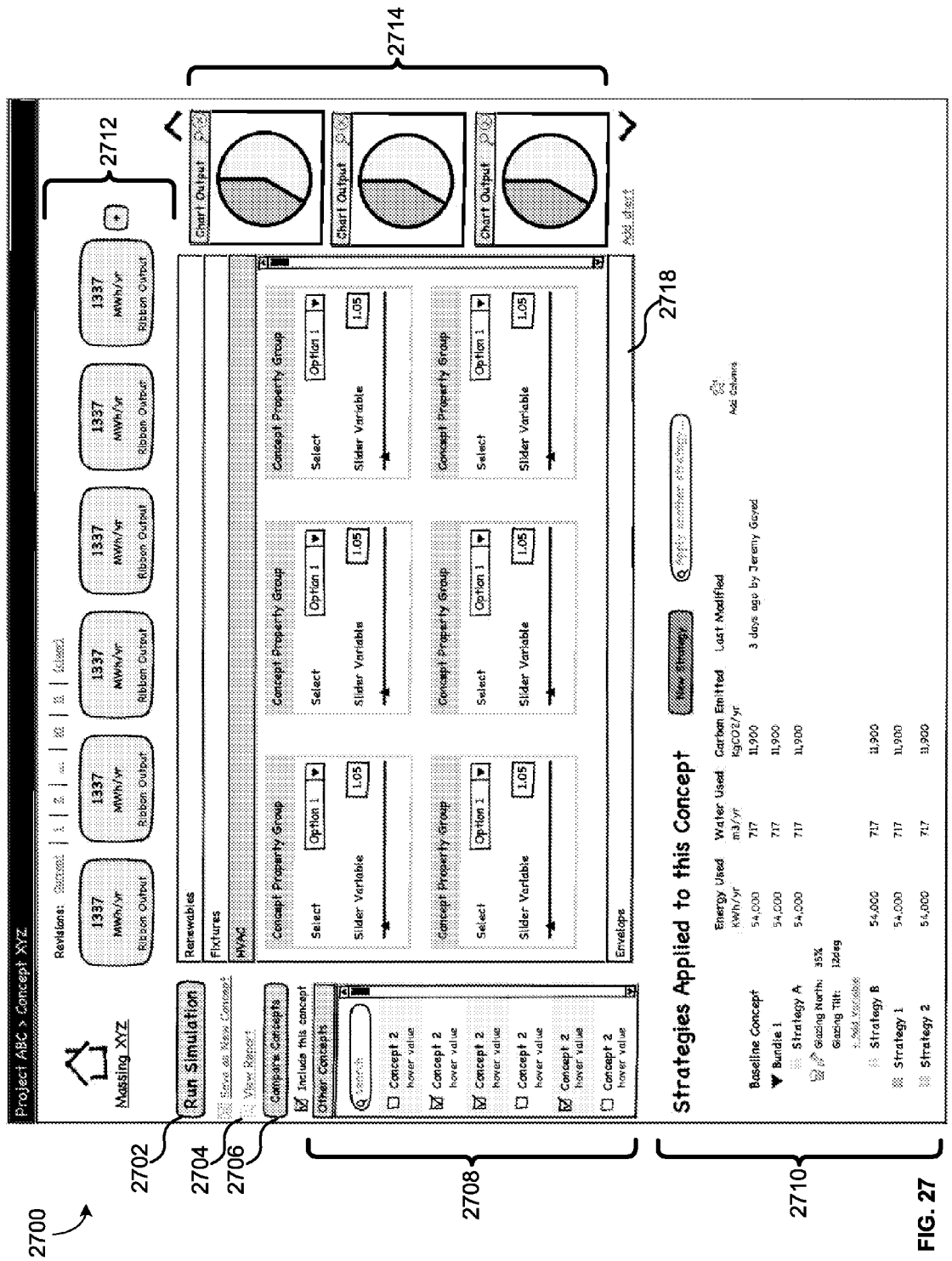
FIG. 27 is a screenshot illustrating an example design concept view in accordance with some embodiments of the present invention.

FIG. 27 is a screenshot illustrating an example design concept view 2700 in accordance with an embodiment of the present invention. The design concept view 2700 may be associated with a particular design concept that has been added, associated or applied to a particular architectural structure/massing. For example, in FIG. 27, the design concept view 2700 may be associated with "Concept XYZ" as applied to "Massing XYZ." Depending on the embodiment, the design concept view 2700 may be accessed/reached through one of the other views described herein.

Through the concept view 2700, a user may review detailed information regarding a design concept (e.g., "Concept XYZ"), modify/revise details of the design concept, compare the design concept against other design concepts, generate one or more reports on the design concept, review details regarding benefits/impact(s) of the design concept on an architectural structure/massing (e.g., "Massing XYZ"), and run a simulation of the architectural structure/massing (e.g., "Massing XYZ") using the design concept. For example, to invoke a simulation of the architectural structure/massing (e.g., "Massing XYZ") using the design concept (e.g., "Concept XYZ"), a user may press a "Run Simulation" button 2702, which may cause a graphical user interface relating to simulation control to be presented. Subsequently, the user may utilize the graphical user interface to operate the simulation.

For some embodiments, a user may generate one or more reports regarding details of the design concept via a "View Report" link 2704. For example, a report of the design concept may summarize the design strategies/options associated with it, and detail the benefits/impacts it has on the architectural structure/massing (e.g., "Massing XYZ"). Further, a user may compare the design concept with other design concepts by selecting the other design concepts from the listing 2708, and pressing a "Compare Concepts" button 2706. The results of such comparison may be utilized by a user to determine which design concept(s) produce the desired results for the architectural structure/massing.

According to some embodiments, the comparison of a first design concept to a second design concept may comprise: analyzing the benefit/impact of the first design concept (i.e., its associated design strategies/options) on the architectural structure; analyzing the benefit/impact of the second design concept (i.e., its associated design strategies/options) on the architectural structure; and comparing a first analysis data of the first design concept to a second analysis data of the second design concept. Using the comparison, some embodiments may calculate a delta/difference between the benefit/impact of the first design concept and the second design concept. Additionally, the delta/difference may be presented in a graphical representation (e.g., bar graph, pie chart) that illustrates the comparison of the first and second design concepts.

It should be noted that in some embodiments, similar comparison operations may be performed between individual design strategies/options within the same or different design concepts. Subsequently, the results of such design strategy/option comparisons may be presented in a manner similar to the design concept comparisons.

The design concept view 2700 may comprise a summary 2710 of design strategies/options added, associated, or applied to the design concept. In some embodiments, the summary 2710 may be similar to some of the views described herein. An output ribbon 2712 may provide a variety of numerical values that represent the estimated or calculated benefit/impact of the design concept (e.g., "Concept XYZ") on the architectural stricture/massing (e.g., "Massing XYZ"). Similarly, charts 2714 may provide a variety of graphical representation of the estimated or calculated benefit/impact of the design concept on the architectural structure/massing. Depending on the embodiment, additional numerical values or charts may be added via a graphical user interface presented through the design concept view 2700.

The design concept view 2700 may comprise a design strategies/options interface 2718, which provides a user the ability to review and modify variable/parameter values added, associated, or applied to design strategies/options of the design concept (e.g., "Concept XYZ"). For example, through the design strategies/options interface 2718, a user may review and modify the variable/parameter values for design strategies/options relating to such architectural structure features/properties as renewables, fixtures, and HVAC.

Figure 28:
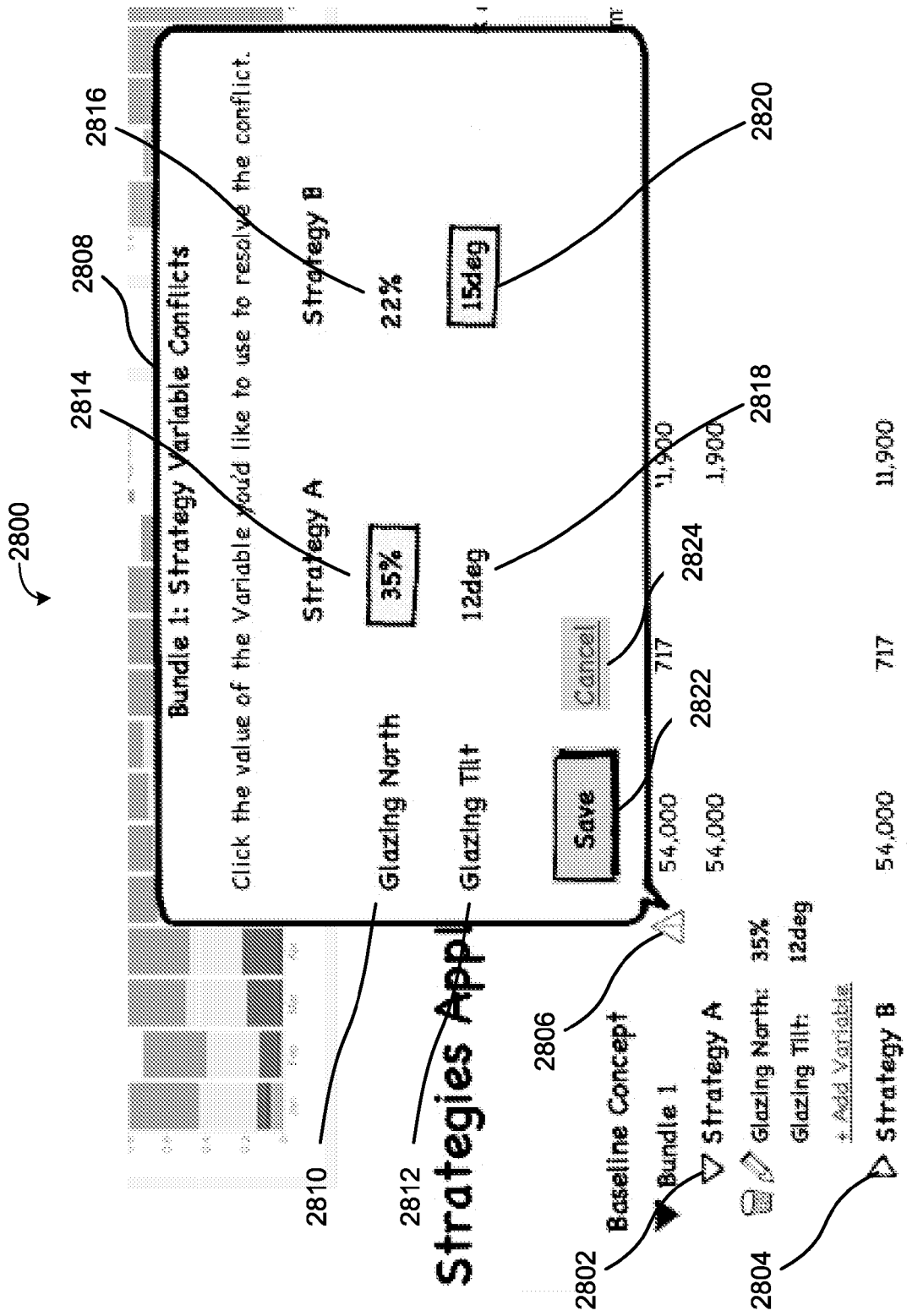
FIG. 28 is a screenshot illustrating an example design concept view in accordance with an embodiment of the present invention.

FIG. 28 is a screenshot illustrating an example design concept view 2800 presenting a conflict in accordance with an embodiment of the present invention. In some embodiments, the design concept view 2800 may be an alternative or modified version of the design concept view 2302 when a conflict is detected between two or more design strategies/options. As noted herein, the design concept view 2800 may provide a detailed summary of variables/parameters added, associated, or applied to a design strategy/option of a design concept. For instance, the design concept view 2800 may provide a listing of variables/parameters for a design strategies/options 2802 and 2804 (i.e., "Strategy A" of "Bundle 1," and "Strategy B," respectively) and their associated values. When applying two or more design strategies/options to a design concept (e.g., the "Baseline Concept"), the design concept view 2800 may present an conflict indicator 2806 and a popup 2808 that warn a user of a potential or actual conflict between the two or more design strategies/options.

For some embodiments, a potential or an actual conflict may exist when at least one variable/parameter value of a design strategy/option does not agree with a corresponding variable/parameter value of another second design strategy/option. For example, the design concept view 2800 may provide an indication of a conflict between the design strategy/option 2802 and the design strategy/option 2804 when for a variable/parameter 2810, a value 2814 (i.e., 35%) of the design strategy/option 2802 does not agree with a value 2816 (i.e., 22%) of the design strategy/option 2804. Similarly, the design concept view 2800 may provide an indication of a conflict between the design strategy/option 2802 and the design strategy/option 2804 when for a variable/parameter 2810, a value 2818 (i.e., 12 degrees) of the design strategy/option 2802 does not agree with a value 2820 (i.e., 15 degrees) of the design strategy/option 2804.

As described herein, in the event of a conflict, some embodiments may automatically resolve the conflict based on the priority with which the one or more design strategies/options are added, associated, or applied to a design concept. For example, where a design strategy 1 has a higher priority than a design strategy 2, the conflict may be automatically resolved such that the conflicting values of the design strategy 1 are used in favor of the design strategy 2. For some embodiments, the remaining, non-conflicting values of the design strategies 1 and 2 may then be merged or, alternatively, be separated into a new design option or added to a new bundle of design options.

As also described herein, some embodiments may resolve a conflict by prompting a user to resolve the conflict. For example, a user may be prompted with the popup 2808 and requested to select between the conflicting values of each conflicting variable/parameter.

It should be noted that while only two conflicting design strategies/options are shown in FIG. 28, those of ordinary skill in the art would appreciate that in some embodiments three or more design strategies/options may detected to be in conflict and, subsequently, presented for conflict resolution.

While a number of the embodiments described herein are directed toward analyzing and designing architectural structures for improved sustainability (i.e., green buildings), it will be well understood to one of ordinary skill in the art that other embodiments of the present invention can also be utilized for analyzing and designing other aspects of an architectural structure.

The term tool can be used to refer to any apparatus configured to perform a recited function. For example, tools can include a collection of one or more modules and can be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 29:
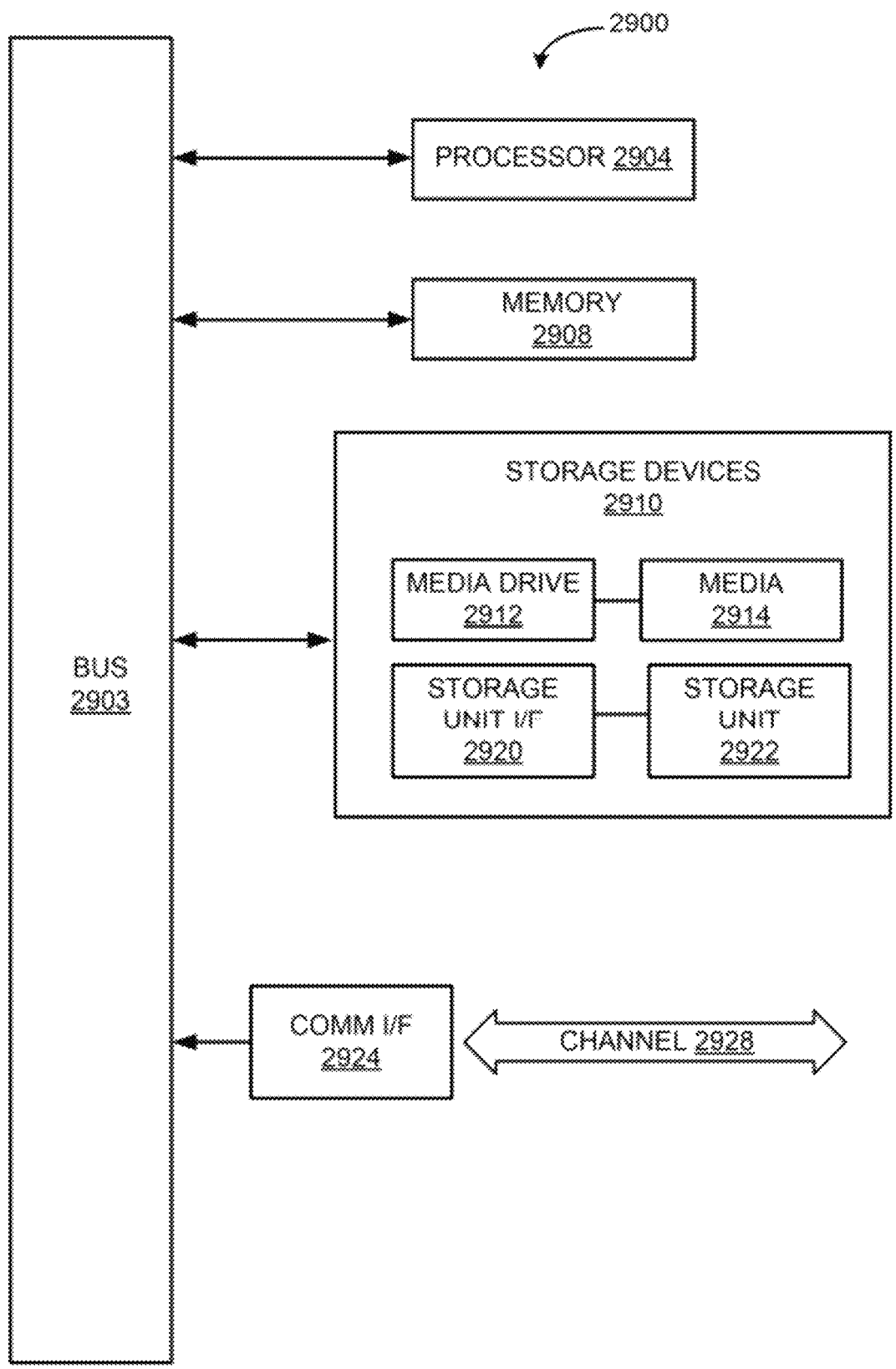
FIG. 29 illustrates an example computing module for implementing various embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 29. Various embodiments are described in terms of this example-computing module 2900. After reading this description, it will become apparent to a person skilled in the relevant art how to implement the invention using other computing modules or architectures.

Referring now to FIG. 29, computing module 2900 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 2900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 2900 might include, for example, one or more processors, controllers, control modules, or other processing devices, such as a processor 2904. Processor 2904 might be implemented using a general-purpose or special-purpose processing engine such as, for example, a microprocessor, controller, or other control logic. In the illustrated example, processor 2904 is connected to a bus 2902, although any communication medium can be used to facilitate interaction with other components of computing module 2900 or to communicate externally.

Computing module 2900 might also include one or more memory modules, simply referred to herein as main memory 2908. For example, preferably random access memory (RAM) or other dynamic memory, might be used for storing information and instructions to be executed by processor 2904. Main memory 2908 might also be used for storing temporary variables or other intermediate information during execution of instructions to be executed by processor 2904. Computing module 2900 might likewise include a read only memory ("ROM") or other static storage device coupled to bus 2902 for storing static information and instructions for processor 2904.

The computing module 2900 might also include one or more various forms of information storage mechanism 2910, which might include, for example, a media drive 2912 and a storage unit interface 2920. The media drive 2912 might include a drive or other mechanism to support fixed or removable storage media 2914. For example, a hard disk drive, a floppy disk drive, a magnetic tape drive, an optical disk drive, a CD or DVD drive (R or RW), or other removable or fixed media drive might be provided. Accordingly, storage media 2914 might include, for example, a hard disk, a floppy disk, magnetic tape, cartridge, optical disk, a CD or DVD, or other fixed or removable medium that is read by, written to or accessed by media drive 2912. As these examples illustrate, the storage media 2914 can include a computer usable storage medium having stored therein computer software or data.

In alternative embodiments, information storage mechanism 2910 might include other similar instrumentalities for allowing computer programs or other instructions or data to be loaded into computing module 2900. Such instrumentalities might include, for example, a fixed or removable storage unit 2922 and an interface 2920. Examples of such storage units 2922 and interfaces 2920 can include a program cartridge and cartridge interface, a removable memory (for example, a flash memory or other removable memory module) and memory slot, a PCMCIA slot and card, and other fixed or removable storage units 2922 and interfaces 2920 that allow software and data to be transferred from the storage unit 2922 to computing module 2900.

Computing module 2900 might also include a communications interface 2924. Communications interface 2924 might be used to allow software and data to be transferred between computing module 2900 and external devices. Examples of communications interface 2924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 2924 might typically be carried on signals, which can be electronic, electromagnetic (which includes optical) or other signals capable of being exchanged by a given communications interface 2924. These signals might be provided to communications interface 2924 via a channel 2928. This channel 2928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2908, storage unit 2920, media 2914, and channel 2928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 2900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer program product for analyzing an architectural structure, the computer program product comprising a computer-readable storage medium in which program instructions are stored, the program instructions configured to cause a computer system to:
obtain a first geographic location of the architectural structure;
obtain location-related data regarding the first geographic location;
determine a three-dimensional geometry of the architectural structure represented by three-dimensional data;
apply a first design concept to the architectural structure using the three-dimensional geometry of the architectural structure, the first design concept comprising one or more user-selected design options having first respective parameter values, wherein applying the first design concept to the architectural structure using the three-dimensional geometry comprises applying the first user-selected design options to the architectural structure according to the first respective parameter values, populating a first set of the respective parameter values with one or more user-defined parameter values, and populating a second set of the first respective parameter values with one or more first informed assumptions, and wherein the first user-defined parameter values and the first informed assumptions enable the first design concept to be used with the architectural structure during an energy simulation of the architectural structure;
determine a first performance of the architectural structure based on applying the first design concept to the architectural structure using the three-dimensional geometry and the location-related data, thereby producing first analysis data, wherein a first user-selected design option of the first design concept affects the first performance;
apply a second design concept to the architectural structure as modified by the first design concept using the three dimensional geometry, the second design concept comprising one or more user-selected design options having second respective parameter values, wherein applying the second design concept to the architectural structure using the three-dimensional geometry comprises applying the second user-selected design options to the architectural structure according to the second respective parameter values;
determine a second performance of the architectural structure based on applying the second design concept to the architectural structure using the three-dimensional geometry and the location-related data, thereby producing second analysis data, wherein a second user-selected design option of the second design concept affects the second performance;
compare the first performance to the second performance to determine a change in benefit to the architectural structure from applying the second design concept to the architectural structure;
combine the first design concept and the second design concept into a bundled design concept that aggregates the first user-selected design options with second user-selected design options, wherein the first design concept and the second design concept are applied to the architectural structure according to a priority; and
determine a third performance of the architectural structure based on applying the bundled design concept to the architectural structure using the three-dimensional geometry and the location-related data, thereby producing third analysis data, the third performance reflecting the effect of aggregating the first and second user-selected design options, wherein aggregating the first and second user-selected design options changes the individual effect of either or both of the first and second design concepts on the architectural structure.

2. The computer program product of claim 1, wherein the program instructions are further configured to cause a computer system to detect a conflict between one of the first respective parameter values of one of the first user-selected design options of the first design concept and one of the second respective parameter values of one of the second user-defined design options of the second design concept.

3. The computer program product of claim 2, wherein the first design concept and the second design concept are applied to the architectural structure according to a priority, and wherein the program instructions are further configured to cause a computer system to resolve the conflict based on the priority.

4. The computer program product of claim 2, wherein the program instructions are further configured to cause a computer system to prompt a user to resolve the conflict.

5. The computer program product of claim 1, wherein the program instructions are further configured to cause a computer system to apply a design override to the first design concept, wherein the design override modifies one of the first respective parameter values of one of the first user-defined design options of the first design concept.

6. The computer program product of claim 1, wherein the program instructions are further configured to cause a computer system to determine which of the first design concept and the second design concept is a better design option.

7. The computer program product of claim 1, wherein the program instructions are further configured to cause a computer system to create the first design concept from a baseline design concept.

8. The computer program product of claim 1, wherein the program instructions are further configured to cause a computer system to determine a feature of the architectural structure based on the first analysis data.

9. The computer program product of claim 1, wherein one of the first user-defined design options includes an equipment choice for the architectural structure, an energy source choice for the architectural structure, a water source choice for the architectural structure, a heating choice for the architectural structure, a cooling choice for the architectural structure, and a construction choice for the architectural structure.

10. The computer program product of claim 1, wherein the architectural structure comprises a plane, a wall, or a fenestration and converting the architectural structure to three-dimensional data comprises obtaining geometric data regarding the plane, the wall, or the fenestration.

11. The computer program product of claim 1, wherein the architectural structure comprises a structure property relating to an operation of the architectural structure, a resource associated with the architectural structure, an equipment item associated with the architectural structure, or construction of the architectural structure, and determining the first performance of the architectural structure based on applying the first design concept to the architectural structure further uses the structure property.

12. The computer program product of claim 1, wherein the first design concept implements an improvement to the architectural structure with respect to building performance metrics, an operational cost, a maintenance cost, or compliance with a structural building standard.

13. The computer program product of claim 1, wherein applying the first design concept to the architectural structure impacts an effect of another design concept that is applied to the architectural structure.

14. The computer program product of claim 1, wherein analyzing the first performance of applying the first design concept to the architectural structure comprises evaluating a formula associated with the first design concept.

15. The computer program product of claim 14, wherein the formula when evaluated utilizes one of the first respective parameter values, the three-dimensional data, the location-related data, a structure property, or one of the first informed assumptions.

16. The computer program product of claim 1, wherein analyzing the first performance of applying the first design concept to the architectural structure comprises determining a cost or a benefit associated with applying the first design concept to the architectural structure.

17. The computer program product of claim 8, wherein determining the feature comprises computing a cost-benefit analysis of applying the first design concept to the architectural structure.

18. The computer program product of claim 8, wherein determining the feature comprises computing a return-on-investment or payback period for applying the first design concept to the architectural structure.

19. The computer program product of claim 8, wherein the feature includes energy consumption of the architectural structure, water consumption of the architectural structure, compliance of the architectural structure with a construction standard, a thermal characteristic of the architectural structure, carbon footprint of the architectural structure, indoor environment quality of the architectural structure, a construction material utilized in the architectural structure, an equipment item utilized by the architectural structure, a construction cost of the architectural structure, an operational cost of the architectural structure, and a maintenance cost of the architectural structure.

20. The computer program product of claim 1, wherein the location-related data includes climate data for the first geographic location, altitude data for the first geographic location, an energy source option available at the first geographic location, a water source available at the first geographic location, information about another architectural structure neighboring the architectural structure, demographic information for the first geographic location, development information for the first geographic location, a transportation option for the first geographic location, environmental information for the first geographic location, construction zoning and code data for the first geographic location.

21. A computer system for analyzing an architectural structure, comprising:
a processor;
a memory connected to the processor; and
a computer non-transitory readable medium having instructions embedded therein, the instructions configured to cause the processor to perform the operation of:
obtaining a first geographic location of the architectural structure;
obtaining location-related data regarding the first geographic location;
determining a three-dimensional geometry of the architectural structure represented by three-dimensional data;
applying a first design concept to the architectural structure using the three-dimensional geometry of the architectural structure, the first design concept comprising one or more user-selected design options having first respective parameter values, wherein applying the first design concept to the architectural structure using the three-dimensional geometry comprises applying the first user-selected design options to the architectural structure according to the first respective parameter values, populating a first set of the respective parameter values with one or more user-defined parameter values, and populating a second set of the first respective parameter values with one or more first informed assumptions, and wherein the first user-defined parameter values and the first informed assumptions enable the first design concept to be used with the architectural structure during an energy simulation of the architectural structure;

determining a first performance of the architectural structure based on applying the first design concept to the architectural structure using the three-dimensional geometry and the location-related data, thereby producing first analysis data, wherein a first user-selected design option of the first design concept affects the first performance;

applying a second design concept to the architectural structure as modified by the first design concept using the three dimensional geometry, the second design concept comprising one or more user-selected design options having second respective parameter values, wherein applying the second design concept to the architectural structure using the three-dimensional geometry comprises applying the second user-selected design options to the architectural structure according to the second respective parameter values;

determining a second performance of the architectural structure based on applying the second design concept to the architectural structure using the three-dimensional geometry and the location-related data, thereby producing second analysis data, wherein a second user-selected design option of the second design concept affects the second performance;

comparing the first performance to the second performance to determine a change in benefit to the architectural structure from applying the second design concept to the architectural structure;

combining the first design concept and the second design concept into a bundled design concept that aggregates the first user-selected design options with second user-selected design options, wherein the first design concept and the second design concept are applied to the architectural structure according to a priority; and determining a third performance of the architectural structure based on applying the bundled design concept to the architectural structure using the three-dimensional geometry and the location-related data, thereby producing third analysis data, the third performance reflecting the effect of aggregating the first and second user-selected design options, wherein aggregating the first and second user-selected design options changes the individual effect of either or both of the first and second design concepts on the architectural structure.

22. The computer system of claim 21, wherein the instructions are further configured to cause the processor to perform the operation of detecting a conflict between one of the first respective parameter values of one of the first user-selected design options of the first design concept and one of the second respective parameter values of one of the second user-defined design options of the second design concept.

23. The computer system of claim 22, wherein the first design concept and the second design concept are applied to the architectural structure according to a priority, and wherein the instructions are further configured to cause a computer system to perform the operation of resolving the conflict based on the priority.

24. The computer system of claim 22, wherein the instructions are further configured to cause the processor to perform the operation of prompting a user to resolve the conflict.

25. The computer system of claim 21, wherein the instructions are further configured to cause the processor to perform the operation of applying a design override to the first design concept, wherein the design override modifies one of the first respective parameter values of one of the first user-defined design options of the first design concept.

26. The computer system of claim 21, wherein the instructions are further configured to cause the processor to perform the operation of determining which of the first design concept and the second design concept is a better design option.

27. The computer system of claim 21, wherein the instructions are further configured to cause the processor to perform the operation of creating the first design concept from a baseline design concept.

28. The computer system of claim 21, wherein the instructions are further configured to cause the processor to perform the operation of determining a feature of the architectural structure based on the first analysis data.

29. The computer system of claim 21, wherein one of the first user-defined design options includes an equipment choice for the architectural structure, an energy source choice for the architectural structure, a water source choice for the architectural structure, a heating choice for the architectural structure, a cooling choice for the architectural structure, and a construction choice for the architectural structure.

30. The computer system of claim 21, wherein the architectural structure comprises a plane, a wall, or a fenestration and convening the architectural structure to three-dimensional data comprises obtaining geometric data regarding the plane, the wall, or the fenestration.

31. The computer system of claim 21, wherein the architectural structure comprises a structure property relating to an operation of the architectural structure, a resource associated with the architectural structure, an equipment item associated with the architectural structure, or construction of the architectural structure, and determining the first performance of the architectural structure based on applying the first design concept to the architectural structure further uses the structure property.

32. The computer system of claim 21, wherein the first design concept implements an improvement to the architectural structure with respect to building performance metrics, an operational cost, a maintenance cost, or compliance with a structural building standard.

33. The computer system of claim 21, wherein applying the first design concept to the architectural structure impacts an effect of another design concept that is applied to the architectural structure.

34. The computer system of claim 21, wherein analyzing the first performance of applying the first design concept to the architectural structure comprises evaluating a formula associated with the first design concept.

35. The computer system of claim 34, wherein the formula when evaluated utilizes one of the first respective parameter values, the three-dimensional data, the location-related data, a structure property, or one of the first informed assumptions.

36. The computer system of claim 21, wherein analyzing the first performance of applying the first design concept to the architectural structure comprises determining a cost or a benefit associated with applying the first design concept to the architectural structure.

37. The computer system of claim 28, wherein determining the feature comprises computing a cost-benefit analysis of applying the first design concept to the architectural structure.

38. The computer system of claim 28, wherein determining the feature comprises computing a return-on-investment or payback period for applying the first design concept to the architectural structure.

39. The computer system of claim 28, wherein the feature includes energy consumption of the architectural structure, water consumption of the architectural structure, compliance of the architectural structure with a construction standard, a thermal characteristic of the architectural structure, carbon footprint of the architectural structure, indoor environment quality of the architectural structure, a construction material utilized in the architectural structure, an equipment item utilized by the architectural structure, a construction cost of the architectural structure, an operational cost of the architectural structure, and a maintenance cost of the architectural structure.

40. The computer system of claim 21, wherein the location-related data includes climate data for the first geographic location, altitude data for the first geographic location, an energy source option available at the first geographic location, a water source available at the first geographic location, information about another architectural structure neighboring the architectural structure, demographic information for the first geographic location, development information for the first geographic location, a transportation option firr the first geographic location, environmental information for the first geographic location, construction zoning and code data for the first geographic location.

41. A method for analyzing an architectural structure, the method comprising:

obtaining a first geographic location of the architectural structure;

obtaining location-related data regarding the first geographic location;

determining a three-dimensional geometry of the architectural structure represented by three-dimensional data;

applying a first design concept to the architectural structure using the three-dimensional geometry of the architectural structure, the first design concept comprising one or more user-selected design options having first respective parameter values, wherein applying the first design concept to the architectural structure using the three-dimensional geometry comprises applying the first user-selected design options to the architectural structure according to the first respective parameter values, populating a first set of the respective parameter values with one or more user-defined parameter values, and populating a second set of the first respective parameter values with one or more first informed assumptions, and wherein the first user-defined parameter values and the first informed assumptions enable the first design concept to be used with the architectural structure during an energy simulation of the architectural structure;

determining a first performance of the architectural structure based on applying the first design concept to the architectural structure using the three-dimensional geometry and the location-related data, thereby producing first analysis data, wherein a first user-selected design option of the first design concept affects the first performance;

applying a second design concept to the architectural structure as modified by the first design concept using the three dimensional geometry, the second design concept comprising one or more user-selected design options having second respective parameter values, wherein applying the second design concept to the architectural structure using the three-dimensional geometry comprises applying the second user-selected design options to the architectural structure according to the second respective parameter values;

determining a second performance of the architectural structure based on applying the second design concept to the architectural structure using the three-dimensional geometry and the location-related data, thereby producing second analysis data, wherein a second user-selected design option of the second design concept affects the second performance;

comparing the first performance to the second performance to determine a change in benefit to the architectural structure from applying the second design concept to the architectural structure;

combining the first design concept and the second design concept into a bundled design concept that aggregates the first user-selected design options with second user-selected design options, wherein the first design concept and the second design concept are applied to the architectural structure according to a priority; and determining a third performance of the architectural structure based on applying the bundled design concept to the architectural structure using the three-dimensional geometry and the location-related data, thereby producing third analysis data, the third performance reflecting the effect of aggregating the first and second user-selected design options, wherein aggregating the first and second user-selected design options changes the individual effect of either or both of the first and second design concepts on the architectural structure.

42. The method of claim 41, further comprising detecting a conflict between one of the first respective parameter values of one of the first user-selected design options of the first design concept and one of the second respective parameter values of one of the second user-defined design options of the second design concept.

43. The method of claim 42, wherein the first design concept and the second design concept are applied to the architectural structure according to a priority, and the method further comprises resolving the conflict based on the priority.

44. The method of claim 42, further comprising prompting a user to resolve the conflict.

45. The method of claim 41, further comprising applying a design override to the first design concept, wherein the design override modifies one of the first respective parameter values of one of the first user-defined design options of the first design concept.

46. The method of claim 41, further comprising determining which of the first design concept and the second design concept is a better design option.

47. The method of claim 41, further comprising creating the first design concept from a baseline design concept.

* * * * *